US008299191B2

(12) United States Patent
Voit et al.

(10) Patent No.: US 8,299,191 B2
(45) Date of Patent: Oct. 30, 2012

(54) SHAPE MEMORY POLYMERS AND PROCESS FOR PREPARING

(75) Inventors: Walter E. Voit, Dallas, TX (US); Taylor Ware, Macon, GA (US); Kenneth Gall, Atlanta, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 136 days.

(21) Appl. No.: 12/906,915

(22) Filed: Oct. 18, 2010

(65) Prior Publication Data

US 2011/0092652 A1 Apr. 21, 2011

Related U.S. Application Data

(60) Provisional application No. 61/253,217, filed on Oct. 20, 2009.

(51) Int. Cl.
*C08L 33/06* (2006.01)
*C08L 33/26* (2006.01)

(52) U.S. Cl. ..... 526/299; 526/310; 526/314; 526/317.1; 526/318; 526/319; 526/326; 526/328; 526/332; 526/335; 526/341; 526/346; 526/348; 525/193; 525/194; 525/220; 525/221; 525/232; 525/238

(58) Field of Classification Search .................. 526/297, 526/310, 314, 317.1, 318, 319, 326, 328, 526/332, 335, 341, 346, 348; 525/193, 194, 525/220, 221, 232, 238
See application file for complete search history.

(56) References Cited

U.S. PATENT DOCUMENTS

| 2004/0030062 | A1 | 2/2004 | Mather et al. |
| 2006/0154195 | A1* | 7/2006 | Mather et al. ..................... 433/6 |
| 2009/0253842 | A1 | 10/2009 | Mather et al. |
| 2010/0068168 | A1 | 3/2010 | Song et al. |
| 2010/0196705 | A1 | 8/2010 | Hood et al. |
| 2010/0221523 | A1 | 9/2010 | Hood et al. |

FOREIGN PATENT DOCUMENTS

| WO | WO 2008/051254 | 2/2008 |
| WO | WO 2008/051318 | 2/2008 |

OTHER PUBLICATIONS

Abd El-Rehim HA: "Swelling of radiation crosslinked acrylamide-based microgels and their potential applications." *Radiation Physics and Chemistry* 2005, 74(2):111-117.
Abrahamson ER, Lake MS, Munshi NA, Gall K: "Shape Memory Mechanics of an Elastic Memory Composite Resin." *Journal of Intelligent Material Systems and Structures* 2003, 14(10):623-632.
Ahmad MB, Huglin MB: "DSC studies on states of water in crosslinked poly(methyl methacrylate-co-n-vinyl-2-pyrrolidone) hydrogels." *Polymer International* 1994, 33(3):273-277.
Baer G, Wilson T, Matthews D, Maitland D: "Shape-memory behavior of thermally stimulated polyurethane for medical applications." *Journal of Applied Polymer Science* 2007, 103:3882.
Banik I, Bhowmick AK: "Effect of electron beam irradiation on the properties of crosslinked rubbers." *Radiation Physics and Chemistry* 2000, 58(3):293-298.
Barot G, Rao I, Rajagopal K: "A thermodynamic framework for the modeling of crystallizable shape memory polymers." *International Journal of Engineering Science* 2008, 46(4):325-351.
Behl M, Lendlein A: "Triple-shape polymers." *Journal of Materials Chemistry* 2010, 20(17):3335-3345.
Bellin I, Kelch,S., Langer,R., and A. Lendlein: "Polymeric triple-shape materials." *PNAS* 2006, 103(48):18043-18047.
Bhattacharya A, Tobushi H: "Analysis of the isothermal mechanical response of a shape memory polymer rheological model." *Polymer Engineering & Science* 2000, 40(12):2498-2510.
Bhattacharya A: "Radiation and industrial polymers." *Prog Polym Sci* 2000, 25:371-401.
Böhm GGA, Detrano M, Pearson DS, Carter DR: "A comparison of the physical properties of radiation and sulfur-cured poly(butadiene-co-styrene)." *Journal of Applied Polymer Science* 1977, 21(12):3193-3209.
Buckley PR, McKinley GH, Wilson TS, Small W, Benett WJ, Bearinger JP, McElfresh MW, Maitland DJ: "Inductively Heated Shape Memory Polymer for the Magnetic Actuation of Medical Devices." *Biomedical Engineering, IEEE Transactions on* 2006, 53(10):2075-2083.
Burlant W, Hinsch J, Taylor C: "Crosslinking and Degradation in Gamma-Irradiated Poly-n-alkyl Acrylates." *Polymer Science* 1964, 2:56-57.
Cabanlit M, Maitland D, Wilson T, Simon S, Wun T, Gershwin ME, Water JVd: "Polyurethane Shape-Memory Polymers Demonstrate Functional Biocompatibility In Vitro." *Macromolecular Bioscience* 2007, 7(1):48-55.
Cao Y, Ying Guan, Juan Du, Juan Luo, Yuxing Peng, C. W. Yip and, Chan ASC: "Hydrogen-bonded polymer network—poly(ethylene glycol) complexes with shape memory effect." *Journal of Materials Chemistry* 2002, 12:2957-2960.
Charlesby A: "Effect of High-energy Radiation on Long-chain Polymers." *Nature* 1953, 4343:167.
Charlesby A, Pinner SH: "Analysis of the Solubility Behaviour of Irradiated Polyethylene and Other Polymers." *Proceedings of the Royal Society of London Series A, Mathematical and Physical Sciences* 1959, 249(1258):367-386.
Cheng S, and David R. Kerluke: "Radiation Processing for Modification of Polymers." *Annual Technical Conference of the Society of Plastic Engineering (ANTEC)* 2003.
Choi N-Y, Kelch S, Lendlein A: "Synthesis, Shape-Memory Functionality and Hydrolytical Degradation Studies on Polymer Networks from Poly(<I>rac<I>-lactide)-<I>b<I>-poly(propylene oxide)-<I>b<I>-poly(<I>rac<I>-lactide) dimethacrylates." *Advanced Engineering Materials* 2006, 8(5):439-445.
Chung T, Romo-Uribe A, Mather PT: "Two-Way Reversible Shape Memory in a Semicrystalline Network." *Macromolecules* 2007, 41(1):184-192.

(Continued)

Primary Examiner — Nathan M Nutter
(74) Attorney, Agent, or Firm — Richard S. Echler

(57) ABSTRACT

Disclosed herein are tunable shape memory polymers (SMP's) and methods for manufacturing the disclosed SMP's.

52 Claims, 8 Drawing Sheets

OTHER PUBLICATIONS

Cleland MR, and Lewis A. Parks: "Medium and high-energy electron beam radiation processing equipment for commercial applications." *Nucl Instr and Meth in Phys Res B* 2003, 8:74-89.

Clough RL: "High-energy radiation and polymers: A review of commercial processes and emerging applications." *Nuclear Instruments and Methods in Physics Research B* 2001, 185:8-33.

Dawes K, Glover L, Vroom D: "The Effects of Electron Beam and g-Irradiation on Polymeric Materials." In: *Physical Properties of Polymers Handbook*. Edited by Mark JE: Springer New York; 2007: 867-887.

Dworjanyn PA, Garner JA, Khan MA, Maojun XY, Ring MG, Nho CY: "Novel additives for accelerating radiation grafting and curing reactions." *Radiation Physics and Chemistry* 1993, 42:31-40.

Feninat FE, G. Laroche, M. Fiset, and D. Mantovani: "Shape Memory Materials for Biomedical Applications." *Advanced Engineering Materials* 2002, 4(3):91-104.

Gall K, Dunn ML, Liu Y, Finch D, Lake M, Munshi NA: "Shape memory polymer nanocomposites." *Acta Materialia* 2002, 50(20):5115-5126.

Gall K, Kreiner P, Turner D, Hulse M: "Shape-memory polymers for microelectromechanical systems." *Microelectromechanical Systems, Journal of* 2004, 13(3):472-483.

Gall K, Yakacki CM, Liu Y, Shandas R, Willett N, Anseth KS: "Thermomechanics of the shape memory effect in polymers for biomedical applications." *Journal of Biomedical Materials Research, Part A* 2005, 73A(3):339-348.

Gall K, Yakacki CM, Willis S, Luders C: "Deformation Limits in Shape Memory Polymers." *Submitted to the Journal of Biomedical Materials Research, 2007* 2007.

Graham RK: "Gamma Irradiation of Polymers of Aryl and Alkaryl Methacrylates and Acrylates." *Journal of Polymer Science* 1959, XXXVII:441-444.

Graham RK: Gamma Irradiation of Poly(alkyl Methacrylates). *Journal of Polymer Science* 1959, XXXVIII:209-212.

Gupta B, and Nishat Anjum: "Plasma and Radiation-Induced Graft Modification of Polymers for Biomedical Applications." *Advances in Polymer Science* 2003, 162:35-61.

Hampikian JM, Heaton BC, Tong FC, Zhang ZQ, Wong CP: "Mechanical and radiographic properties of a shape memory polymer composite for intracranial aneurysm coils." *Materials Science & Engineering C-Biomimetic and Supramolecular Systems* 2006, 26(8):1373-1379.

Haque ME, N. C. Dafader, F. Akhtar, and M. U. Ahmad: "Radiation Dose Required for the Vulcanization of Natural Rubber Latex." *Radiat Phys Chem* 1996, 48(4):505-510.

Hay JN, O'Gara P: "Recent developments in thermoset curing methods." *Aerospace Engineering* 2006, 220:187-195.

Hong S, Yu W, Youk J: "Two-way shape memory behavior of shape memory polyurethanes with a bias load." *Smart Materials and Structures* 2010, 19:035022.

Hu J, Pompe G, Schulze U, Pionteck J: "Synthesis, electron irradiation modification and characterization of polyethylene/poly(butyl methacrylate-co-methyl methacrylate) interpenetrating polymer network." *Polymers for Advanced Technologies* 1998, 9(10-11):746-751.

Jeong HM, Lee SY, Kim Bk: "Shape memory polyurethane containing amorphous reversible phase." *Journal of Materials Science* 2000, 35(7):1579-1583.

Jiinsson S, Per-Erik Sundell, Johan Hultgren, David Sheng, and, Hoyle CE: "Radiation chemistry aspects of polymerization and crosslinking. A review and future environmental trends in 'non-acrylate' chemistry." *Progress in Organic Coatings* 1996, 27:107-122.

Jin F, Hyon S-H, Iwata H, Tsutsumi S: "Crosslinking of Poly(1-lactide) by Gamma-Irradiation." *Macromolecules Rapid Communication* 2002, 23(15).

Kaetsu I, Uchida K, Sutani K, Sakata S: "Intelligent biomembrane obtained by irradiation techniques." *Radiation Physics and Chemistry* 2000, 57(3-6):465-469.

Kagami Y, Gong J, Osada Y: "Shape memory behaviors of crosslinked copolymers containing stearyl acrylate." *Macromolecular Rapid Communications* 1996, 17(8):539-543.

Kauffman GB, Mayo I: "The Story of Nitinol: The Serendipitous Discovery of the Memory Metal and Its Applications." *The Chemical Educator* 1997, 2(2):1-21.

Kumar S, Pandya MV: Thermally recoverable crosslinked polyethylene. *Journal of Applied Polymer Science* 1997, 64(5):823-829.

Lan X, Liu Y, Lv H, Wang X, Leng J, Du S: "Fiber reinforced shape-memory polymer composite and its application in a deployable hinge." *Smart Materials and Structures* 2009, 18:024002.

Lawton EJ, Bueche,A.M., and J.S. Balwit: Irradiation of Polymers by High Energy Electrons. *Nature* 1953, 172:76-77.

Lendlein A, Jiang H, Junger O, Langer R: "Light-induced shape-memory polymers." *Nature* 2005, 434(7035):879-882.

Lendlein A, Kelch S: "Shape-memory polymers." *Angewandte Chemie-International Edition* 2002, 41:2034.

Lendlein A, Langer R: "Biodegradable, Elastic Shape-Memory Polymers for Potential Biomedical Applications." *Science* 2002, 296(5573):1673-1676.

Lendlein A, Schmidt AM, Langer R: "AB-polymer networks based on oligo(varepsilon-caprolactone) segments showing shape-memory properties." *PNAS* 2001, 98(3):842-847.

Li F, Zhu W, Zhang X, Xu CZM: "Shape memory effect of ethylene-vinyl acetate copolymers." *Journal of Applied Polymer Science* 1999, 71(7):1063-1070.

Li J, Viveros J, Wrue M, Anthamatten M: "Shape-memory effects in polymer networks containing reversibly associating side-groups." *Adv Mater* 2007, 19(19):2851.

Liu C, Qin,H., and P. T. Mather: "Review of progress in shape-memory polymers." *Journal of Materials Chemistry* 2007, 17: 1543-1558.

Liu G, Ding X, Cao Y, Zheng Z, Peng Y: "Novel shape-memory polymer with two transition temperatures." *Macromolecular Rapid Communications* 2005, 26(8):649-652.

Liu Y, Gall K, Dunn ML, Greenberg AR, Diani J: "Thermomechanics of shape memory polymers: Uniaxial experiments and constitutive modeling." *International Journal of Plasticity* 2006, 22(2):279-313.

Liu Y, Gall K, Dunn ML, McCluskey P: "Thermomechanics of shape memory polymer nanocomposites." *Mechanics of Materials* 2004, 36(10):929-940.

Lopata VJ, Saunders CB, Singh A, Janke CJ, Wrenn GE, Havens SJ: "Electron-beam-curable epoxy resins for the manufacture of high-performance composites." *Radiation Physics and Chemistry* 1999, 56(4):405-415.

Martínez-Barrera G, Giraldo LF, López BL, Brostow W: "Effects of gamma radiation on fiber-reinforced polymer concrete." *Polymer Composites* 2008, 29(11):1244-1251.

Mather P, Luo X, Rousseau I: "Shape Memory Polymer Research." *Annual Review of Materials Research* 2009, 39:445-471.

Mehrabi HA, and Jeremy Bowman: "Electrofusion Welding of Cross-Linked Polyethylene Pipes." *Iranian Polymer Journal* 1997, 6(3):195-203.

Monkman GJ: "Advances in shape memory polymer actuation." *Mechatronics* 2000, 10(4-5):489-498.

Ni Q-Q, Zhang C-s, Fu Y, Dai G, Kimura T: "Shape memory effect and mechanical properties of carbon nanotube/shape memory polymer nanocomposites." *Composite Structures* 2007, 81(2):176-184.

Olejniczak J, Rosiak J, Charlesby A: "Gel/dose curves for polymers undergoing simultaneous crosslinking and scission." *International Journal of Radiation Applications and Instrumentation Part C Radiation Physics and Chemistry* 1991, 37(3):499-504.

Ortega AM, Kasprzak SE, Yakacki CM, Diani J, Greenberg AR, Gall K: Structure-property relationships in photopolymerizable polymer networks: "Effect of composition on the crosslinked structure and resulting thermomechanical properties of a (meth)acrylate-based system." *Journal of Applied Polymer Science* 2008, 9999(9999):NA.

Park YC, Lee JK, Lee GC: "Development of an expert system for evaluation of the strength of matrix shape memory composites." *Composite Structures* 2007, 77(2):241-248.

Qin H, Mather P: "Combined One-Way and Two-Way Shape Memory in a Glass-Forming Nematic Network." *Macromolecules* 2009, 42(1):273-280.

Rabani G, Luftmann H, Kraft A: "Synthesis and characterization of two shape-memory polymers containing short aramid hard segments and poly([epsilon]-caprolactone) soft segments." *Polymer* 2006, 47(12):4251-4260.

Ratna D, Karger-Kocsis J: "Recent advances in shape memory polymers and composites: a review." *Journal of Materials Science* 2008, 43(1):254-269.

Rousseau IA, Mather PT: "Shape Memory Effect Exhibited by Smectic-C Liquid Crystalline Elastomers." *Journal of the American Chemical Society* 2003, 125(50):15300-15301.

Safranski DL, Gall K: "Effect of chemical structure and crosslinking density on the thermo-mechanical properties and toughness of (meth)acrylate shape memory polymer networks." *Polymer* 2008, 49(20):4446-4455.

Scherzer T: "Photopolymerization of Acrylates without Photoinitiators with Short-Wavelength UV Radiation: A Study with Real-Time Fourier Transform Infrared Spectroscopy." *Polymer Science* 2004, 42:894-901.

Sharma VK, J. Mahajan, and P. K. Bhattacharyyali: "Electron Beam (Eb) Crosslinking of PVC Insulation in Presence of Sensitiser Additives." *Radiat Phys Chem* 1995, 45(5):695 701.

Sharp AA, et al.: "Toward a self-deploying shape memory polymer neuronal electrode." *Journal of Neural Engineering* 2006, 3(4):L23.

Shulltz AR, Roth, Paul I., and George B. Rathmann: "Light Scattering and Viscosity Study of Electron-Irradiated Polystyrene and Polymethacrylates." *Journal of Polymer Science* 1956, XXII:495-507.

Shultz AR: "High-Energy Radiation Effects on Polyacrylates and Polymethacrylates." *Journal of Polymer Science*: 1959, XXXV:369-380.

Shultz AR, and Frank A. Bovey: "Electron Irradiation of Polyacrylates." *Journal of Polymer Science* 1956,XXII:485-494.

Small IVW, Singhal P, Wilson TS, Maitland DJ: "Biomedical applications of thermally activated shape memory polymers." *Journal of Materials Chemistry* 2010, 20(17):3356-3366.

Sun L, Zhao Y, Huang WM, Tong TH: "Formation of Combined Surface Features of Protrusion Array and Wrinkles Atop Shape-Memory Polymers." *Surface Review & Letters* 2009, 16(6):929-933.

Tobushi H, Hara H, Yamada E, Hayashi S: "Thermomechanical properties in a thin film of shape memory polymer of polyurethane series." *Smart Materials and Structures* 1996, 5:483-491.

Tobushi H, Hayashi S, Hoshio K, Makino Y, Miwa N: "Bending actuation characteristics of shape memory composite with SMA and SMP." *Journal of Intelligent Material Systems and Structures* 2006, 17(12):1075-1081.

Tobushi H, Okumura K, Hayashi S, Ito N: "Thermomechanical constitutive model of shape memory polymer." *Mechanics of Materials* 2001, 33(10):545-554.

Tobushi H, Shimeno Y, Hachisuka T, Tanaka K: "Influence of strain rate on superelastic properties of TiNi shape memory alloy." *Mechanics of Materials* 1998, 30(2):141-150.

Vijayabaskar V, Bhattacharya S, Tikku VK, Bhowmick AK: "Electron beam initiated modification of acrylic elastomer in presence of polyfunctional monomers." *Radiation Physics and Chemistry* 2004, 71(5):1045-1058.

Voit, et al., "Radiation crosslinked shape-memory polymers," *Polymer*, 51 (2010) 3551-3559.

Wall LA: Factors Influencing the Behavior of Polymers Exposed to High-Energy Radiation. *Nature* 1955:141-142.

Wei ZG, Sandstroröm R, Miyazaki S: "Shape-memory materials and hybrid composites for smart systems: Part I Shape-memory materials." *Journal of Materials Science* 1998, 33(15):3743-3762.

Weiss RA, Izzo E, Mandelbaum S: "New Design of Shape Memory Polymers: Mixtures of an Elastomeric Ionomer and Low Molar Mass Fatty Acids and Their Salts." *Macromolecules* 2008, 41(9):2978-2980.

Yakacki C, Shandas R, Safranski D, Ortega A, Sassaman K, Gall K: "Strong, tailored, biocompatible shape-memory polymer networks." *Advanced Functional Materials* 2008, 18(16):2428-2435.

Yakacki CM, Shandas R, Lanning C, Rech B, Eckstein A, Gall K: "Unconstrained recovery characterization of shape-memory polymer networks for cardiovascular applications." *Biomaterials* 2007, 28(14):2255-2263.

Yakacki CM, Willis S, Luders C, Gall K: "Deformation Limits in Shape-Memory Polymers." *Advanced Engineering Materials* 2008, 10(1-2):112-119.

Yang B, Min Huang W, Li C, Hoe Chor J: "Effects of moisture on the glass transition temperature of polyurethane shape memory polymer filled with nano-carbon powder." *European Polymer Journal* 2005, 41(5):1123-1128.

Yang F, Wornyo E, Gall K, King WP: "Thermomechanical Formation and Recovery of Nanoindents in a Shape Memory Polymer Studied Using a Heated Tip." *Scanning* 2008, 30(2):197-202.

Yang JH, Chun Bc, Chung Y-C, Cho JH: "Comparison of thermal/mechanical properties and shape memory effect of polyurethane block-copolymers with planar or bent shape of hard segment." *Polymer* 2003, 44(11):3251-3258.

Zheng XT, Zhou Sb, Li Xh, Weng H: "Shape memory properties of poly(D,L-lactide)/hydroxyapatite composites." *Biomaterials* 2006, 27(24):4288-4295.

Zhu G, Shuogui Xu, Jinhua Wang, and Longbin Zhang: "Shape memory behaviour of radiation-crosslinked PCL/PMVS blends." *Radiation Physics and Chemistry* 2006, 75:443-448.

Zhu G, Liang G, Xu Q, Yu Q: "Shape-memory effects of radiation crosslinked poly((β-caprolactone)." *Journal of Applied Polymer Science* 2003, 90(6):1589-1595.

Zhu Y, Hu J, Liu Y: "Shape memory effect of thermoplastic segmented polyurethanes with self-complementary quadruple hydrogen bonding in soft segments." *The European Physical Journal E: Soft Matter and Biological Physics* 2009, 28(1):3-10.

\* cited by examiner though the gel fractions of the 9:1 (TMPTA:TAIC) samples at 10, 25, 50, and 100 kGy were comparable, the plateau modulus in the rubbery state at 50° C was much higher for the 9:1 (TMPTA:TAIC) samples.
SHAPE MEMORY POLYMERS AND PROCESS FOR PREPARING

PRIORITY

This application claims the benefit of Provisional Application Ser. No. 61/253,217 that was filed on Oct. 20, 2009, the entirety of which is incorporated herein by reference.

FIELD

Disclosed herein are tunable thermoset shape memory polymers (SMP's) and methods for manufacturing the disclosed SMP's.

BACKGROUND

Thermoset polymers have many advantages over thermoplastic polymers. For example, thermoset polymers are typically stronger and more durable than thermoplastic polymers; however, once crosslinked (formed), thermoset polymers cannot be reshaped by heating. As such, thermoset polymers (specifically those with tunable shape memory properties) have not been widely used in commodity devices because once formed, the thermoset polymers cannot be processed in the same manner as thermoplastic shape memory polymers, inter alia, injection molding, blow molding, extruding, spinning, drawing, transfer molding, foam formation and supercritical foaming. Therefore, there is a long felt need for processes for preparing thermoset shape memory polymers that can be shaped via conventional process yet retain thermoset properties instead of carving after formation.

DETAILED DESCRIPTION

Figure 1:
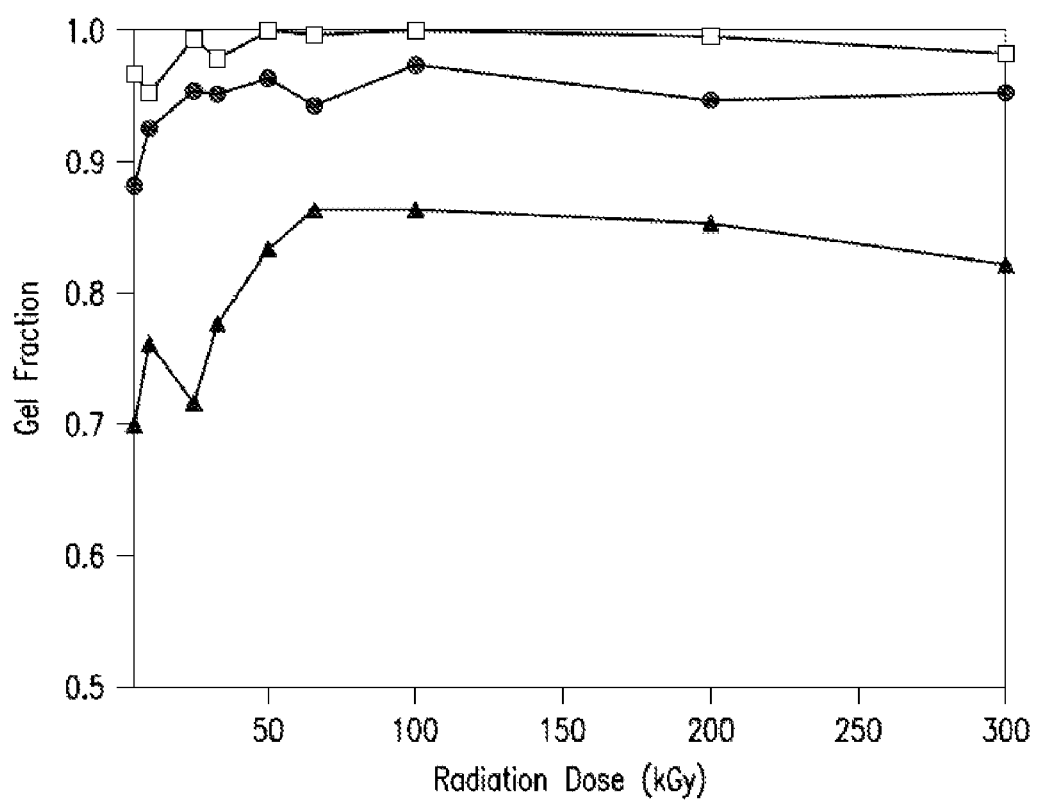
FIG. 1 depicts the change in gel fraction with increasing radiation dose for two disclosed shape memory polymers versus control poly(methyl acrylate). Each polymer is crosslinked with 9% by weight 2-(acryloxyloxymethyl)-2-ethylpropane-1,3-diyl diacrylate (trimethylolpropane triacrylate, TMPTA). The line represented by open squares (□) relates to polymers comprising a copolymer backbone comprising 70:30 methyl acrylate:2-carboxyethyl acrylate, the line represented by solid circles (●) relates to polymers comprising 100% methyl acrylate, and line represented by solid triangles (▲) relates to polymers comprising a copolymer backbone comprising 70:30 methyl acrylate:4-tert-butylcyclohexyl acrylate.

Before the disclosed shape memory polymers and the disclosed process for preparing the disclosed shape memory polymers are described, it is to be understood that the aspects described herein are not limited to specific embodiments, apparatus, or configuration, and as such can, of course, vary. It is also to be understood that the terminology used herein is for the purpose of describing particular aspects only and, unless specifically defined herein, is not intended to be limiting.

All percentages, ratios and proportions herein are by weight, unless otherwise specified. All temperatures are in degrees Celsius (° C.) unless otherwise specified. All documents cited are in relevant part, incorporated herein by reference; the citation of any document is not to be construed as an admission that it is prior art with respect to the present invention.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated component, feature, element, or step or group of components, features, elements or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

A weight percent (wt. %) of a component, unless specifically stated to the contrary, is based on the total weight of the formulation or composition in which the component is included.

As used herein the term "contacting" includes the physical contact of at least one substance to another substance.

As used herein the term "sufficient amount" and "sufficient time" includes an amount and time needed to achieve the desired result or results, e.g., dissolve a portion of the polymer.

"Admixture" or "blend" as generally used herein means a physical combination of two or more different components. In the case of copolymers and crosslinking agent, an admixture or blend of copolymers and crosslinking agent is a physical blend or combination of the components.

As used herein the term "polymer melt" refers to a thermoplastic copolymer raised to a temperature sufficient for combining therewith a crosslinking agent.

As used herein the term "rubbery modulus" ($E_r$) is the measured tensile storage modulus at a point that is 30° C. above the glass transition temperature, $T_g$, of a disclosed shape memory polymer. $E_r$ could also refer to compressive modulus above $T_g$, shear modulus above $T_g$ or other metrics to assess stiffness in this regime.

As used herein the term "thermoset shape memory polymer" refers to a network (crosslinked) polymer possessing a glass transition temperature and rubbery modulus and the property such that when the polymer is brought to a temperature above its glass transition temperature, it can be deformed into a metastable state and then cooled below said transition, at which point that metastable state can be fixed. Reheating above the transition allows shape recovery at a force proportional to the rubbery modulus. Furthermore, the thermoset shape memory polymer has a gel fraction greater than 0.

As used herein the term "homogeneity" as is applies to the admixing of a backbone copolymer and crosslinking agent as defined herein, refers to mixing the backbone copolymer and crosslinking agent in a sufficient amount to achieve intimate mixing on the molecular level of both the copolymer backbone and crosslinking agent.

The following chemical hierarchy is used throughout the specification to describe and enable the scope of the present disclosure and to particularly point out and distinctly claim the units which comprise the compounds of the present disclosure, however, unless otherwise specifically defined, the terms used herein are the same as those of the artisan of ordinary skill. The term "hydrocarbyl" stands for any carbon atom-based unit (organic molecule), said units optionally containing one or more organic functional group, including inorganic atom comprising salts, inter alia, carboxylate salts, quaternary ammonium salts. Within the broad meaning of the term "hydrocarbyl" are the classes "acyclic hydrocarbyl" and "cyclic hydrocarbyl" which terms are used to divide hydrocarbyl units into cyclic and non-cyclic classes.

As it relates to the following definitions, "cyclic hydrocarbyl" units can comprise only carbon atoms in the ring (i.e., carbocyclic and aryl rings) or can comprise one or more heteroatoms in the ring (i.e., heterocyclic and heteroaryl rings). For "carbocyclic" rings the lowest number of carbon atoms in a ring are 3 carbon atoms; cyclopropyl. For "aryl" rings the lowest number of carbon atoms in a ring are 6 carbon atoms; phenyl. For "heterocyclic" rings the lowest number of carbon atoms in a ring is 1 carbon atom; diazirinyl. Ethylene oxide comprises 2 carbon atoms and is a $C_2$ heterocycle. For "heteroaryl" rings the lowest number of carbon atoms in a ring is 1 carbon atom; 1,2,3,4-tetrazolyl. The following is a non-limiting description of the terms "acyclic hydrocarbyl" and "cyclic hydrocarbyl" as used herein.

A. Substituted and unsubstituted acyclic hydrocarbyl:

For the purposes of the present disclosure the term "substituted and unsubstituted acyclic hydrocarbyl" encompasses 3 categories of units:

1) linear or branched alkyl, non-limiting examples of which include, methyl ($C_1$), ethyl ($C_2$), n-propyl ($C_3$), iso-propyl ($C_3$), n-butyl ($C_4$), sec-butyl ($C_4$), iso-butyl ($C_4$), tert-butyl ($C_4$), and the like; substituted linear or branched alkyl, non-limiting examples of which includes, hydroxymethyl ($C_1$), chloromethyl ($C_1$), trifluoromethyl ($C_1$), aminomethyl ($C_1$), 1-chloroethyl ($C_2$), 2-hydroxyethyl ($C_2$), 1,2-difluoroethyl ($C_2$), 3-carboxypropyl ($C_3$), and the like.

2) linear or branched alkenyl, non-limiting examples of which include, ethenyl ($C_2$), 3-propenyl ($C_3$), 1-propenyl (also 2-methylethenyl) ($C_3$), isopropenyl (also 2-methylethen-2-yl) ($C_3$), buten-4-yl ($C_4$), and the like; substituted linear or branched alkenyl, non-limiting examples of which include, 2-chloroethenyl (also 2-chlorovinyl) ($C_2$), 4-hydroxybuten-1-yl ($C_4$), 7-hydroxy-7-methyloct-4-en-2-yl ($C_9$), 7-hydroxy-7-methyloct-3,5-dien-2-yl ($C_9$), and the like.

3) linear or branched alkynyl, non-limiting examples of which include, ethynyl ($C_2$), prop-2-ynyl (also propargyl) ($C_3$), propyn-1-yl ($C_3$), and 2-methyl-hex-4-yn-1-yl ($C_7$); substituted linear or branched alkynyl, non-limiting examples of which include, 5-hydroxy-5-methylhex-3-ynyl ($C_7$), 6-hydroxy-6-methylhept-3-yn-2-yl ($C_8$), 5-hydroxy-5-ethylhept-3-ynyl ($C_9$), and the like.

B. Substituted and unsubstituted cyclic hydrocarbyl:

For the purposes of the present disclosure the term "substituted and unsubstituted cyclic hydrocarbyl" encompasses 5 categories of units:

1) The term "carbocyclic" is defined herein as "encompassing rings comprising from 3 to 20 carbon atoms, wherein the atoms which comprise said rings are limited to carbon atoms, and further each ring can be independently substituted with one or more moieties capable of replacing one or more hydrogen atoms." The following are non-limiting examples of "substituted and unsubstituted carbocyclic rings" which encompass the following categories of units:

i) carbocyclic rings having a single substituted or unsubstituted hydrocarbon ring, non-limiting examples of which include, cyclopropyl ($C_3$), 2-methyl-cyclopropyl ($C_3$), cyclopropenyl ($C_3$), cyclobutyl ($C_4$), 2,3-dihydroxycyclobutyl ($C_4$), cyclobutenyl ($C_4$), cyclopentyl ($C_5$), cyclopentenyl ($C_5$), cyclopentadienyl ($C_5$), cyclohexyl ($C_6$), cyclohexenyl ($C_6$), cycloheptyl ($C_7$), cyclooctanyl ($C_8$), 2,5-dimethylcyclopentyl ($C_5$), 3,5-dichlorocyclohexyl ($C_6$), 4-hydroxycyclohexyl ($C_6$), and 3,3,5-trimethylcyclohex-1-yl ($C_6$).

ii) carbocyclic rings having two or more substituted or unsubstituted fused hydrocarbon rings, non-limiting examples of which include, octahydropentalenyl ($C_8$), octahydro-1H-indenyl ($C_9$), 3a,4,5,6,7,7a-hexahydro-3H-inden-4-yl ($C_9$), decahydroazulenyl ($C_{10}$).

iii) carbocyclic rings which are substituted or unsubstituted bicyclic hydrocarbon rings, non-limiting examples of which include, bicyclo-[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl.

2) The term "aryl" is defined herein as "units encompassing at least one phenyl or naphthyl ring and wherein there are no heteroaryl or heterocyclic rings fused to the phenyl or naphthyl ring and further each ring can be independently substituted with one or more moieties capable of replacing one or more hydrogen atoms." The following are non-limiting examples of "substituted and unsubstituted aryl rings" which encompass the following categories of units:

i) $C_6$ or $C_{10}$ substituted or unsubstituted aryl rings; phenyl and naphthyl rings whether substituted or unsubstituted, non-limiting examples of which include, phenyl ($C_6$), naphthylen-1-yl ($C_{10}$), naphthylen-2-yl ($C_{10}$), 4-fluorophenyl ($C_6$), 2-hydroxyphenyl ($C_6$), 3-methylphenyl ($C_6$), 2-amino-4-fluorophenyl ($C_6$), 2-(N,N-diethylamino)phenyl ($C_6$), 2-cyanophenyl ($C_6$), 2,6-di-tert-butylphenyl ($C_6$), 3-methoxyphenyl ($C_6$), 8-hydroxynaphthylen-2-yl ($C_{10}$), 4,5-dimethoxynaphthylen-1-yl ($C_{10}$), and 6-cyano-naphthylen-1-yl ($C_{10}$).

ii) $C_6$ or $C_{10}$ aryl rings fused with 1 or 2 saturated rings to afford $C_8$-$C_{20}$ ring systems, non-limiting examples of which include, bicyclo[4.2.0]octa-1,3,5-trienyl ($C_8$), and indanyl ($C_9$).

3) The terms "heterocyclic" and/or "heterocycle" are defined herein as "units comprising one or more rings having from 3 to 20 atoms wherein at least one atom in at least one ring is a heteroatom chosen from nitrogen (N), oxygen (O), or sulfur (S), or mixtures of N, O, and S, and wherein further the ring which contains the heteroatom is also not an aromatic ring." The following are non-limiting examples of "substituted and unsubstituted heterocyclic rings" which encompass the following categories of units:

i) heterocyclic units having a single ring containing one or more heteroatoms, non-limiting examples of which include, diazirinyl ($C_1$), aziridinyl ($C_2$), urazolyl ($C_2$), azetidinyl ($C_3$), pyrazolidinyl ($C_3$), imidazolidinyl ($C_3$), oxazolidinyl ($C_3$), isoxazolinyl ($C_3$), thiazolidinyl ($C_3$), isothiazolinyl ($C_3$), oxathiazolidinonyl ($C_3$), oxazolidinonyl ($C_3$), hydantoinyl ($C_3$), tetrahydrofuranyl ($C_4$), pyrrolidinyl ($C_4$), morpholinyl ($C_4$), piperazinyl ($C_4$), piperidinyl ($C_4$), dihydropyranyl ($C_5$), tetrahydropyranyl ($C_5$), piperidin-2-onyl (valerolactam) ($C_5$), 2,3,4,5-tetrahydro-1H-azepinyl ($C_6$), 2,3-dihydro-1H-indole ($C_8$), and 1,2,3,4-tetrahydroquinoline ($C_9$).

ii) heterocyclic units having 2 or more rings one of which is a heterocyclic ring, non-limiting examples of which include hexahydro-1H-pyrrolizinyl ($C_7$), 3a,4,5,6,7,7a-hexahydro-1H-benzo[d]imidazolyl ($C_7$), 3a,4,5,6,7,7a-hexahydro-1H-indolyl ($C_8$), 1,2,3,4-tetrahydroquinolinyl ($C_9$), and decahydro-1H-cycloocta[b]pyrrolyl ($C_{10}$).

4) The term "heteroaryl" is defined herein as "encompassing one or more rings comprising from 5 to 20 atoms wherein at least one atom in at least one ring is a heteroatom chosen from nitrogen (N), oxygen (O), or sulfur (S), or mixtures of N, O, and S, and wherein further at least one of the rings which comprises a heteroatom is an aromatic ring." The following are non-limiting examples of "substituted and unsubstituted heterocyclic rings" which encompass the following categories of units:

i) heteroaryl rings containing a single ring, non-limiting examples of which include, 1,2,3,4-tetrazolyl ($C_1$), [1,2,3]triazolyl ($C_2$), [1,2,4]triazolyl ($C_2$), triazinyl ($C_3$), thiazolyl ($C_3$), 1H-imidazolyl ($C_3$), oxazolyl ($C_3$), isoxazolyl ($C_3$), isothiazolyl ($C_3$), furanyl ($C_4$), thiophenyl ($C_4$), pyrimidinyl ($C_4$), 2-phenylpyrimidinyl ($C_4$), pyridinyl ($C_5$), 3-methylpyridinyl ($C_5$), and 4-dimethylaminopyridinyl ($C_5$)

ii) heteroaryl rings containing 2 or more fused rings one of which is a heteroaryl ring, non-limiting examples of which include: 7H-purinyl ($C_5$), 9H-purinyl ($C_5$), 6-amino-9H-purinyl ($C_5$), 5H-pyrrolo[3,2-d]pyrimidinyl ($C_6$), 7H-pyrrolo[2,3-d]pyrimidinyl ($C_6$), pyrido[2,3-d]pyrimidinyl ($C_2$), 2-phenylbenzo[d]thiazolyl ($C_2$), 1H-indolyl ($C_8$), 4,5,6,7-tetrahydro-1-H-indolyl ($C_8$), quinoxalinyl ($C_8$), 5-methylquinoxalinyl ($C_8$), quinazolinyl ($C_8$), quinolinyl ($C_9$), 8-hydroxy-quinolinyl ($C_9$), and isoquinolinyl ($C_9$).

5) $C_1$-$C_6$ tethered cyclic hydrocarbyl units (whether carbocyclic units, $C_6$ or $C_{10}$ aryl units, heterocyclic units, or heteroaryl units) which connected to another moiety, unit, or core of the molecule by way of a $C_1$-$C_6$ alkylene unit. Non-limiting examples of tethered cyclic hydrocarbyl units include benzyl $C_1$-($C_6$) having the formula:

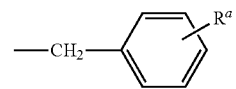

wherein $R^a$ is optionally one or more independently chosen substitutions for hydrogen. Further examples include other aryl units, inter alia, (2-hydroxyphenyl)hexyl $C_6$-($C_6$); naphthalen-2-ylmethyl $C_1$-($C_{10}$), 4-fluorobenzyl $C_1$-($C_6$), 2-(3-hydroxyphenyl)ethyl $C_2$-($C_6$), as well as substituted and unsubstituted $C_3$-$C_{10}$ alkylenecarbocyclic units, for example, cyclopropylmethyl $C_1$-($C_3$), cyclopentylethyl $C_2$-($C_5$), cyclohexylmethyl $C_1$-($C_6$). Included within this category are substituted and unsubstituted $C_1$-$C_{10}$ alkylene-heteroaryl units, for example a 2-picolyl $C_1$-($C_6$) unit having the formula:

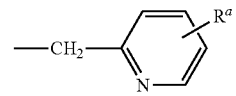

wherein $R^a$ is the same as defined above. In addition, $C_1$-$C_{12}$ tethered cyclic hydrocarbyl units include $C_1$-$C_{10}$ alkyleneheterocyclic units and alkylene-heteroaryl units, non-limiting examples of which include, aziridinylmethyl $C_1$-($C_2$) and oxazol-2-ylmethyl $C_1$-($C_3$).

For the purposes of the present disclosure carbocyclic rings are from $C_3$ to $C_{20}$; aryl rings are $C_6$ or $C_{10}$; heterocyclic rings are from $C_1$ to $C_9$; and heteroaryl rings are from $C_1$ to $C_9$.

For the purposes of the present disclosure, and to provide consistency in defining the present disclosure, fused ring units, as well as spirocyclic rings, bicyclic rings and the like, which comprise a single heteroatom will be characterized and referred to herein as being encompassed by the cyclic family corresponding to the heteroatom containing ring, although the artisan may have alternative characterizations. For example, 1,2,3,4-tetrahydroquinoline having the formula:

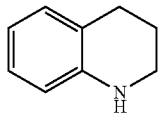

is, for the purposes of the present disclosure, considered a heterocyclic unit. 6,7-Dihydro-5H-cyclopentapyrimidine having the formula:

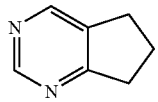

is, for the purposes of the present disclosure, considered a heteroaryl unit. When a fused ring unit contains heteroatoms in both a saturated ring (heterocyclic ring) and an aryl ring (heteroaryl ring), the aryl ring will predominate and determine the type of category to which the ring is assigned herein for the purposes of describing the invention. For example, 1,2,3,4-tetrahydro-[1,8]naphthpyridine having the formula:

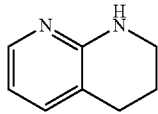

is, for the purposes of the present disclosure, considered a heteroaryl unit.

The term "substituted" is used throughout the specification. The term "substituted" is applied to the units described herein as "substituted unit or moiety is a hydrocarbyl unit or moiety, whether acyclic or cyclic, which has one or more hydrogen atoms replaced by a substituent or several substituents as defined herein below." The units, when substituting for hydrogen atoms are capable of replacing one hydrogen atom, two hydrogen atoms, or three hydrogen atoms of a hydrocarbyl moiety at a time. In addition, these substituents can replace two hydrogen atoms on two adjacent carbons to form said substituent, new moiety, or unit. For example, a substituted unit that requires a single hydrogen atom replacement includes halogen, hydroxyl, and the like. A two hydrogen atom replacement includes carbonyl, oximino, and the like. A two hydrogen atom replacement from adjacent carbon atoms includes epoxy, and the like. Three hydrogen replacement includes cyano, and the like. The term substituted is used throughout the present specification to indicate that a hydrocarbyl moiety, inter alia, aromatic ring, alkyl chain; can have one or more of the hydrogen atoms replaced by a substituent. When a moiety is described as "substituted" any number of the hydrogen atoms may be replaced. For example, 4-hydroxyphenyl is a "substituted aromatic carbocyclic ring (aryl ring)", (N,N-dimethyl-5-amino)octanyl is a "substituted $C_8$ linear alkyl unit, 3-guanidinopropyl is a "substituted $C_3$ linear alkyl unit," and 2-carboxypyridinyl is a "substituted heteroaryl unit."

The following are non-limiting examples of units which can substitute for hydrogen atoms on a carbocyclic, aryl, heterocyclic, or heteroaryl unit:

i) $C_1$-$C_{12}$ linear, branched, or cyclic alkyl, alkenyl, and alkynyl; methyl ($C_1$), ethyl ($C_2$), ethenyl ($C_2$), ethynyl ($C_2$), n-propyl ($C_3$), iso-propyl ($C_3$), cyclopropyl ($C_3$), 3-propenyl ($C_3$), 1-propenyl (also 2-methylethenyl) ($C_3$), isopropenyl (also 2-methylethen-2-yl) ($C_3$), prop-2-ynyl (also propargyl) ($C_3$), propyn-1-yl ($C_3$), n-butyl ($C_4$), sec-butyl ($C_4$), iso-butyl ($C_4$), tert-butyl ($C_4$), cyclobutyl ($C_4$), buten-4-yl ($C_4$), cyclopentyl ($C_5$), cyclohexyl ($C_6$);

ii) substituted or unsubstituted $C_6$ or $C_{10}$ aryl; for example, phenyl, naphthyl (also referred to herein as naphthylen-1-yl ($C_{10}$) or naphthylen-2-yl ($C_{10}$));

iii) substituted or unsubstituted $C_6$ or $C_{10}$ alkylenearyl; for example, benzyl, 2-phenylethyl, naphthylen-2-ylmethyl;

iv) substituted or unsubstituted $C_1$-$C_9$ heterocyclic rings; as described herein below;

v) substituted or unsubstituted $C_1$-$C_9$ heteroaryl rings; as described herein below;

vi) $-(CR^{102a}R^{102b})_aOR^{101}$; for example, $-OH$, $-CH_2OH$, $-OCH_3$, $-CH_2OCH_3$, $-OCH_2CH_3$, $-CH_2OCH_2CH_3$, $-OCH_2CH_2CH_3$, and $-CH_2OCH_2CH_2CH_3$;

vii) $-(CR^{102a}R^{102b})_aC(O)R^{101}$; for example, $-COCH_3$, $-CH_2COCH_3$, $-COCH_2CH_3$, $-CH_2COCH_2CH_3$, $-COCH_2CH_2CH_3$, and $-CH_2COCH_2CH_2CH_3$;

viii) $-(CR^{102a}R^{102b})_aC(O)OR^{101}$; for example, $-CO_2CH_3$, $-CH_2CO_2CH_3$, $-CO_2CH_2CH_3$, $-CH_2CO_2CH_2CH_3$, $-CO_2CH_2CH_2CH_3$, and $-CH_2CO_2CH_2CH_2CH_3$;

ix) $-(CR^{102a}R^{102b})_aC(O)N(R^{101})_2$; for example, $-CONH_2$, $-CH_2CONH_2$; $-CONHCH_3$, $-CH_2CONHCH_3$, $-CON(CH_3)_2$, and $-CH_2CON(CH_3)_2$;

x) $-(CR^{102a}R^{102b})_aN(R^{101})_2$; for example, $-NH_2$, $-CH_2NH_2$, $-NHCH_3$, $-CH_2NHCH_3$, $-N(CH_3)_2$, and $-CH_2N(CH_3)_2$;

xi) halogen; $-F$, $-Cl$, $-Br$, and $-I$;

xii) $-(CR^{102a}R^{102b})_aCN$;

xiii) $-(CR^{102a}R^{102b})_aNO_2$;

xiv) $-CH_jX_k$; wherein X is halogen, the index j is an integer from 0 to 2, j+k=3; for example, $-CH_2F$, $-CF_3$, $-CCl_3$, or $-CBr_3$;

xv) $-(CR^{102a}R^{102b})_aSR^{101}$; $-SH$, $-CH_2SH$, $-SCH_3$, $-CH_2SCH_3$, $-SC_6H_5$, and $-CH_2SC_6H_5$;

xvi) $-(CR^{102a}R^{102b})_aSO_2R^{101}$; for example, $-SO_2H$, $-CH_2SO_2H$, $-SO_2CH_3$, $-CH_2SO_2CH_3$, $-SO_2C_6H_5$, and $-CH_2SO_2C_6H_5$; and xvii) $-(CR^{102a}R^{102b})_aSO_3R^{101}$; for example, $-SO_3H$, $-CH_2SO_3H$, $-SO_3CH_3$, $-CH_2SO_3CH_3$, $-SO_3C_6H_5$, and $-CH_2SO_3C_6H_5$;

wherein each $R^{101}$ is independently hydrogen, substituted or unsubstituted $C_1$-$C_6$ linear, branched, or cyclic alkyl, phenyl, benzyl, heterocyclic, or heteroaryl; or two $R^{101}$ units can be taken together to form a ring comprising 3-7 atoms; $R^{102a}$ and $R^{102b}$ are each independently hydrogen or $C_1$-$C_4$ linear or branched alkyl; the index "a" is from 0 to 4.

Shape Memory Polymers

One aspect of the disclosed thermoset shape memory polymers comprises:
a) a thermoplastic backbone comprising at least two linear monomers; and
b) at least one crosslinker.

Another aspect of the disclosed thermoset shape memory polymers comprises:
a) a plurality of thermoplastic homopolymer backbones; and
b) at least one crosslinker.

A further aspect of the disclosed thermoset shape memory polymers comprises:
a) a thermoplastic homopolymer backbone; and
b) a plurality of crosslinkers.

A still further aspect of the disclosed thermoset shape memory polymers comprises:
a) a plurality of thermoplastic homopolymer backbones; and
b) at least one crosslinker.

A yet further aspect of the disclosed thermoset shape memory polymers comprises:
a) a plurality of thermoplastic copolymer backbones wherein each copolymer comprises at least one different monomer than the other copolymers; and
b) at least one crosslinker.

A yet further aspect of the disclosed thermoset shape memory polymers comprises:
a) a plurality of thermoplastic copolymer backbones wherein each copolymer comprises at least one different monomer than the other copolymers; and
b) a plurality of crosslinkers.

A yet further aspect of the disclosed thermoset shape memory polymers comprises:
a) some combination of a plurality of thermoplastic of homopolymers and copolymer backbones wherein each copolymer comprises at least one different monomer than the other copolymers; and
b) at least one crosslinker.

A yet further aspect of the disclosed thermoset shape memory polymers comprises:
a) some combination of a plurality of thermoplastic of homopolymers and copolymer backbones wherein each copolymer comprises at least one different monomer than the other copolymers; and
b) a plurality of crosslinkers.

For the purposes of the present disclosure, the copolymer backbone is formed by copolymerization of two or more monomers as disclosed herein. Further, multifunctional crosslinking agents, i.e., "crosslinkers" are combined with the thermoplastic polymer as described herein and subsequently cured by radiation to form a thermoset plastic network. The disclosed shape memory polymers comprise these thermoset plastic networks.

One aspect of the disclosed shape memory polymers relates to shape memory polymers having a glass transition temperature, $T_g$, of from about −40° C. to about 200° C. In one embodiment, the disclosed shape memory polymers have a glass transition temperature, $T_g$, of from about 0° C. to about 200° C. In another embodiment, the disclosed shape memory polymers have a glass transition temperature, $T_g$, of from about 10° C. to about 150° C. In a further embodiment, the disclosed shape memory polymers have a glass transition temperature, $T_g$, of from about 20° C. to about 100° C. In a still further embodiment, the disclosed shape memory polymers have a glass transition temperature, $T_g$, of from about 50° C. to about 200° C. In a yet further embodiment, the disclosed shape memory polymers have a glass transition temperature, $T_g$, of from about 0° C. to about 70° C. In a yet another embodiment, the disclosed shape memory polymers have a glass transition temperature, $T_g$, of from about −40° C. to about 20° C.

One aspect of the disclosed shape memory polymers relates to polymers having a rubbery modulus, $E_r$, of from about 0.01 MPa to about 100 MPa. In one embodiment, the disclosed polymers have a rubbery modulus, $E_r$, of from about 0.01 MPa to about 15 MPa. In another embodiment, the disclosed polymers have a rubbery modulus, $E_r$, of from about 1 MPa to about 10 MPa. In a further embodiment, the disclosed polymers have a rubbery modulus, $E_r$, of from about 1 MPa to about 5 MPa. In a yet further embodiment, the disclosed polymers have a rubbery modulus, $E_r$, of from about 1 MPa to about 3 MPa. In a still further embodiment, the disclosed polymers have a rubbery modulus, $E_r$, of from about 0.01 MPa to about 10 MPa. In a yet another embodiment, the disclosed polymers have a rubbery modulus, $E_r$, of from about 0.01 MPa to about 5 MPa. In a yet still further embodiment, the disclosed polymers have a rubbery modulus, $E_r$, of from about 0.01 MPa to about 3 MPa. The disclosed polymers, however, can have any value from about 0.01 MPa to about 100 MPa, for example, 1.0 MPa, 1.1 MPa, 1.2 MPa, 1.3 MPa, 1.4 MPa, 1.5 MPa, 1.6 MPa, 1.7 MPa, 1.8 MPa, 1.9 MPa, 2.0 MPa, 2.1 MPa, 2.2 MPa, 2.3 MPa, 2.4 MPa, 2.5 MPa, 2.6 MPa, 2.7 MPa, 2.8 MPa, 2.9 MPa, and 3.0 MPa.

The disclosed shape memory polymers have a gel fraction greater than 0. In one embodiment the disclosed shape memory polymers have a gel fraction greater than about 50%. In another embodiment, the disclosed shape memory polymers have greater than about 60% of a gel fraction. In a further embodiment, the disclosed shape memory polymers have greater than about 70% of a gel fraction. In still further embodiment, the disclosed shape memory polymers have greater than about 80% of a gel fraction. In a yet further embodiment, the disclosed shape memory polymers have greater than about 90% of a gel fraction. In a still yet further embodiment, the disclosed shape memory polymers have greater than about 95% of a gel fraction. In a still yet further embodiment, the disclosed shape memory polymers have greater than about 98% of a gel fraction.

The disclosed shape memory polymers have an average molecular weight greater than about 20,000 Daltons. In one embodiment, the average molecular weight of the disclosed shape memory polymers is from about 40,000 Daltons to about 65,000 Daltons. In another embodiment, the average molecular weight of the disclosed shape memory polymers is from about 40,000 Daltons to about 50,000 Daltons. In another embodiment, the average molecular weight of the disclosed shape memory polymers is from about 200,000 Daltons to about 5,000,000 Daltons. In another embodiment, the average molecular weight of the disclosed shape memory polymers is greater than 4,000,000 Daltons. In a further embodiment, the average molecular weight of the disclosed shape memory polymers is from about 100,000 Daltons to about 1,000,000 Daltons. In a still further embodiment, the average molecular weight of the disclosed shape memory polymers is from about 400,000 Daltons to about 750,000 Daltons.

Polyacrylate, Polyacrylamide and Poylacrylate/Polyacrylamide Polymer Backbones

One category of the disclosed shape memory polymers relates to polymers having backbones comprising two or more of the following monomers:

i) acrylates having the formula:

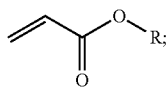

and/or
ii) acrylamides having the formula:

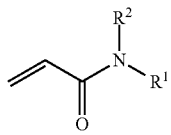

wherein R, $R^1$ and $R^2$ are each independently is chosen from:
i) hydrogen;
ii) $C_1$-$C_{20}$ linear alkyl; for example, methyl ($C_1$), ethyl ($C_2$), n-propyl ($C_3$), n-butyl ($C_4$), n-pentyl ($C_5$), n-hexyl ($C_6$), n-heptyl ($C_2$), n-octyl ($C_8$), n-nonyl ($C_9$), n-decyl ($C_{10}$), and the like;
iii) $C_3$-$C_{20}$ branched alkyl; for example, iso-propyl ($C_3$), sec-butyl ($C_4$), iso-butyl ($C_4$), tert-butyl ($C_4$), and the like;
iv) $C_3$-$C_{20}$ cyclic alkyl; for example, cyclopropyl ($C_3$), cyclobutyl ($C_4$), cyclopentyl ($C_5$), cyclohexyl ($C_6$), cycloheptyl ($C_7$), and the like;
v) $C_5$-$C_{20}$ bicyclic alkyl; for example, 1-methylbicyclo[2.2.1]heptan-2-yl acrylate, 7,7-dimethylbicyclo[2.2.1]heptan-2-yl acrylate, 1,7,7-trimethyl-bicyclo[2.2.1]heptan-2-yl acrylate, 1,3,3-trimethylbicyclo[2.2.1]heptan-2-yl acrylate, 2,6,6-trimethylbicyclo[3.1.1]heptan-2-yl acrylate, and the like;
vi) $C_5$-$C_{20}$ fused ring alkyl; octahydropentalene, octahydro-1H-indene, decahydronaphthalene (decalin), and the like;
vii) $C_1$-$C_{20}$ heterocyclic; diazirinyl ($C_1$), aziridinyl ($C_2$), urazolyl ($C_2$), azetidinyl ($C_3$), pyrazolidinyl ($C_3$), imidazolidinyl ($C_3$), oxazolidinyl ($C_3$), isoxazolinyl ($C_3$), thiazolidinyl ($C_3$), isothiazolinyl ($C_3$), oxathiazolidinonyl ($C_3$), oxazolidinonyl ($C_3$), hydantoinyl ($C_3$), tetrahydropyranyl ($C_4$), pyrrolidinyl ($C_4$), morpholinyl ($C_4$), piperazinyl ($C_4$), piperidinyl ($C_4$), dihydropyranyl ($C_5$), tetrahydropyranyl ($C_5$), piperidin-2-onyl (valerolactam) ($C_5$), 2,3,4,5-tetrahydro-1H-azepinyl ($C_6$), 2,3-dihydro-1H-indole ($C_8$), 1,2,3,4-tetrahydro-quinoline ($C_9$), and the like;
viii) $C_1$-$C_{20}$ heteroaryl; for example, 1,2,3,4-tetrazolyl ($C_1$), [1,2,3]triazolyl ($C_2$), [1,2,4]triazolyl ($C_2$), triazinyl ($C_3$), thiazolyl ($C_3$), 1H-imidazolyl ($C_3$), oxazolyl ($C_3$), isoxazolyl ($C_3$), isothiazolyl ($C_3$), furanyl ($C_4$), thiopheneyl ($C_4$), pyrimidinyl ($C_4$), pyridinyl ($C_5$), and the like;
ix) $C_4$-$C_{20}$ heterobicyclic; 5-azabicyclo[2.1.1]hexanyl, 7-oxabicyclo[2.2.1]-heptanyl, 7-azabicyclo[2.2.1]heptanyl, 2-azabicyclo[2.2.2]octanyl, and the like;
x) $C_6$ or $C_{10}$ aryl; or
xi) $C_7$-$C_{20}$ alkylenearyl; for example, benzyl, 2-phenylethyl, and the like; or $R^1$ and $R^2$ can be taken together to form:
i) a substituted or unsubstituted ring having from 3 to 20 atoms and optionally from 1 to 3 heteroatoms in addition to the nitrogen atom to which $R^1$ and $R^2$ are bonded;
ii) a fused ring system containing from 2 to 4 rings having a total of from 3 to 20 atoms in addition to the nitrogen atom to which $R^1$ and $R^2$ are bonded; or
iii) a bicyclic ring system having a total of from 4 to 20 atoms in addition to the nitrogen atom to which $R^1$ and $R^2$ are bonded.

The substitutions for hydrogen atoms on R, $R^1$ and $R^2$ or on the rings formed by $R^1$ and $R^2$ are independently chosen from:
i) $C_1$-$C_{12}$ linear, $C_3$-$C_{12}$ branched, or $C_3$-$C_{12}$ cyclic alkyl, alkenyl, and alkynyl;
ii) substituted or unsubstituted $C_6$ or $C_{10}$ aryl;
iii) substituted or unsubstituted $C_6$ or $C_{10}$ alkylenearyl;
iv) substituted or unsubstituted $C_1$-$C_9$ heterocyclic rings;
v) substituted or unsubstituted $C_1$-$C_9$ heteroaryl rings;
vi) —$(CR^{102a}R^{102b})_a OR^{101}$;
vii) —$(CR^{102a}R^{102b})_a C(O)R^{101}$;
viii) —$(CR^{102a}R^{102b})_a C(O)OR^{101}$;
ix) —$(CR^{102a}R^{102b})_a C(O)N(R^{101})_2$;
x) $(CR^{102a}R^{102b})_a N(R^{101})_2$;
xi) halogen;
xii) —$(CR^{102a}R^{102b})_a CN$;
xiii) —$(CR^{102a}R^{102b})_a NO_2$;
xiv) —$CH_j X_k$; wherein X is halogen, the index j is an integer from 0 to 2, j+k=3;
xv) —$(CR^{102a}R^{102b})_a SR^{101}$;
xvi) —$(CR^{102a}R^{102b})_a SO_2 R^{101}$; or
xvii) —$(CR^{102a}R^{102b})_a SO_3 R^{101}$;
wherein each $R^{101}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{101}$ units can be taken together to form a ring comprising 3-7 atoms; $R^{102a}$ and $R^{102b}$ are each independently hydrogen or $C_1$-$C_4$ linear or $C_3$-$C_4$ branched alkyl; the index "a" is from 0 to 4.

In one embodiment of the disclosed shape memory polymers, the backbones comprise one or more acrylates wherein each R unit is independently chosen from:
i) substituted or unsubstituted $C_1$-$C_6$ linear alkyl;
ii) substituted or unsubstituted $C_3$-$C_6$ branched alkyl;
iii) substituted or unsubstituted $C_3$-$C_6$ cyclic alkyl;
iv) substituted or unsubstituted $C_6$-$C_{20}$ bicyclic alkyl;
v) substituted or unsubstituted $C_6$ or $C_{10}$ aryl;
vi) substituted or unsubstituted $C_7$-$C_{20}$ alkylenearyl; or
vii) substituted or unsubstituted $C_1$-$C_{20}$ heterocyclic.

The R units of this embodiment can be substituted with one or more units independently chosen from:
i) $C_1$-$C_6$ linear alkyl;
ii) $C_3$-$C_6$ branched alkyl;
iii) $C_3$-$C_6$ cyclic alkyl;
iv) halogen; or
v) —C(O)OH.

In one iteration of this embodiment, the polymer backbone comprises one or more monomers chosen from methyl acrylate, ethyl acrylate, n-propyl acrylate, iso-propyl acrylate, cyclopropyl acrylate, n-butyl acrylate, iso-butyl acrylate, sec-butyl acrylate, tert-butyl acrylate, cyclobutyl acrylate, n-pentyl acrylate, cyclopentyl acrylate, n-hexyl acrylate, cyclohexyl acrylate, or 4-tert-butylcyclohexyl acrylate.

In another iteration of this embodiment, the polymer backbone comprises one or more monomers chosen from bicyclo[1.1.1]pentan-1-yl acrylate, bicyclo[1.1.1]pentan-2-yl acrylate, bicyclo[2.1.1]hexan-1-yl acrylate, bicyclo[2.1.1]hexan-2-yl acrylate, bicyclo[2.1.1]hexan-6-yl acrylate, bicyclo[2.2.1]heptan-1-yl acrylate, bicyclo[2.2.1]heptan-2-yl acrylate, 1-methylbicyclo[2.2.1]heptan-2-yl acrylate, 7,7-dimethylbicyclo[2.2.1]heptan-2-yl acrylate, 1,7,7-trimethylbicyclo[2.2.1]heptan-2-yl acrylate, 1,3,3-trimethylbicyclo[2.2.1]-heptan-2-yl acrylate, or 2,6,6-trimethylbicyclo-[3.1.1]heptan-2-yl acrylate.

In a further iteration of this embodiment, the polymer backbone comprises one or more monomers chosen from phenyl acrylate, 2-chlorophenyl acrylate, 3-chlorophenyl acrylate, 4-chlorophenyl acrylate, 2-methylphenyl acrylate, 3-methylphenyl acrylate, 4-methylphenyl acrylate, benzyl acrylate, 2-chlorobenzyl acrylate, 3-chlorobenzyl acrylate, 4-chlorobenzyl acrylate, 2-methylbenzyl acrylate, 3-methylbenzyl acrylate, or 4-methylbenzyl acrylate, In another embodiment of the disclosed shape memory polymers, the backbones comprise one or more acrylamides wherein each $R^1$ and $R^2$ unit is independently chosen from:
  i) substituted or unsubstituted $C_1$-$C_6$ linear alkyl;
  ii) substituted or unsubstituted $C_3$-$C_6$ branched alkyl;
  iii) substituted or unsubstituted $C_3$-$C_6$ cyclic alkyl;
  iv) substituted or unsubstituted $C_6$-$C_{20}$ bicyclic alkyl;
  v) substituted or unsubstituted $C_6$ or $C_{10}$ aryl;
  vi) substituted or unsubstituted $C_7$-$C_{20}$ alkylenearyl; or
  vii) substituted or unsubstituted $C_1$-$C_{20}$ heterocyclic.

In one iteration of this embodiment, the polymer backbone comprises one or more monomers chosen from acrylamide, N-methylacrylamide, N,N-dimethylacrylamide, N-ethylacrylamide, N,N-diethylacrylamide, N-methyl-N-ethylacrylamide, N-isopropylacrylamide, N,N-diisopropylacrylamide, N-cyclopropylacrylamide, N,N-dicyclopropylacrylamide, N-acryloylaziridine (1-(aziridin-1-yl)prop-2-en-1-one), N-acryloylazetidine (1-(azetidin-1-yl)prop-2-en-1-one), N-acryloylpyrrolidine (1-(pyrrolidin-1-yl)prop-2-en-1-one), 4-acryloylmorpholine (1-morpholinoprop-2-en-1-one), N-acryloylpiperidine (1-(piperidin-1-yl)prop-2-en-1-one), or N-acryloylpiperazine (1-(piperazin-1-yl)prop-2-en-1-one).

In another aspect of this category of the disclosed shape memory polymers, the backbones comprise:
  i) from about 1% to about 30% by weight of a first monomer; and
  ii) from about 70% to about 99% by weight of a second monomer.

In one embodiment of this aspect, the backbones comprise:
  i) from about 1% to about 30% by weight of butyl acrylate; and
  ii) from about 70% to about 99% by weight of methyl acrylate.

One iteration of this embodiment includes backbones comprising from about 10% to about 30% by weight of butyl acrylate. In another iteration, the polymer backbones comprise from about 15% to about 25% by weight of butyl acrylate. In a further iteration, the polymer backbones comprise from about 20% by weight of butyl acrylate.

Another iteration of this embodiment includes backbones comprising from about 80% by weight of methyl acrylate. In another iteration, the polymer backbones comprise from about 75% to about 85% by weight of methyl acrylate.

In a further aspect of the disclosed shape memory polymers, the backbones comprise:
  i) from about 0.1% to about 99% by weight of a first monomer;
  ii) from about 0.1% to about 99% by weight of a second monomer; and
  iii) from about 0.1% to about 99% by weight of a third monomer.

A still further aspect of the disclosed shape memory polymers relates to polymers comprising:
  a) a poly(methyl acrylate) thermoplastic backbone; and
  b) at least one crosslinking agent as disclosed herein;

wherein the resulting shape memory polymer has a glass transition temperature, $T_g$, of from about $-40°$ C. to about $200°$ C., a rubbery modulus, $E_r$, of from about 0.01 MPa to about 100 MPa, and a gel fraction greater than 0.

Polyurethane Backbones

Another category of the disclosed shape memory polymers relates to polymers having backbones comprising the following monomers:
  i) at least one diisocyanate having the formula:

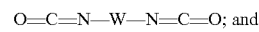

ii) at least one diol having the formula:

wherein W is chosen from:
  i) substituted or unsubstituted $C_1$-$C_{20}$ linear alkylene, $C_3$-$C_{20}$ branched alkylene, or $C_3$-$C_{20}$ cyclic alkylene; for example, methylene ($C_1$), ethylene ($C_2$), n-propylene ($C_3$), n-butylene ($C_4$), n-pentylene ($C_5$), n-hexylene ($C_6$), n-heptylene ($C_7$), 3-methylhexylene ($C_7$), n-octylene ($C_8$), n-nonylene ($C_9$), n-decylene ($C_{10}$), and the like;
  ii) substituted or unsubstituted $C_2$-$C_{20}$ linear alkenylene, $C_3$-$C_{20}$ branched alkenylene, or $C_5$-$C_{20}$ cyclic alkenylene; for example, (E)-hept-3-enylene and (Z)-oct-2-enylene;
  iii) substituted or unsubstituted $C_2$-$C_{20}$ linear alkynylene or $C_3$-$C_{20}$ branched alkynylene;
  iv) substituted or unsubstituted arylene; for example, 1,3-phenylene. 1,4-phenylene, 1,5-naphthylene
  v) substituted or unsubstituted alkylenearylene; for example, a ($C_7$) unit having the formula:

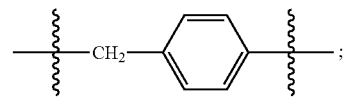

vi) substituted or unsubstituted alkylenearylalkylene; for example, a ($C_8$) unit having the formula:

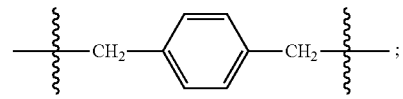

vii) substituted or unsubstituted heterocycylene; for example units having the formula:

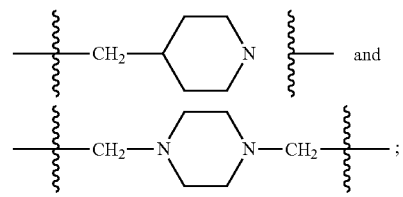

and viii) substituted or unsubstituted heteroarylene; for example units having the formula:

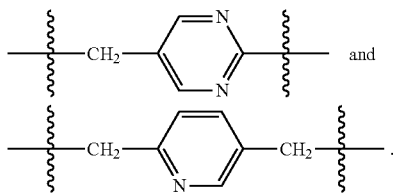

The substitutions for hydrogen atoms on W units are independently chosen from:
  i) $C_1$-$C_{12}$ linear, $C_3$-$C_{12}$ branched, or $C_3$-$C_{12}$ cyclic alkyl, alkenyl, and alkynyl;
  ii) substituted or unsubstituted $C_6$ or $C_{10}$ aryl;
  iii) substituted or unsubstituted $C_6$ or $C_{10}$ alkylenearyl;
  iv) substituted or unsubstituted $C_1$-$C_9$ heterocyclic rings;
  v) substituted or unsubstituted $C_1$-$C_9$ heteroaryl rings;
  vi) —$(CR^{112a}R^{112b})_b OR^{111}$;
  vii) —$(CR^{112a}R^{112b})_b C(O)R^{111}$;
  viii) —$(CR^{112a}R^{112b})_b C(O)OR^{111}$;
  ix) —$(CR^{112a}R^{112b})_b C(O)N(R^{111})_2$;
  x) $(CR^{112a}R^{112b})_b N(R^{111})_2$;
  xi) halogen;
  xii) —$(CR^{112a}R^{112b})_b CN$;
  xiii) —$(CR^{112a}R^{112b})_b NO_2$;
  xiv) —$CH_j X_k$; wherein X is halogen, the index j is an integer from 0 to 2, j+k=3;
  xv) —$(CR^{112a}R^{112b})_b SR^{111}$;
  xvi) —$(CR^{112a}R^{112b})_b SO_2 R^{111}$; or
  xvii) —$(CR^{112a}R^{112b})_b SO_3 R^{111}$;

wherein each $R^{111}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{111}$ units can be taken together to form a ring comprising 3-7 atoms; $R^{112a}$ and $R^{112b}$ are each independently hydrogen or $C_1$-$C_4$ linear or $C_3$-$C_4$ branched alkyl; the index "b" is from 0 to 4.

D units are chosen from:
  i) substituted or unsubstituted $C_1$-$C_{20}$ linear alkylene, $C_3$-$C_{20}$ branched alkylene, or $C_3$-$C_{20}$ cyclic alkylene; for example, methylene ($C_1$), ethylene ($C_2$), n-propylene ($C_3$), n-butylene ($C_4$), n-pentylene ($C_5$), n-hexylene ($C_6$), n-heptylene ($C_2$), 3-methylhexylene ($C_2$), n-octylene ($C_8$), n-nonylene ($C_9$), n-decylene ($C_{10}$), and the like;
  ii) substituted or unsubstituted $C_2$-$C_{20}$ linear alkenylene, $C_3$-$C_{20}$ branched alkenylene, or $C_5$-$C_{20}$ cyclic alkenylene; for example, (E)-hept-3-enylene and (Z)-oct-2-enylene;
  iii) substituted or unsubstituted $C_2$-$C_{20}$ linear alkynylene or $C_3$-$C_{20}$ branched alkynylene;
  iv) substituted or unsubstituted polyoxyalkylene units;
  v) substituted or unsubstituted arylene; for example, 1,3-phenylene. 1,4-phenylene, 1,5-naphthylene
  vi) substituted or unsubstituted alkylenearylene; for example, a ($C_7$) unit having the formula:

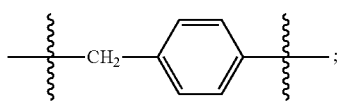

vii) substituted or unsubstituted alkylenearylalkylene; for example, a ($C_8$) unit having the formula:

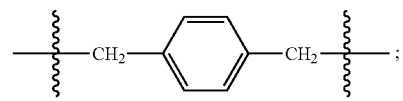

viii) substituted or unsubstituted heterocycylene; for example units having the formula:

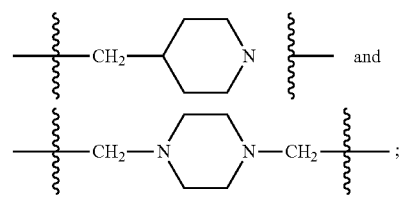

and
  ix) substituted or unsubstituted heteroarylene; for example units having the formula:

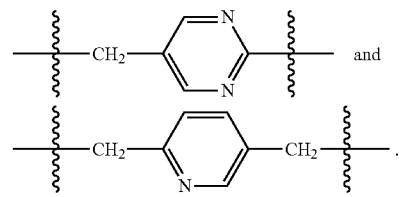

The substitutions for hydrogen atoms on D units are independently chosen from:
  i) $C_1$-$C_{12}$ linear, $C_3$-$C_{12}$ branched, or $C_3$-$C_{12}$ cyclic alkyl, alkenyl, and alkynyl;
  ii) substituted or unsubstituted $C_6$ or $C_{10}$ aryl;
  iii) substituted or unsubstituted $C_6$ or $C_{10}$ alkylenearyl;
  iv) substituted or unsubstituted $C_1$-$C_9$ heterocyclic rings;
  v) substituted or unsubstituted $C_1$-$C_9$ heteroaryl rings;
  vi) —$(CR^{122a}R^{122b})_c OR^{121}$;
  vii) —$(CR^{122a}R^{122b})_c C(O)R^{121}$;
  viii) —$(CR^{122a}R^{122})_c C(O)OR^{121}$;
  ix) —$(CR^{122a}R^{122})_c C(O)N(R^{121})_2$;
  x) —$(CR^{122a}R^{122b})_c N(R^{121})_2$;
  xi) halogen;
  xii) —$(CR^{102a}R^{122b})_c CN$;
  xiii) —$(CR^{102a}R^{122b})_c NO_2$;
  xiv) —$CH_j X_k$; wherein X is halogen, the index j is an integer from 0 to 2, j+k=3;
  xv) —$CR^{122a}R^{122b})_c SR^{121}$;
  xvi) —$(CR^{122a}R^{122b})_c SO_2 R^{121}$; or
  xvii) —$(CR^{122a}R^{122b})_c SO_3 R^{121}$;

wherein each $R^{121}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{121}$ units can be taken together to form a ring comprising 3-7 atoms; $R^{122a}$ and $R^{122b}$ are each independently hydrogen or $C_1$-$C_4$ linear or $C_3$-$C_4$ branched alkyl; the index "c" is from 0 to 4.

Diisocyanates

One aspect of the disclosed diisocyanates relates to W units comprising arylene units, having the formulae:

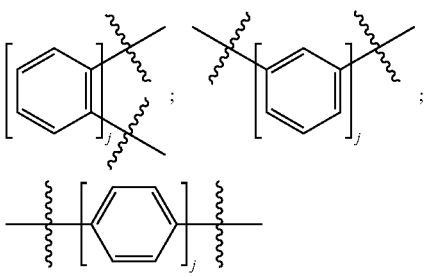

and mixtures thereof;
wherein the index j is from 1 to 10.

Non-limiting examples include:

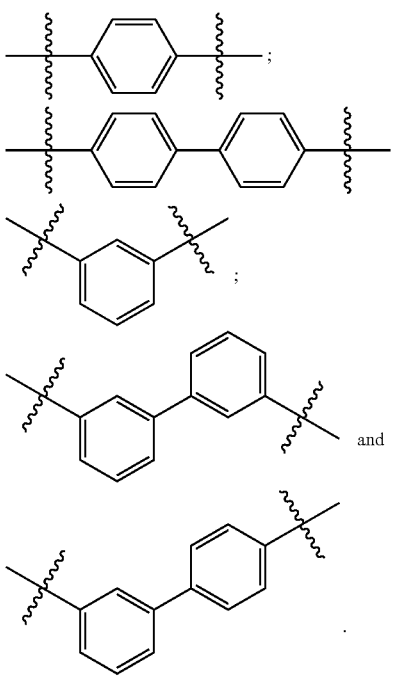

An embodiment of this aspect includes the aryl diisocyanates having the formula:

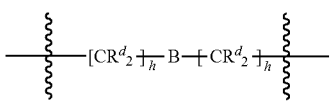

wherein B is a 1,2-substituted, 1,3-substituted, or 1,4-substituted aryl unit, for example, 1,4-substituted compounds having the formula:

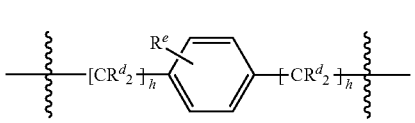

wherein each $R^d$ is independently hydrogen or methyl, $R^e$ represents from 1 to 4 substitutions for hydrogen as defined herein. Non-limiting examples of diisocyanates of this embodiment includes meta-tetramethylxylene diisocyanate, 2,4-diisocyanatotoluene, 2,5-diisocyanatotoluene, 3,5-diisocyanatotoluene, and the like.

Another aspect of diisocyanates relates to W units that comprise arylene and alkylenearylene units, for example, W units having the formula:

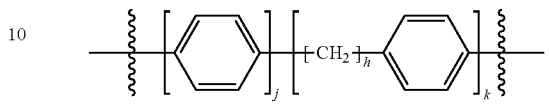

wherein the index h is from 1 to 10; and the indices j and k are each independently from 1 to 10. The following are non-limiting examples of this aspect:

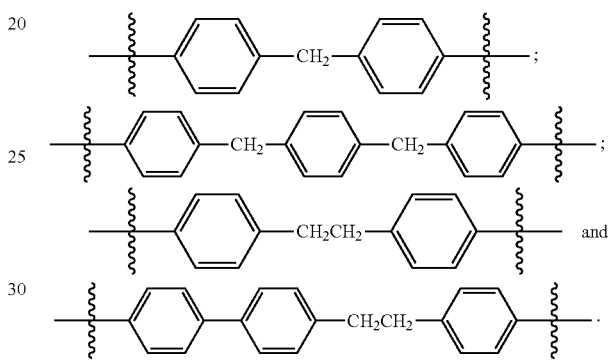

A further aspect of the disclosed diisocyanates relates to W units comprising $C_1$-$C_{20}$ linear alkylene or $C_3$-$C_{20}$ branched alkylene units, non-limiting examples having the formulae:

i) —$CH_2$—; (methylene)
ii) —$CH_2CH_2$—; (ethylene)
iii) —$CH_2CH_2CH_2$—; (propylene)
iv) —$CH_2CH_2CH_2CH_2$—; (butylylene)
v) —$CH_2CH(CH_3)$—; and (isopropylene)
vi) —$CH_2CH(CH_3)CH_2$—; (2-methylpropylene).

A yet further aspect of the disclosed diisocyanates relates to W units comprising $C_2$-$C_{20}$ linear alkenylene units, non-limiting examples having the formulae:

i) —CH═CH—; (ethenylene)
ii) —CH═CHCH$_2$—; and (prop-1-enylene)
iii) —$CH_2$CH═CHCH$_2$—(but-2-enylene).

A still further aspect of the disclosed diisocyanates relates to W units comprising $C_3$-$C_{20}$ cyclic alkenylene units, having the formulae:

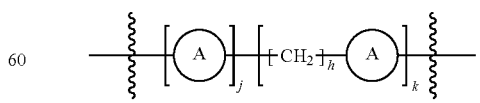

wherein A is a cycloalkyl ring having from 3 to 7 carbon atoms; the index h is from 1 to 10; and the indices j and k are each independently from 1 to 10. A first embodiment of this aspect relates to W units having the formula:

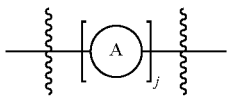

wherein A is a $C_3$-$C_6$ cycloalkylene and the index j is 1 or 2. Non-limiting examples of this embodiment have the formula:

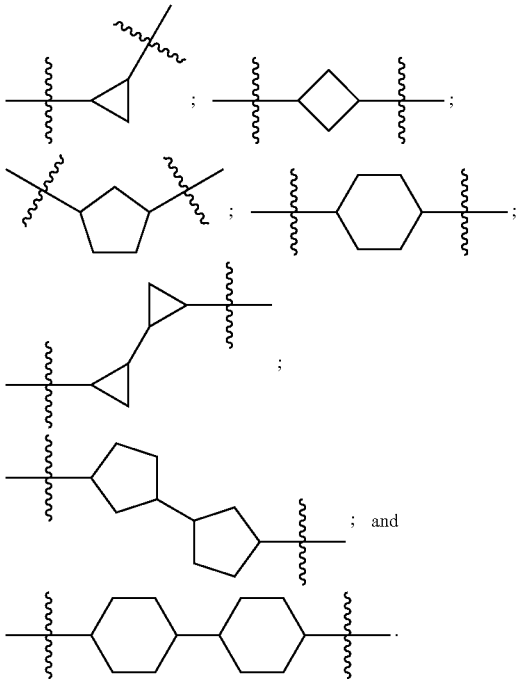

Another embodiment relates to W units having the formula:

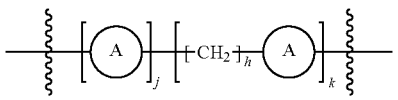

wherein A is a cyclohexyl ring. Non-limiting example have the formula:

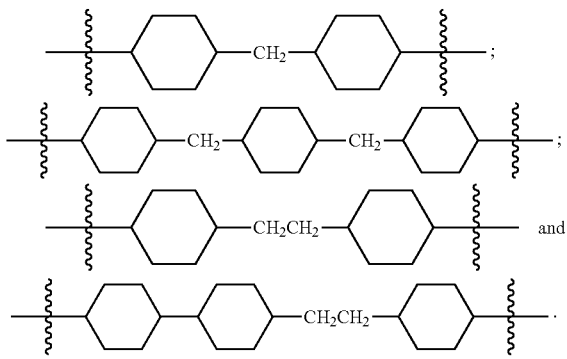

A further embodiment of this aspect relates to W units having the formula:

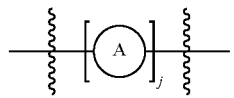

wherein A is a $C_3$-$C_6$ substituted cycloalkylene and the index j is 1 or 2. Non-limiting examples of this embodiment includes isophorone diisocyanate having the formula:

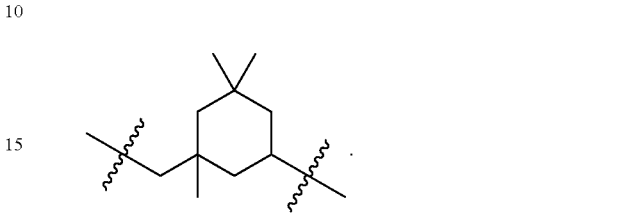

Diols

One aspect of the disclosed diols relates to D units comprising $C_1$-$C_{20}$ linear alkylene units, non-limiting examples having the formulae:
  i) —$CH_2$—; (methylene)
  ii) —$CH_2CH_2$—; (ethylene)
  iii) —$CH_2CH_2CH_2$—; (propylene)
  iv) —$CH_2CH_2CH_2CH_2$—; (butylylene)
  v) —$CH_2CH(CH_3)$—; and (isopropylene)
  vi) —$CH_2CH(CH_3)CH_2$—; (2-methylpropylene).

Another aspect of the disclosed diols relates to D units comprising polyoxyethylene units having the formula:

$$—(CH_2CH_2O)_sCH_2CH_2—$$

wherein the index s is from 1 to 200.

A further aspect of the disclosed diols relates to D units comprising polyoxypropylene units having the formula:

$$—(CH_2CH_2CH_2O)_sCH_2CH_2CH_2— \text{ or } —(CH_2CH(CH_3)O)_sCH_2CH(CH_3)—$$

wherein the index s is from 1 to 200.

A yet further aspect of the disclosed diols relates to D units comprising a mixture of polyoxyethylene and polyoxypropylene units having the formula:

$$—(CH_2CH_2O)_p(CH_2CH_2CH_2O)_q(CH_2CH_2O)_rCH_2CH_2—$$

wherein the indices p, q and r are each independently from 1 to 100.

A still further aspect of the disclosed diisocyanates relates to D units comprising $C_2$-$C_{20}$ linear alkenylene units, non-limiting examples having the formulae:
  i) —CH═CH—; (ethenylene)
  ii) —CH═CHCH$_2$—; and (prop-1-enylene)
  iii) —CH$_2$CH═CHCH$_2$—(but-2-enylene).

A still further aspect of the disclosed diols relates to D units comprising $C_3$-$C_{20}$ cyclic alkenylene units, having the formulae:

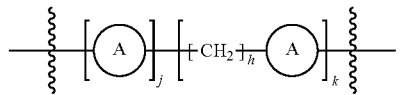

wherein A is a cycloalkyl ring having from 3 to 7 carbon atoms; the index h is from 1 to 10; and the indices j and k are each independently from 1 to 10. A first embodiment of this aspect relates to D units having the formula:

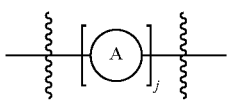

wherein A is a $C_3$-$C_6$ cycloalkylene and the index j is 1 or 2. Non-limiting examples of this embodiment have the formula:

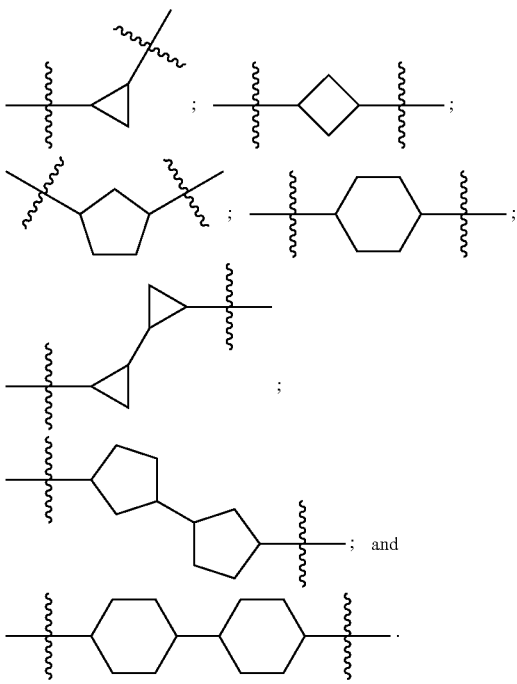

Another embodiment relates to D units having the formula:

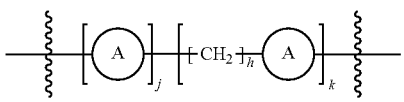

wherein A is a cyclohexyl ring. Non-limiting example have the formula:

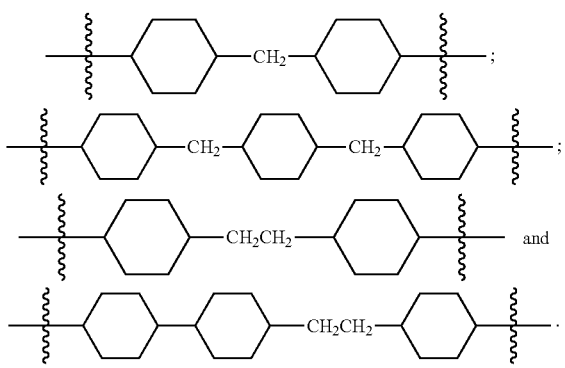

A further aspect of the disclosed polymers relates to thermoplastic polymers having backbones that comprise one or more ester forming monomers. Examples of suitable thermoplastic polymers according to this aspect includes homopolymers of lactic acid (polylactide, PLA) including all racemic and stereospecific forms of lactide, including, but not limited to, L-lactide, D-lactide, and D,L-lactide, or a mixture thereof, glycolic (polyglycolide, PGA), adipic acid and caprolactone (polycaprolactone, PCL). In addition, copolymers comprising esters, for example, poly(L-lactide), poly(D-lactide), and poly(DL-lactide); and poly(lactide-co-glycolide), including poly(L-lactide-co-glycolide), poly(D-lactide-co-glycolide), and poly(DL-lactide-co-glycolide); or copolymers, terpolymers, combinations, or blends thereof.

In one embodiment, the polymer is poly(lactide-co-glycolide), poly(lactide), or poly(glycolide) wherein the amount of lactide and glycolide in the polymer can vary. For example, the polymer can contain 0 to 100 mole %, 40 to 100 mole %, 50 to 100 mole %, 60 to 100 mole %, 70 to 100 mole %, or 80 to 100 mole % lactide and from 0 to 100 mole %, 0 to 60 mole %, 10 to 40 mole %, 20 to 40 mole %, or 30 to 40 mole % glycolide, wherein the amount of lactide and glycolide is 100 mole %. Non-limiting examples include poly(lactide), 95:5 poly(lactide-co-glycolide) 85:15 poly(lactide-co-glycolide), 75:25 poly(lactide-co-glycolide), 65:35 poly(lactide-co-glycolide), or 50:50 poly(lactide-co-glycolide), where the ratios are mole ratios.

In another embodiment, the polymer can be a poly(caprolactone) or a poly(lactide-co-caprolactone). In one iteration, the polymer can be a poly(lactide-caprolactone), for example, 95:5 poly(lactide-co-caprolactone), 85:15 poly(lactide-co-caprolactone), 75:25 poly(lactide-co-caprolactone), 65:35 poly(lactide-co-caprolactone), 50:50 poly(lactide-co-caprolactone), 40:60 poly(lactide-co-caprolactone), 25:75 poly(lactide-co-caprolactone), 10:90 poly(lactide-co-caprolactone), or 5:95 poly(lactide-co-caprolactone), where the ratios are mole ratios.

Further non-limiting examples of polymers that can comprise the disclosed polymer backbones include a poly(orthoester), a poly(phosphazene), a poly(hydroxybutyrate) or a copolymer containing a poly(hydroxybutyrate), a poly(lactide-co-caprolactone), a polycarbonate, a polyesteramide, a polyanhydride, a poly(dioxanone), a poly(alkylene alkylate), a copolymer of polyethylene glycol and a polyorthoester, a biodegradable polyurethane, a poly(amino acid), a polyamide, a polyesteramide, a polyetherester, a polyacetal, a polycyanoacrylate, a poly(oxyethylene)/poly(oxypropylene) copolymer, polyacetals, polyketals, polyphosphoesters, polyhydroxyvalerates or a copolymer containing a polyhydroxyvalerate, polyalkylene oxalates, polyalkylene succinates, poly(maleic acid), and copolymers, terpolymers, combinations, or blends thereof.

Crosslinkers

The disclosed shape memory polymers comprise at least one crosslinking agent. In general, the crosslinking agents have the formula:

$X[OC(O)R^3]_n$ or $X[NHC(O)R^3]_n$ wherein X is a unit having from 1 to 5000 carbon atoms, $R^3$ is unit having from 1 to 20 carbon atoms, and n is an integer from 2 to 6.

One category of crosslinkers relates to crosslinking agents having the formula:

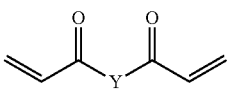

wherein Y is a linking unit having the formula:

—[Q]$_y$[[C(R$^{4a}$R$^{4b}$)]$_x$[Q$^1$]$_{y^1}$]$_m$[C(R$^{5a}$R$^{5b}$)]$_w$[Q$^2$]$_{y^2}$— each of Q, Q$^1$ and Q$^2$ are independently:
 i) —C(O)—;
 ii) —NH—;
 iii) —C(O)NH—;
 iv) —NHC(O)—;
 v) —NHC(O)NH—;
 vi) —NHC(O)O—;
 vii) —C(O)O—;
 viii) —C(O)NHC(O)—;
 ix) —O—;
 x) —S—;
 xi) —SO$_2$—;
 xii) —C(=NH)—;
 xiii) —C(=NH)NH—;
 xiv) —NHC(=NH)—; or
 xv) —NHC(=NH)NH—;
R$^{4a}$, R$^{4b}$, R$^{5a}$ and R$^{5b}$ are each independently:
 i) hydrogen;
 ii) hydroxy;
 iii) halogen; or
 iv) substituted or unsubstituted C$_1$-C$_6$ linear or C$_3$-C$_6$ branched alkyl; or the indices w and x are each independently from 0 to 500; the indices y, y$^1$ and y$^2$ are each independently 0 or 1; and the index m is from 0 to 500.

In some embodiment of this aspect, the index m is the summation of the values of sub-indices, for example, m is equal to m$^1$+m$^2$+m$^3$.

One aspect of this category relates to crosslinkers having two reactive moieties, i.e., two acrylate residues that can be used to incorporate the crosslinkers into the polymer backbones thereby crosslinking two linear backbone chains to form a network, said crosslinkers having the formula:

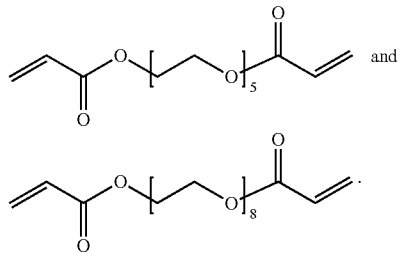

wherein the index m is from 1 to 150.

A non-limiting example of this aspect includes ethane-1, 2-diyl diacrylate having the formula:

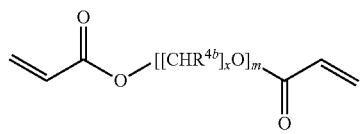

wherein the index m is equal to 1. Another example includes to diacrylate that can be formed from PEG 258 and two equivalents of acrylic acid having the formula:

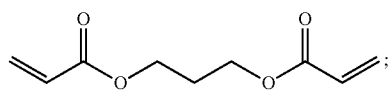

Further non-limiting examples of this aspect of crosslinkers includes:

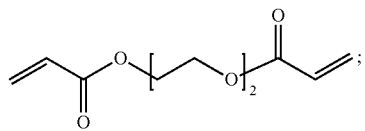

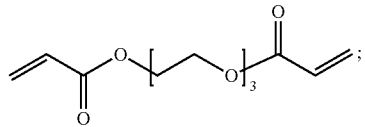

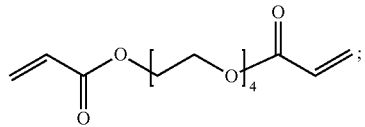

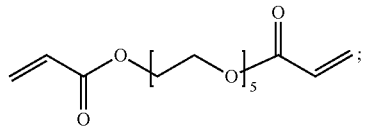

and

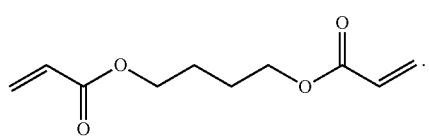

Another aspect of this category relates to crosslinking agents having the formula:

One embodiment of this aspect relates to crosslinking agents wherein each R$^{4b}$ is hydrogen, the index x is from 3 to 10, and the index m is equal to 1. Non-limiting examples of this embodiment include:
i) propane-1,3-diyl diacrylate and
ii) butane-1,4-diyl diacrylate Other non-limiting examples include pentane-1,5-diyl diacrylate, hexane-1,6-diyl diacrylate, heptane-1,7-diyl diacrylate, and octane-1,8-diyl diacrylate. In another iteration of this embodiment, the index m can be from 2 to 50. As such, for this embodiment m can be from 1 to 50.

Another embodiment of this aspect relates to crosslinking agents having the formula:

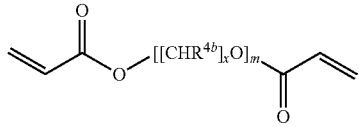

wherein each $R^{4b}$ is $C_1$-$C_{10}$ alkyl, the index x is from 2 to 10, and the index m is equal to 1. Non-limiting examples of this embodiment include:

i) propane-1,2-diyl diacrylate

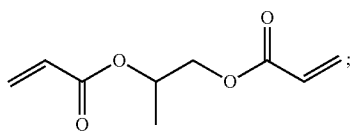

ii) butane-1,2-diyl diacrylate

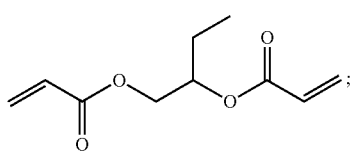

and
iii) butane-1,3-diyl diacrylate

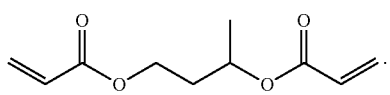

Other non-limiting examples include pentane-1,2-diyl diacrylate, hexane-1,6-diyl diacrylate, hexane-1,2-diyl diacrylate, heptane-1,2-diyl diacrylate, and octane-1,2-diyl diacrylate.

Another aspect of this category of crosslinking agents comprises agents having the formula:

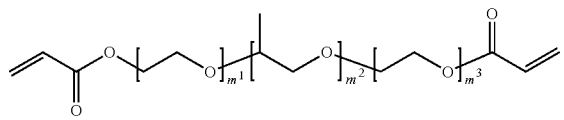

wherein $m^1+m^2+m^3=m$ and m is from 10 to 500. Linking groups of this aspect can be conveniently prepared from poloxamers and two equivalents of acrylic acid or an acrylic acid equivalent, for example acryloyl chloride. For example, Poloxamer 124 provides $m^1+m^3=12$ and $m^2=20$; Poloxamer 188 provides $m^1+m^3=80$ and $m^2=27$; Poloxamer 237 provides $m^1+m^3=64$ and $m^2=37$; Poloxamer 338 provides $m^1+m^3=141$ and $m^2=44$; and Poloxamer 407 provides $m^1+m^3=101$ and $m^2=56$.

A further aspect of this category relates to crosslinkers having the formula:

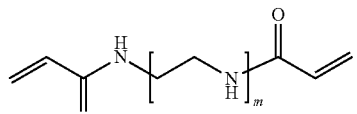

wherein the index m is from 1 to 150.

A non-limiting example of this aspect includes N,N'-(ethane-1,2-diyl)-diacrylamide having the formula:

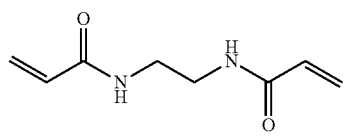

wherein the index m is equal to 1. Another example includes diacrylamides that can be formed from polyethyleneimines and two equivalents of acrylic acid having the formula:

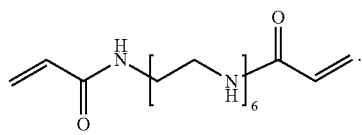

Further non-limiting examples of this aspect of crosslinkers includes:

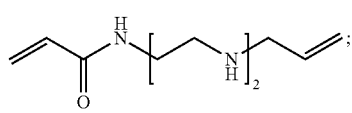

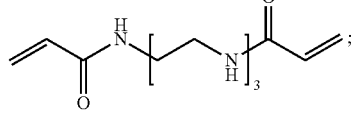

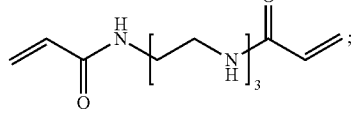

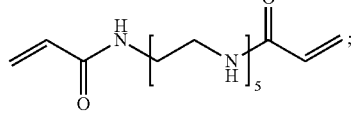

and

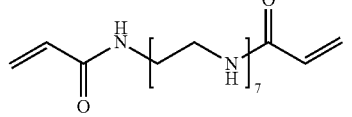

A further embodiment of this aspect relates to crosslinking agents having the formula:

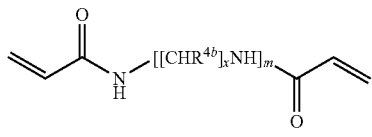

wherein each $R^{4b}$ is hydrogen, the index x is from 3 to 10, and the index m is equal to 1. Non-limiting examples of this iteration include:

i) N,N'-(propane-1,3-diyl)diacrylamide

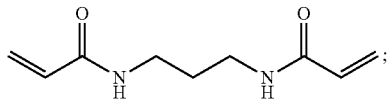

and iii) N,N'-(butane-1,4-diyl)diacrylamide

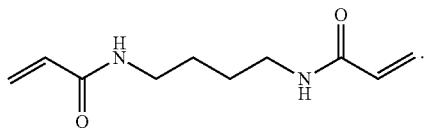

Other non-limiting examples include N,N'-(pentane-1,5-diyl)diacrylamide, N,N'-(hexane-1,2-diyl)diacrylamide, N,N'-(hexane-1,6-diyl)diacrylamide, N,N'-(heptane-1,7-diyl)diacryl-amide, and N,N'-(octane-1,8-diyl)diacrylamide. In another iteration of this embodiment, the index m can be from 2 to 50. As such, for this embodiment m can be from 1 to 50.

A still yet further aspect of this category relates to crosslinking agents having the formula:

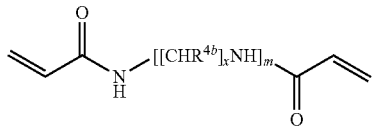

wherein each $R^{4b}$ is $C_1$-$C_{10}$ alkyl, the index x is from 2 to 10, and the index m is equal to 1.

Non-limiting examples of this aspect include:

i) N,N'-(propane-1,2-diyl)diacrylamide

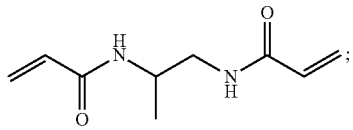

and ii) N,N'-(butane-1,2-diyl)diacrylamide

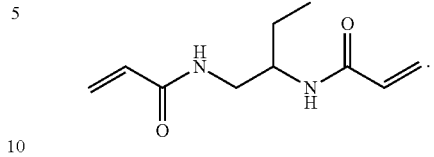

Other non-limiting examples include N,N'-(pentane-1,2-diyl)diacrylamide, N,N'-(pentane-1,3-diyl)diacrylamide, N,N'-(hexane-1,2-diyl)diacrylamide, N,N'-(heptane-1,2-diyl)diacrylamide, and N,N'-(octane-1,2-diyl)diacrylamide.

Another category of crosslinkers relates to crosslinking agents having the formula:

$$X[OC(O)R^3]_n \text{ or } X[NHC(O)R^3]_n$$

wherein X is a unit having the formula:

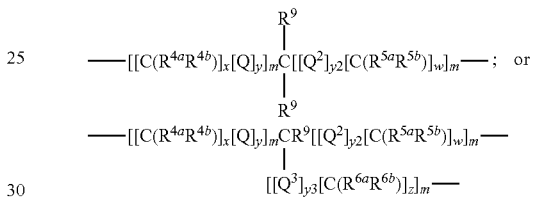

and the index n is 2, 3, or 4;

$Q$, $Q^2$ and $Q^3$ are each independently:
 i) —C(O)—;
 ii) —NH—;
 iii) —C(O)NH—;
 iv) —NHC(O)—;
 v) —NHC(O)NH—;
 vi) —NHC(O)O—;
 vii) —C(O)O—;
 viii) —C(O)NHC(O)—;
 ix) —O—;
 x) —S—;
 xi) —SO₂—;
 xii) —C(=NH)—;
 xiii) —C(=NH)NH—;
 xiv) —NHC(=NH)—; or
 xv) —NHC(=NH)NH—;

$R^{4a}$, $R^{4b}$, $R^{5a}$, $R^{5b}$, $R^{6a}$ and $R^{6b}$ are each independently:
 i) hydrogen;
 ii) hydroxy;
 iii) halogen; or
 iv) substituted or unsubstituted $C_1$-$C_6$ linear or $C_3$-$C_6$ branched alkyl; the indices w, x and z are each independently from 0 to 500; the index m in each occurrence is independently 0 or 500; the indices y, $y^2$ and $y^3$ are each independently 0 or 1;

$R^9$ is hydrogen or $C_1$-$C_{20}$ linear alkyl, $C_3$-$C_{20}$ branched alkyl or $C_3$-$C_{20}$ cyclic alkyl; or a unit having the formula:

$$-[[Q^4]_{y4}[C(R^{7a}R^{7b})]_t]_m-; \text{ or}$$

$$-[[Q^4]_{y4}[C(R^{7a}R^{7b})]_t]_m-CH=CH_2;$$

$R^{7a}$ and $R^{7b}$ are each independently hydrogen or $C_1$-$C_{20}$ linear alkyl; the index t is from 0 to 500.

One aspect of this category of linking agents relates to agents having the formula:

X[OC(O)R³]ₙ, wherein X has the formula:

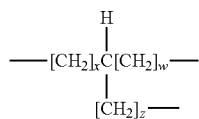

wherein the indices w, x and z are each independently from 1 to 10. Non-limiting examples of this embodiment include crosslinkers having the formula:

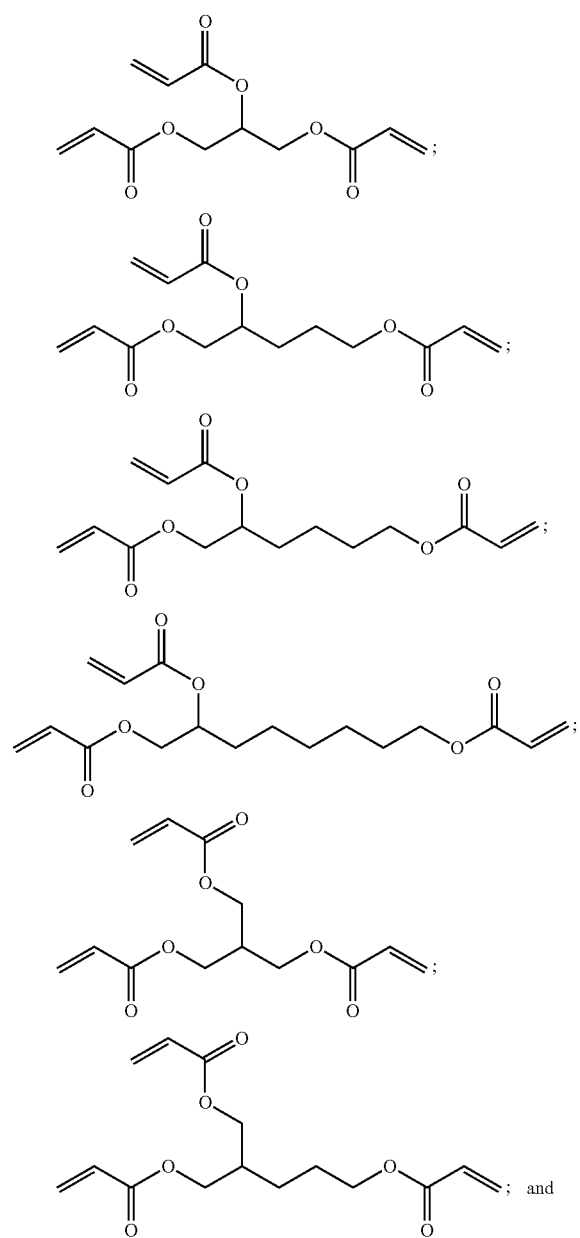
; and

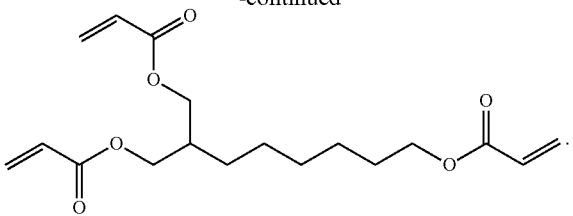

Another aspect of this category of linking agents relates to agents having the formula:

X[NHC(O)R³]ₙ wherein X has the formula:

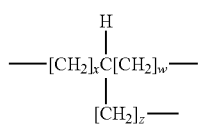

wherein the indices w, x and z are each independently from 1 to 10. Non-limiting examples of this embodiment include crosslinkers having the formula:

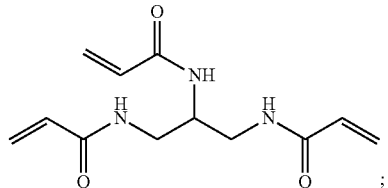

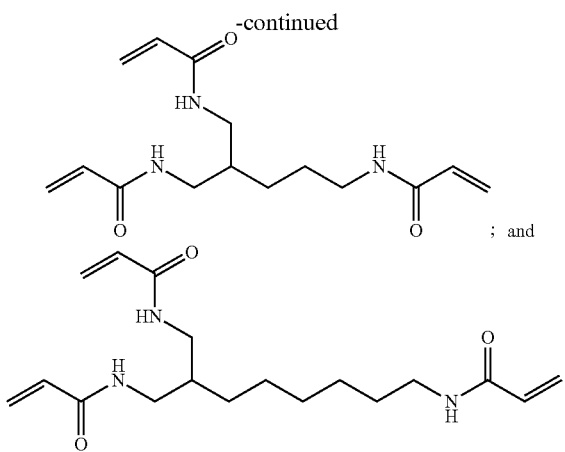
; and

A further aspect of this category of crosslinkers relates to compounds wherein X has the formula:

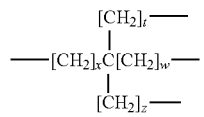

wherein the indices t, w, x and z are each independently from 1 to 10. Non-limiting examples of this embodiment include crosslinkers having the formula:

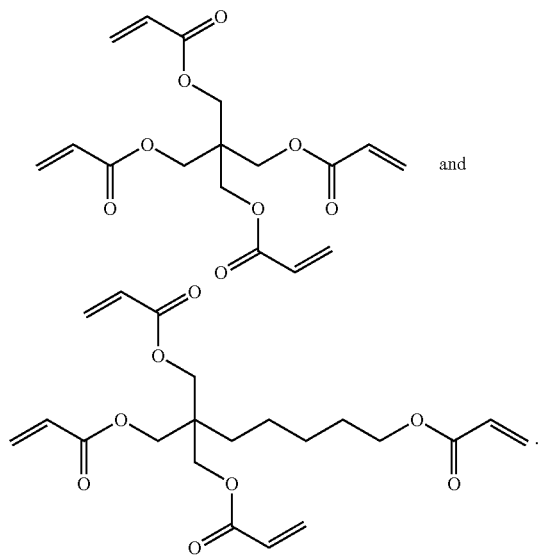

A still further aspect of this category of crosslinkers relates to compounds wherein X has the formula:

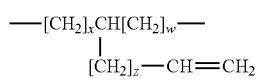

wherein the indices w, x and z are each independently from 1 to 10. Non-limiting examples of this embodiment include crosslinkers having the formula:

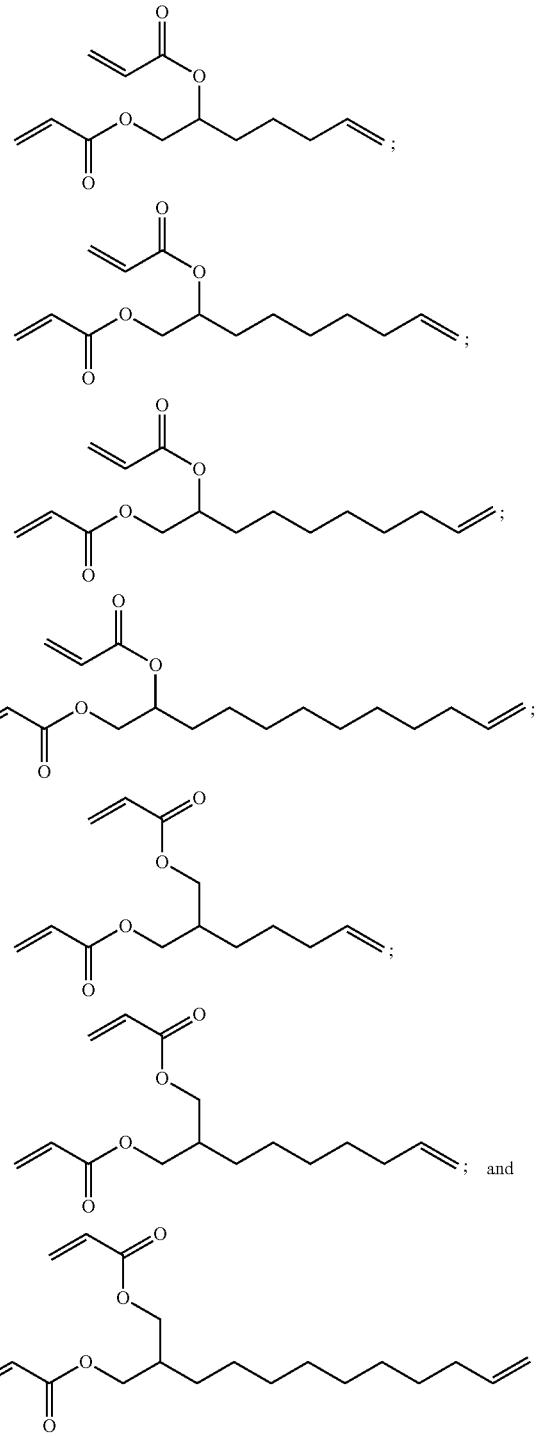

A yet further aspect of this category of crosslinkers relates to compounds wherein X has the formula:

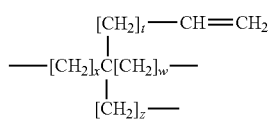

wherein the indices t, w, x and z are each independently from 1 to 10. Non-limiting examples of this embodiment include crosslinkers having the formula:

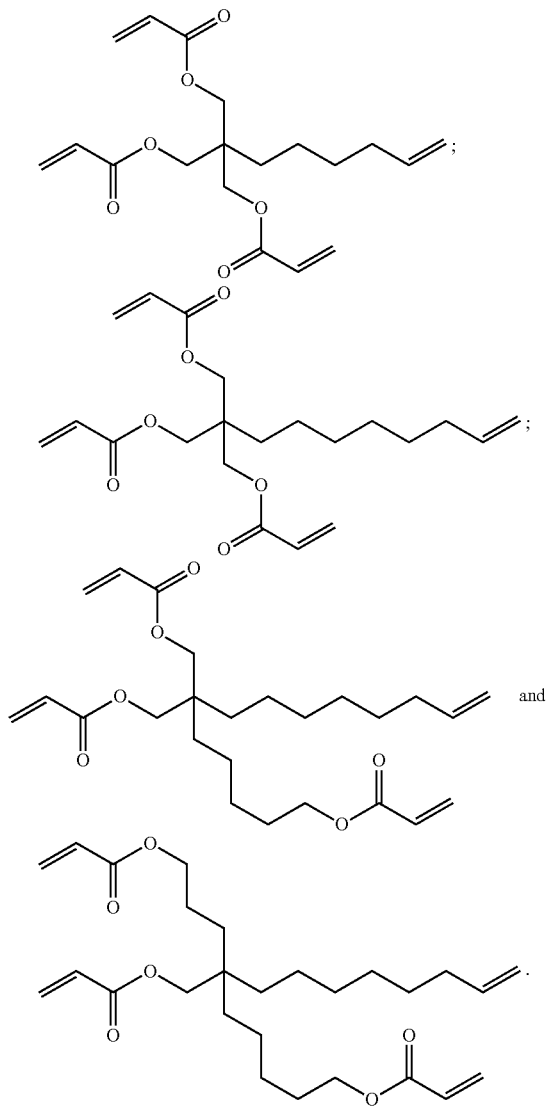

In addition to the crosslinkers specifically recited herein above, other compounds that are capable of crosslinking the disclosed backbones to provide a shape memory polymer as described herein are included. For example, tris allyl isocyanurate (1,3,5-triallyl-1,3,5-triazinane-2,4,6-trione, TAIC).

The disclosed polymers can comprise from about 1% to about 50% by weight of a crosslinker. In one embodiment, the disclosed polymers comprise from about 1% to about 35% by weight of a crosslinker. In another embodiment, the disclosed polymers comprise from about 5% to about 25% by weight of a crosslinker. The polymers can comprise any percentage by weight of a crosslinker from about 1% to about 50% by weight, for example, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, and 50% by weight of a crosslinker.

One embodiment of the disclosed polymers relates to copolymer backbones having the formula:

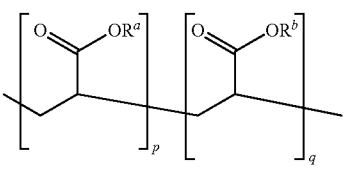

wherein $R^a$ and $R^b$ are chosen from the values of R disclosed herein above, the indices p and q when representing the mole fraction of each monomer comprising the copolymer, have the value p+q=1. The indices p and q when representing the weight % of each monomer comprising the copolymer, have the value p+q=100. For example, a copolymer comprising 65% by weight of ethyl acrylate (EA) having the formula:

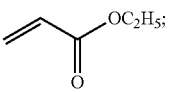

and
35% by weight of cyclopentyl acrylate (CpA) having the formula:

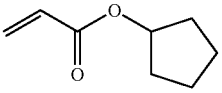

can be represented by the formula poly[(EA)$_{65}$(CpA)$_{35}$] or poly(EA-co-CpA)(65:35).

Process

The disclosed process relates to the preparation of shape memory polymers comprising thermoset polymers. One aspect of the disclosed process relates to curing a pre-thermoset admixture that has been optionally formed or processed into a configuration or shape, the admixture comprising:
  a) from about 50% to about 99.9% by weight of one or more thermoplastic polymers; and
  b) from about 0.1% to about 50% by weight of one or more crosslinkers;
wherein the resulting shape memory polymer has a glass transition temperature, $T_g$, of from about -40° C. to about 200° C., a rubbery modulus, $E_r$, of from about 0.01 MPa to about 100 MPa, and a gel fraction greater than 0.

Another aspect of the disclosed process relates to curing a pre-thermoset admixture that has been optionally formed or processed into a configuration or shape, the admixture comprising:
  a) from about 50% to about 99.9% by weight of a poly (methyl acrylate) thermoplastic polymer; and
  b) from about 0.1% to about 50% by weight of one or more crosslinkers;
wherein the resulting shape memory polymer has a glass transition temperature, $T_g$, of from about -40° C. to about 200° C., a rubbery modulus, $E_r$, of from about 0.01 MPa to about 100 MPa, and a gel fraction greater than 0.

One embodiment relates to pre-thermoset admixtures comprising from about 55% to about 99.9% by weight of one or more thermoplastic polymers. Another embodiment relates to pre-thermoset admixtures comprising from about 60% to about 99.9% by weight of one or more thermoplastic polymers.

A further embodiment relates to pre-thermoset admixtures comprising from about 70% to about 99.9% by weight of one or more thermoplastic polymers. A still further embodiment relates to pre-thermoset admixtures comprising from about 80% to about 99.9% by weight of one or more thermoplastic polymers. A yet another embodiment relates to pre-thermoset admixtures comprising from about 90% to about 99.9% by weight of one or more thermoplastic polymers. A yet further embodiment relates to pre-thermoset admixtures comprising from about 95% to about 99.9% by weight of one or more thermoplastic polymers. A still yet further embodiment relates to pre-thermoset admixtures comprising from about 90% to about 95% by weight of one or more thermoplastic polymers. A yet still another embodiment relates to pre-thermoset admixtures comprising from about 95% to about 99% by weight of one or more thermoplastic polymers. A still yet another embodiment relates to pre-thermoset admixtures comprising from about 85% to about 90% by weight of one or more thermoplastic polymers.

As it relates to the processes disclosed herein, the pre-thermoset admixtures can be cured by any method, such as but not limited to electron beam, gamma, or thermal, such that the resulting polymer has a gel fraction greater than 0. In one embodiment, pre-thermoset admixtures can be cured by irradiating with any dose of electron beam radiation from about 5 kiloGray (kGy) to about 300 kGy. As used herein the term kiloGray is the unit corresponding to the absorbed dose of radiation. The admixture can, however, be exposed to any dose of radiation chosen by the formulator in order to achieve the desired shape memory polymer properties, for example, 5 kGy, 6 kGy, 7 kGy, 8 kGy, 9 kGy, 10 kGy, 11 kGy, 12 kGy, 13 kGy, 14 kGy, 15 kGy, 16 kGy, 17 kGy, 18 kGy, 19 kGy, 20 kGy, 21 kGy, 22 kGy, 23 kGy, 24 kGy, 25 kGy, 26 kGy, 27 kGy, 28 kGy, 29 kGy, 30 kGy, 31 kGy, 32 kGy, 33 kGy, 34 kGy, 35 kGy, 36 kGy, 37 kGy, 38 kGy, 39 kGy, 40 kGy, 41 kGy, 42 kGy, 43 kGy, 44 kGy, 45 kGy, 46 kGy, 47 kGy, 48 kGy, 49 kGy, 50 kGy, 51 kGy, 52 kGy, 53 kGy, 54 kGy, 55 kGy, 56 kGy, 57 kGy, 58 kGy, 59 kGy, 60 kGy, 61 kGy, 62 kGy, 63 kGy, 64 kGy, 65 kGy, 66 kGy, 67 kGy, 68 kGy, 69 kGy, 70 kGy, 71 kGy, 72 kGy, 73 kGy, 74 kGy, 75 kGy, 76 kGy, 77 kGy, 78 kGy, 79 kGy, 80 kGy, 81 kGy, 82 kGy, 83 kGy, 84 kGy, 85 kGy, 86 kGy, 87 kGy, 88 kGy, 89 kGy, 90 kGy, 91 kGy, 92 kGy, 93 kGy, 94 kGy, 95 kGy, 96 kGy, 97 kGy, 98 kGy, 99 kGy, 100 kGy, 101 kGy, 102 kGy, 103 kGy, 104 kGy, 105 kGy, 106 kGy, 107 kGy, 108 kGy, 109 kGy, 110 kGy, 111 kGy, 112 kGy, 113 kGy, 114 kGy, 115 kGy, 116 kGy, 117 kGy, 118 kGy, 119 kGy, 120 kGy, 121 kGy, 122 kGy, 123 kGy, 124 kGy, 125 kGy, 126 kGy, 127 kGy, 128 kGy, 129 kGy, 130 kGy, 131 kGy, 132 kGy, 133 kGy, 134 kGy, 135 kGy, 136 kGy, 137 kGy, 138 kGy, 139 kGy, 140 kGy, 141 kGy, 142 kGy, 143 kGy, 144 kGy, 145 kGy, 146 kGy, 147 kGy, 148 kGy, 149 kGy, 150 kGy, 151 kGy, 152 kGy, 153 kGy, 154 kGy, 155 kGy, 156 kGy, 157 kGy, 158 kGy, 159 kGy, 160 kGy, 161 kGy, 162 kGy, 163 kGy, 164 kGy, 165 kGy, 166 kGy, 167 kGy, 168 kGy, 169 kGy, 170 kGy, 171 kGy, 172 kGy, 173 kGy, 174 kGy, 175 kGy, 176 kGy, 177 kGy, 178 kGy, 179 kGy, 180 kGy, 181 kGy, 182 kGy, 183 kGy, 184 kGy, 185 kGy, 186 kGy, 187 kGy, 188 kGy, 189 kGy, 190 kGy, 191 kGy, 192 kGy, 193 kGy, 194 kGy, 195 kGy, 196 kGy, 197 kGy, 198 kGy, 199 kGy, and 200 kGy, or any fractional part thereof.

Pre-Thermoset Admixture

The disclosed process relates to curing a pre-thermoset admixture until the gel fraction is greater than 0. In the broadest sense, the pre-thermoset admixture is a homogeneous admixture of an essentially non-scissionable thermoplastic polymer and at least one compound capable of forming crosslinks between the thermoplastic polymer chains such that after curing a thermoset polymer results.

A "non-scissionable thermoplastic polymer" is defined herein as a substantially thermoplastic polymer wherein at least about 50% of the polymer chains are not broken or fractured during curing. In one aspect of the disclosed process at least about 75% of the polymer chains are not broken or fractured during curing. In another aspect of the disclosed process at least about 85% of the polymer chains are not broken or fractured during curing. In a further aspect of the disclosed process at least about 90% of the polymer chains are not broken or fractured during curing. In a still further aspect of the disclosed process at least about 95% of the polymer chains are not broken or fractured during curing.

The essentially non-scissionable thermoplastic polymer or combination of one or more essentially non-scissionable thermoplastic polymers can comprise a monomer or combination of monomers that provide a final thermoset shape memory polymer as defined and described herein. Non-limiting examples of monomers that can be used to form the essentially non-scissionable thermoplastic polymers are described herein below. The thermoplastic polymers can be homopolymers, i.e., comprising a single monomer or copolymers of two or more monomers.

Mixing is an essential operation for obtaining a homogeneous pre-thermoset admixture. In order to convert the thermoplastic polymer and two or more crosslinkers into a pre-thermoset admixture suitable for radiation curing, these ingredients must be properly combined at some point in a manufacturing process. A large mixing tank can be conveniently used to combine the substances. In order to assure proper mixing without over-mixing, the density and viscosity of the admixture can be measured and analyzed throughout the process. The density of the final mixture can be calculated by the formulator ahead of time by conducting "pilot runs" and the density is related directly to the mixture's viscosity. By measuring the torque of a mixing device's shaft, the viscosity of the mixture can be determined. As the components of the admixture combine over time, the torque of the mixer shaft gradually changes. Using this simple measurement of the torque, the formulator can determine when an admixture is ready for the next stage of the manufacturing process, whether and optional step, i.e., shaping, molding, and the like, or final radiation curing.

The disclosed pre-thermoset admixtures are essentially homogeneous admixtures in that the one or more crosslinkers are evenly dispersed within the thermoplastic polymer. In a first embodiment, the pre-thermoset admixture can be prepared by adding the two ingredients in any order, for example, the two or more crosslinkers can be added to the thermoplastic polymer or the polymer can be added to the two or more crosslinkers. Alternatively, the polymer and crosslinkers can be added together all at once. Once combined, the components are stirred by a conventional mixer fitted with a means for measuring the torque of the mixer. In one iteration of the this embodiment the mixing is continued until a point wherein the change in the torque as measured by a device is less than about 10% change per minute. In another iteration of this embodiment the mixing is continued until a point wherein the change in the torque as measured is less than about 5% change in torque per minute. In further iteration of this embodiment the mixing is continued until a point wherein the change in the torque as measured is less than about 1% change in torque per minute. In a still further iteration of this embodiment the mixing is continued until a point wherein the torque as measured is constant for at least one minute.

A further method for measuring the efficiency of mixing or the homogeneity is a colorimetric method. One common method is dye decolorization. The entire contents of the mixing vessel are colored using one chemical, and then a second chemical is added that removes the color. A poorly mixed region stands out as a pocket of color after the rest of the vessel has cleared. This technique is well known in the art.

As it relates to the disclosed polymers, the greater the homogeneity, i.e., the more thoroughly and evenly the one or more crosslinking agents are dispersed in the thermoplastic polymer, the greater the precision that is available to the formulator for controlling the properties of the final thermoset shape memory polymer. As described herein above, the degree of homogeneity can be determined by measuring the torque of a mixing device. For example, strain gauges that are mounted on a mixer shaft is one method for measuring torque. In addition, there are a number of commercially available torque measuring devices.

Another aspect of the disclosed processes relates to curing a pre-thermoset admixture that has been formed or processed into a configuration, the admixture comprising:
a) from about 50% to about 99.89% by weight of a thermoplastic polymer;
b) from about 0.1% to about 50% by weight of one or more crosslinkers; and
c) from about 0.01% to about 5% by weight of one or more initiators.

wherein the resulting shape memory polymer has a glass transition temperature, $T_g$, of from about −40° C. to about 200° C., a rubbery modulus, $E_r$, of from about 0.01 MPa to about 100 MPa, and a gel fraction greater than 0.

In a similar manner, about 0.01% to about 5% by weight of one or more initiators may be added to any of the other aforementioned embodiments to enhance the process.

The initiators can be any chosen by the formulator that results in the formation of a thermoset shape memory polymer as disclosed herein. In one aspect, the initiator can be a photoinitiator. One type of photoinitiator undergoes a unimolecular bond cleavage upon irradiation with ultraviolet light to yield free radicals. Another type of photoinitiator undergoes a bimolecular reaction wherein the excited state of the photoinitiator interacts with a second molecule (a co-initiator) to generate free radicals.

Non-limiting examples of initiators include acetophenone; anisoin; anthraquinone; anthraquinone-2-sulfonic acid, sodium salt monohydrate; (benzene) tricarbonylchromium; benzil; benzoin; benzoin ethyl ether; benzoin isobutyl ether; benzoin methyl ether; benzophenone; 3,3',4,4'-benzophenonetetracarboxylic dianhydride; 4-benzoylbiphenyl; 2-benzyl-2-(dimethylamino)-4'-morpholinobutyrophenone; 4,4'-bis(diethylamino)-benzophenone; 4,4'-bis(dimethylamino) benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethyl-benzoyl) phosphine oxide; 4'-ethoxyacetophenone; 2-ethylanthraquinone; ferrocene; 3'-hydroxyacetophenone; 4'-hydroxyacetophenone; 3-hydroxybenzophenone; 4-hydroxy-benzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2-morpholinopropiophenone; phenanthrenequinone; 4'-phenoxyacetophenone; and thioxanthen-9-one. In one embodiment of this aspect, the initiator is 2,2-dimethoxy-2-phenylacetophenone (DMPA).

A further aspect of the disclosed process relates to a process for preparing a shape memory polymer, comprising:
a) combining methyl acrylate monomers and optionally combining an initiator to form an admixture and polymerizing the admixture to form a thermoplastic polymer;
b) combining the thermoplastic polymer formed in step (a) with one or more crosslinkers and mixing to form a pre-thermoset admixture;
c) optionally processing the admixture into a shape or form; and
d) curing the admixture;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

A still further aspect of the disclosed process relates to a process for preparing a shape memory polymer, comprising:
a) combining two or more monomers and optionally combining an initiator to form an admixture and polymerizing the admixture to form one or more thermoplastic polymers;
b) combining the thermoplastic polymers formed in step (a) with one or more crosslinkers and mixing to form a pre-thermoset admixture;
c) optionally processing the admixture into a shape or form; and
d) curing the admixture;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

Step (a) of this aspect relates to combining two or more monomers as disclosed herein to form an admixture and curing the admixture to form one or more thermoplastic polymers. The thus formed thermoplastic polymers will constitute the backbones of the thermoplastic shape memory polymer.

Step (a) can further comprise combining with the two or more monomers an initiator. The initiator can be any that is chosen by the formulator, for example, a free radical initiator. In one iteration, step (a) comprises adding a photoinitiator, for example, 2,2-dimethoxy-2-phenylacetophenone. The photoinitiator, however, can be any photoinitiator chosen by the formulator that is compatible with the disclosed process. A non-limiting example of a suitable initiator is 2,2-dimethoxy-2-phenylacetophenone that affords means for curing the admixture of step (a) using ultraviolet radiation at about 365 nm. In one embodiment, the curing can be accomplished using microwave radiation. In another embodiment, the curing can be accomplished by a radiation process, for example, utilizing short wavelength ultraviolet light (UV) or high energy electrons from electron beams (EB). Any method of curing can be combined with an optionally present initiator.

The formulator, however, can use any initiator that is compatible with the disclosed process, for example, azobisisobutyronitrile (AIBN).

In one embodiment of this aspect, step (a) comprises admixing together with an optionally present initiator:
i) from about 0% to about 99.9% by weight of an acrylate monomer wherein R is $C_1$-$C_2$ alkyl;
ii) from about 0% to about 99.9% by weight of an acrylate monomer wherein R is a $C_3$-$C_8$ linear alkyl; and iii) from about 0% to about 99.9% by weight of an acrylate monomer wherein R is a $C_5$-$C_{20}$ bicyclic alkyl.

A non-limiting iteration of this embodiment relates to admixing together the following to form an admixture:
i) from about 0% to about 99.9% by weight of butyl acrylate;
ii) from about 0% to about 99.9% by weight of methyl acrylate; and
iii) from about 0% to about 99.9% by weight of isobornyl acrylate.

A further embodiment of this aspect relates to admixing together with an optionally present initiator:
i) from about 0% to about 99.9% by weight of an acrylate monomer wherein R is $C_1$-$C_2$ alkyl; and
ii) from about 0% to about 99.9% by weight of an acrylate monomer wherein R is a $C_3$-$C_8$ linear alkyl.

Another embodiment of this aspect relates to admixing together with an optionally present initiator:
i) from about 0% to about 99.9% by weight of an acrylate monomer wherein R is $C_1$-$C_2$ alkyl; and
ii) from about 0% to about 99.9% by weight of an acrylate monomer wherein R is a $C_5$-$C_{20}$ bicyclic alkyl.

By adjusting the duration of thermoplastic polymerization, the copolymer backbone formed in step (a) can have any molecular weight desired by the formulator. In one embodiment, the copolymer backbone has an average molecular weight greater than about 20,000 Daltons. In one embodiment, the average molecular weight of the disclosed shape memory polymers is from about 40,000 Daltons to about 65,000 Daltons. In another embodiment, the average molecular weight of the disclosed shape memory polymers is from about 40,000 Daltons to about 50,000 Daltons. In another embodiment, the average molecular weight of the disclosed shape memory polymers is from about 200,000 Daltons to about 5,000,000 Daltons. In another embodiment, the average molecular weight of the disclosed shape memory polymers is greater than 4,000,000 Daltons. In a further embodiment, the average molecular weight of the disclosed shape memory polymers is from about 100,000 Daltons to about 1,000,000 Daltons. In a still further embodiment, the average molecular weight of the disclosed shape memory polymers is from about 400,000 Daltons to about 750,000 Daltons.

In another embodiment step (a) relates to dissolving or dispersing two or more of the disclosed monomers in a solvent to form a solution. The term "solution" as used herein can refer to either a dispersion of the two or more monomers in one solvent or a dispersion of the two or more monomers in one or more solvents. Once dispersed or dissolved in the one or more solvents, the solution can be cured by any method chosen by the formulator to form the thermoplastic polymer that is combined with a crosslinker in step (b). When one or more solvents are used in step (a) the formulator can remove the solvent prior to forming the pre-thermoset admixture in step (b) or the solvent can be carried forward in the process and removed at a later step.

The following are non-limiting examples of solvents suitable for use in step (a) of this aspect of the disclosed process: halogenated solvents, for example, dichloromethane, dichloroethane, 1,1,1-trichloroethane, carbon tetrachloride, and chloroform; aromatic hydrocarbons, for example, benzene, toluene, and xylene; hydrocarbons, for example, pentane, isopentane, hexane, heptane, octane, and isooctane; ethers, for example, tetrahydrofuran (THF), diethyl ether, and methyl tert-butyl ether; ketones, for example, acetone, and methyl ethyl ketone; alcohols, for example, methanol, ethanol, propanol, isopropanol, butanol, pentanol, and hexanol; acetonitrile, methyl acetate, ethyl acetate, nitroethane, nitromethane, dimethylsulfoxide, dimethylformamide, diethylformamide, dimethylacetamide, diethylacetamide, glyme, diglyme, and the like. When step (a) is conducted under cryogenic or critical phase conditions, solvents such as carbon dioxide can be used as a solvent and carried forward in the process, especially in the instances wherein optional step (c) produces a foam or a gas is used in the processing of the pre-thermoset admixture.

Step (b) relates to combining the thermoplastic polymer formed in step (a) with one or more of the disclosed crosslinkers and mixing to form a pre-thermoset admixture. The pre-thermoset admixture is prepared as described herein above. In one embodiment, the one or more thermoplastic polymers and the one or more crosslinkers are combined in a melt that is mixed. For the purposes of the present disclosure the terms "mix" or "mixing" refer to combining the one or more thermoplastic polymers and the one or more crosslinkers in any manner chosen by the formulator to achieve homogeneity. As disclosed herein above, the formulator can use any means for mixing, i.e., propeller blades, screws, and the like. In addition, heating the ingredients either as a melt or as a solution can also be used to achieve adequate mixing. The formulator, however, can combine the ingredients in step (b) in any manner and to any degree suitable for the processing equipment that is utilized.

Step (c) is an optional step wherein the pre-thermoset admixture is processed into a shape, for example, into a functional form. The shape, dimensions and utility of the functional form are not limited by the present process. For example, the pre-thermoset admixture can be formed into helix, spring-shaped or cork-screw form and then cured as described in step (d). The spring or cork-screw shape can be elongated by the user when the functional form is being applied or otherwise used after which the polymer returns to its original shape.

The optional shaping or forming of the shape memory polymers can be done by any method or means desired by the formulator prior to radiation curing. The following are non-limiting examples.

Injection Molding

In one embodiment, the pre-thermoset admixture is cryogenically pelletized, lubricated and fed into an injection molder, for example, a screw-driven injection molder that can heat and pressurize the material and form it into a custom cavity. In one iteration, the custom cavity is cooled to a temperature determined by the formulator which is compatible with the glass transition temperature of the final polymer. In addition, spring loaded pins can be used to help remove the shaped-polymer from the mold after which further processing can continue if desired. The formulator will understand that a variety of other injection molding techniques are available in which the initial feeding mechanism does not require pellets, but can be fed in as a spun fiber or sheet.

Blow Molding

The disclosed pre-thermoset admixture can also be processed by blow molding wherein the pre-shaped pre-thermoset admixture is heated, air or gas is used to form the material around an air or gas pocket typically up against the walls of a cavity. The pressure is held until the pre-thermoset admixture cools. Other forms of blow molding which are possible with this technique include extrusion blow molding, injection blow molding and stretch blow molding.

Transfer Molding

The disclosed pre-thermoset admixture can also be processed by one or more transfer molding processes known to the artisan, for example, resin transfer molding, and vacuum-assisted resin transfer molding. In one use, an amount of molding material (e.g. a fabric, or piece of thermoset material) is measured and inserted into the mold, before molding takes place. In one embodiment, shaped fabrics, such as nylon-like embodiments of the disclosed pre-thermoset admixture, are aligned in a mold and a vacuum system is used to draw a heated pre-thermoset admixture about the fabric to minimize bubbles and surface imperfections.

Foaming

The artisan can further process the disclosed pre-thermoset admixture into a foam typically by combining the pre-thermoset admixture with a blowing agent. The blowing agent evolves gas as a result of a stimulus, typically temperature. The gas evolution occurs when the pre-thermoset admixture is in a state wherein flow can occur readily. During the evolution of the gas the pre-thermoset admixture is expanded into a less that 100% dense state. This state is maintained by cooling the pre-thermoset admixture to temperatures where the foam microstructure is meta-stable.

Supercritical Foaming

On specific type of foaming that can be used to shape the disclosed pre-thermoset admixture is supercritical foaming In one embodiment a pre-thermoset admixture is expanded using the inherent change in volume associated with the transformation of a supercritical liquid to a gas. Supercritical liquids, such as carbon dioxide, are good solvents of many polymers. As the polymer is immersed in a supercritical liquid for sufficient time the polymer swells with the supercritical liquid and becomes plasticized. Upon changing the state of the system (temperature or pressure) the supercritical liquid nucleates gas bubbles expanding the pre-thermoset admixture resulting in an expanded polymer foam.

Fiber Drawing

Fiber drawing can also be used to form the pre-thermoset admixture into desired shapes. As such, a pre-thermoset admixture fiber is typically extruded from a pre-thermoset admixture melt or solution. As the fiber is extruded the pre-thermoset admixture cools from the melt state or alternatively dries from the solution. This drying or cooling puts the pre-thermoset admixture in the meta-stable shape of a fiber. This fiber is then often collected on a spinning wheel.

Electrospinning

Further the formulator can employ electrospinning to process the pre-thermoset admixture. The pre-thermoset admixture fiber is drawn from a pre-thermoset admixture melt or solution using an applied voltage. The applied voltage charges the liquid which opposes the surface tension of the droplet thus elongating the droplet. With sufficient molecular cohesion a continuous fiber can be drawn from the melt or solution. The technique generally produces fibers on the micro- or nano-scale. The fibers can then be collected in its cooled solvent free (meta)stable shape.

Extrusion

The disclosed pre-thermoset admixture can also be processed by extrusion wherein the pre-thermoset admixture is fed into a cavity and compressed by one or more screws. As the pre-thermoset admixture travels along the screw it is homogenized, compressed and enters the melt state. At the end of the screw the pre-thermoset admixture is forced through a die bestowing upon the pre-thermoset admixture leaving the die a shape with a constant cross-section. The exiting pre-thermoset admixture can cool directly in the air or be cooled by water or other cooling fluids.

Thus processed, the pre-thermoset admixtures can be cured, for example by ionizing radiation, to form a processed thermoset shape memory polymer.

The final step, i.e., step (d) when optional step (c) is present, relates to curing the pre-thermoset admixture. The admixture obtained in step (b) can be directly cured to obtain a shape memory polymer having the bulk shape of the curing vessel. The admixture obtained in step (b) can be cured by any means such that the gel fraction of the resulting thermoset polymer is greater than 0. In one embodiment, curing is accomplished with a source of radiation chosen by the formulator, for example, electron beam (e-beam) irradiation.

The shape memory polymers obtained by the disclosed methods can be lubricated prior to shaping or forming in optional step (c). When a lubricant is present, the lubricant can be incorporated into the shape memory polymer after step (d) of the various aspects and embodiments thereof. In one embodiment, the lubricant can be sprayed onto the shape memory polymer. In another embodiment, the lubricant can be incorporated into the shaping or molding step. Non-limiting examples of suitable lubricants include silicone compounds and metallic stearates. The lubricants assist in the release of the cured polymers from their molds if molded in optional step (c).

As disclosed herein above, the various properties of the final thermoset shape memory polymers, inter alia, the glass transition temperature, $T_g$, the rubbery modulus, $E_r$, the gel fraction and the like are all tunable. The level of precision that can be obtained in determining the final properties of the polymers is related to several variables. When the pre-thermoset polymer admixture is as nearly homogeneous as possible, the level of precision in tuning the final polymer properties is maximized.

The properties of the disclosed thermoset shape memory polymers are tunable. For example, the glass transition temperature, $T_g$; rubbery modulus, $E_r$; strain to failure, $\epsilon$; stress, $\sigma$, and the gel fraction can all be adjusted or "tuned" by utilizing the parameters disclosed herein. For example, the final properties of the shape memory polymer are affected by the choice of one or more of the following; linear monomer, the amount of crosslinker, initial molecular weight of the one or more thermoplastic polymer precursors, the choice of one or more crosslinkers, and the dose and dose rate of radiation that is used to cure the pre-thermoset admixture.

The disclosed shape memory polymers can be tuned to have the desired properties by iteratively manipulating the following variables: choice of thermoplastic polymer, choice of thermoplastic polymer molecular weight, choice of crosslinker, amount of crosslinker used, and amount of radiation used to crosslink the pre-thermoset admixture. For example, the choice of thermoplastic polymer and the molecular weight of the thermoplastic polymer will allow the formulator to target a desirable glass transition temperature range.

Glass Transition Temperature, $T_g$

Disclosed herein is a process for preparing shape memory polymer having a glass transition temperature, $T_g$, of from about −40° C. to about 200° C. In one embodiment, the glass transition temperature, $T_g$, is from about 0° C. to about 200° C. In a further embodiment, the glass transition temperature, $T_g$, is from about 0° C. to about 100° C. In as still further embodiment, the glass transition temperature, $T_g$, is from about 10° C. to about 70° C. The disclosed shape memory polymers, however, can have a glass transition temperature at any value from about −40° C. to about 200° C., for example, 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., and 100° C. In addition, the glass transition temperature can be any fractional amount thereof, for example, 16.2° C., 32.05° C., 59.44° C., and 88.7° C.

The glass transition temperature, $T_g$, of a particular polymer can be approximated beforehand by the Fox formula (T. G. Fox, *Bull. Am. Phys. Soc.*, vol. 1 123 (1956) included herein by reference):

$$\frac{1}{T_{Co}} = \frac{W_1}{T_1} + \frac{W_2}{T_2} + \ldots \frac{W_n}{T_n}$$

wherein $W_1$ represents the weight portion of monomer 1, $W_2$ represents the weight portion of monomer 2, $T_1$ is the glass transition temperature of the polymerized monomer 1 in degrees Kelvin, $T_2$ is the glass transition temperature of the polymerized monomer 2 in degrees Kelvin, $T_{Co}$ is the glass transition temperature of the resultant thermoplastic polymer in degrees Kelvin. The final glass transition temperature, however, can be affected by the choice of crosslinker and the amount of radiation used to cure the pre-thermoset admixture and the presence of any other ingredients.

Without wishing to be limited by theory FIG. 1 indicates that the number of α-hydrogen atoms in a monomer can be used by the formulator to assist in determining the final $T_g$ of a disclosed shape memory polymer. For example, the crosslinker 4-tert-butylcyclohexyl acrylate (solid triangles (▲)) contains two α-hydrogen atoms while methyl acrylate (solid circles (●)) contains three α-hydrogen atoms and 2-carboxyethyl acrylate (open squares (□)) has 4 α-hydrogens. Increased gel fraction is observed with an increase in the number of α-hydrogens in the monomer for a particular radiation dose.

Table I below provides examples of the resulting glass transition temperatures, $T_g$ (° C.), for thermoset shape memory polymers comprising a 70:30 composition of methyl acrylate and various other monomers wherein each of the resulting polymers are crosslinked with 9% by weight of trimethylolpropane triacrylate (TMPTA) at radiation doses of 5, 50 and 300 kGy.

TABLE I

| Linear Polymer | 5 kGy | 50 kGy | 300 kGy |
|---|---|---|---|
| methyl acrylate/isobornylacrylate | 52.2 | 55.6 | 52.2 |
| methyl acrylate/4-tert-butylcyclohexyl acrylate | 47.0 | 59.8 | 51.4 |
| methyl acrylate/N-isopropyl acrylamide | 61.3 | 69.2 | 67.2 |
| methyl acrylate/4-acryloylmorpholine | 61.6 | 68.6 | 61.2 |
| methyl acrylate/2-carboxyethyl acrylate | 32.1 | 34.7 | 30.1 |

As can be seen from the data in Table I, the highest $T_g$ is obtained when 50 kGy is used for the radiation curing. The formulator can therefore prepare a grid, curve or table of glass transition temperatures obtained for a single polymer backbone over various radiation doses in order to precisely tune the final $T_g$.

Rubbery Modulus

The disclosed shape memory polymers can have a rubbery modulus, $E_r$, of from about 0.01 MPa to about 100 MPa. Similarly to the glass transition temperature, the value of the rubbery modulus, $E_r$, can be affected by the radiation curing.

Table II lists the resulting rubbery modulus (MPa) for thermoset shape memory polymers comprising a 70:30 composition of methyl acrylate and various other monomers wherein each of the resulting polymers which are crosslinked with 9% by weight of trimethylolpropane triacrylate (TMPTA) at radiation doses of 5, 50 and 300 kGy.

TABLE II

| Linear Polymer | 5 kGy | 50 kGy | 300 kGy |
|---|---|---|---|
| methyl acrylate/isobornylacrylate | 0.79 | 0.82 | 1.1 |
| methyl acrylate/4-tert-butylcyclohexyl acrylate | 0.46 | 0.98 | 0.47 |
| methyl acrylate/N-isopropyl acrylamide | 0.57 | 0.68 | 0.97 |
| methyl acrylate/4-acryloylmorpholine | 1.0 | 3.2 | 1.1 |
| methyl acrylate/2-carboxyethyl acrylate | 0.92 | 2.1 | 2.1 |

Figure 3:
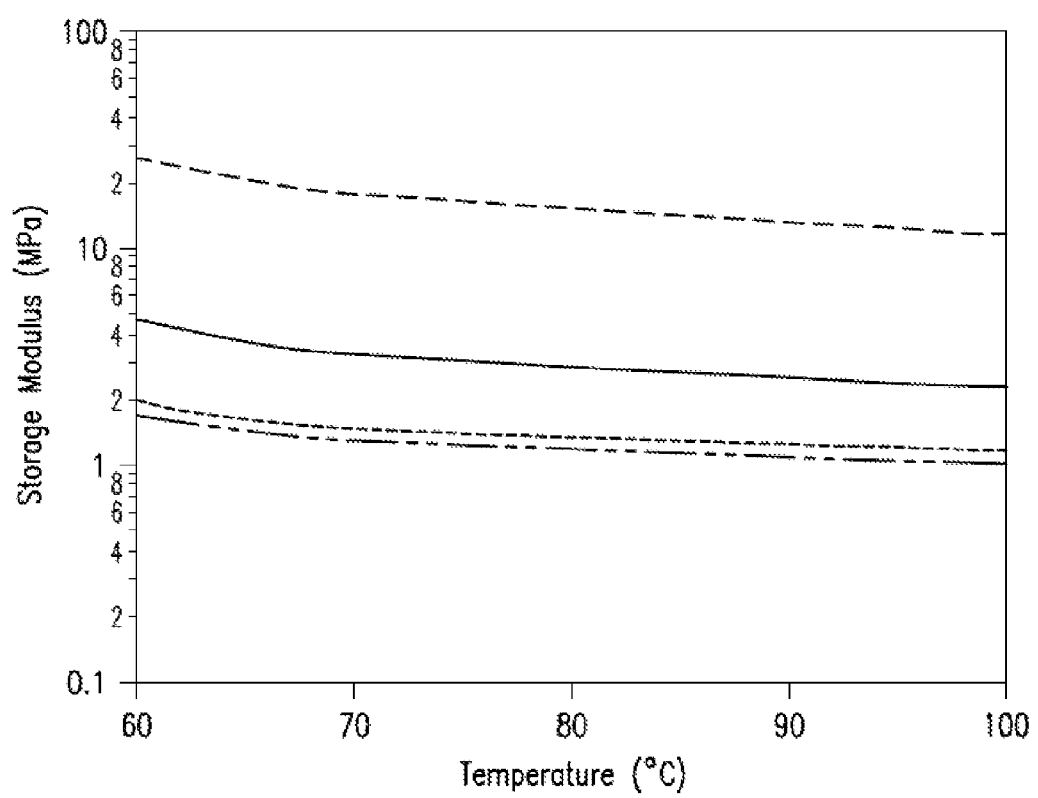
FIG. 3 depicts the change in storage modulus, $E_r$, for a shape memory polymer comprising a 94% by weight methyl acrylate/6% by weight isobornyl acrylate copolymer backbone crosslinked with varying amounts of TMPTA at a radiation dose of 50 kGy. The alternating dashed line (- - -) represents crosslinking with 6.25% TMPTA, the dotted line (. . .) represents crosslinking with 9% TMPTA, the solid line (- - -) represents crosslinking with 12.5% TMPTA, and the dashed line (- - -) represents crosslinking with 25% TMPTA.

As can be seen from the data in Table II the rubbery modulus varies considerably from one polymer and from one dose of radiation to the next. The rubbery modulus, however, can be iteratively adjusted by first selecting a crosslinking agent followed by varying the amount of crosslinker that comprises the pre-thermoset admixture. FIG. 3 depicts how storage modulus, $E_r$, changes for a series of thermoset shape memory polymers comprising a thermoplastic polymer backbone of 94% by weight methyl acrylate/6% by weight isobornyl acrylate cured at a radiation dose of 50 kGy. In FIG. 3 the amount of trimethylolpropane triacrylate is varied. The alternating dashed line (- - -) represents crosslinking with 6.25% TMPTA, the dotted line (...) represents crosslinking with 9% TMPTA, the solid line (- - -) represents crosslinking with 12.5% TMPTA, and the dashed line (- - -) represents crosslinking with 25% TMPTA. Table III summarizes the rubbery modulus for each of the crosslinked thermoplastic shape memory polymers depicted in FIG. 3.

TABLE III

| % crosslinker | $E_r$ |
|---|---|
| 6.25 | 1.09 |
| 9 | 1.25 |
| 12.5 | 2.5 |
| 25 | 13.13 |

Figure 2:
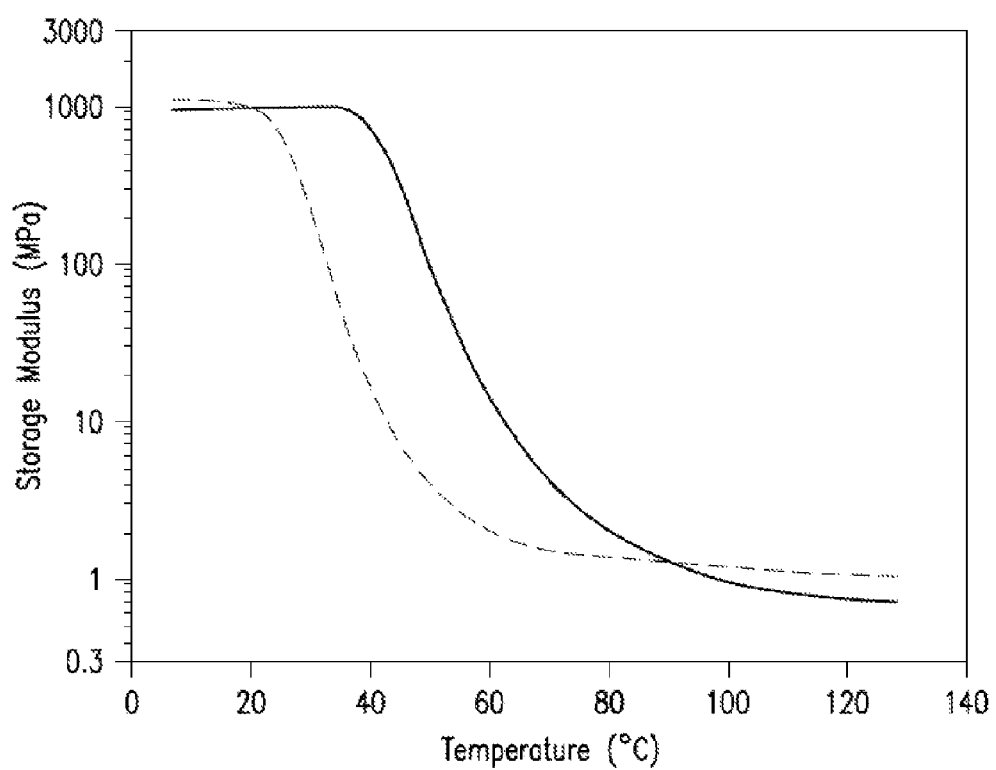
FIG. 2 depicts the change in glass transition temperature, $T_g$, and storage modulus, $E_r$, obtained by varying the composition of the copolymer backbone when irradiated at a dose of 50 kGy. Dashed line represents a backbone comprising 94% by weight methyl acrylate/6% by weight isobornyl acrylate crosslinked with 9% by weight TMPTA. Solid line represents a backbone comprising 70% by weight methyl acrylate/30% by weight isobornyl acrylate crosslinked with 9% by weight TMPTA.

The glass transition temperature of the thermoset shape memory polymers can be shifted while retaining the desired storage modulus. FIG. 2 shows how the glass transition temperature, $T_g$, can be raised or lowered while conserving the value of the storage modulus, $E_r$, desired by the formulator. The dashed line represents a SMP having a linear backbone comprising 94:6 methyl acrylate/isobornyl acrylate. When the composition of the linear backbone is change to 70:30 methyl acrylate/isobornyl acrylate (solid line), the glass transition temperature shifts by nearly 20° C. while the rubbery modulus does not move by more than 0.5 MPa. Both examples depicted in FIG. 2 were crosslinked with 9% by weight TMPTA and cured with a radiation dose of 50 kGy.

Gel Fraction

The disclosed shape memory polymers have a gel fraction greater than 0. The amount of gel fraction, or degree of crosslinking, present in the disclosed thermoset shape memory polymer can be adjusted by selection of the thermoplastic polymer that comprises the pre-thermoset admixture and the radiation dose that is used to cure the admixture. FIG. 1 depicts the change in gel fraction with increasing radiation dose for two disclosed thermoset shape memory polymers versus control (methyl acrylate). Each polymer was crosslinked with 9% by weight 2-(acryloxyloxymethyl)-2-ethylpropane-1,3-diyl diacrylate (trimethylolpropane triacrylate, TMPTA). The line represented by open squares (□) depicts the change in gel fraction for a SMP comprising 70:30 methyl acrylate:2-carboxyethyl acrylate. The line represented by solid circles (●) relates to a thermoset polymer control wherein the linear backbone comprises 100% methyl acrylate. The line represented by solid triangles (▲) relates to polymers comprising a copolymer backbone comprising 70:30 methyl acrylate:4-tert-butylcyclohexyl acrylate. As can be seen from the data depicted in FIG. 3, the formulator can independently change the gel fraction of the final thermoset shape memory polymer by selecting the two or more monomers that comprise the thermoplastic polymer.

Figure 6:
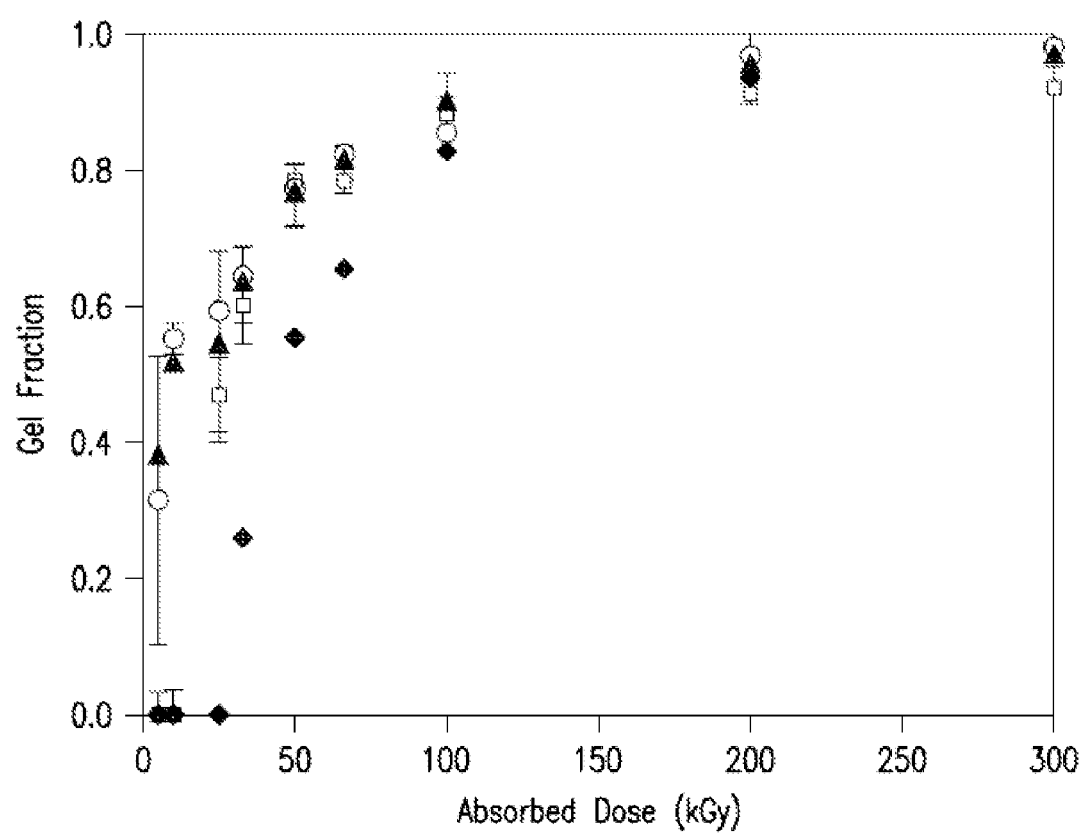
FIG. 6 depicts the level of crosslinking for pre-thermoset admixtures comprising a poly(methyl acrylate) thermoplastic polymer and differing amounts of the crosslinker triallyl-1,3,5-triazinane-2,4,6-trione (TAIC) at various radiation doses. The symbol ♦ represents control (0% by weight of TAIC), (□) represents 1% by weight TAIC, (▲) represents 3% by weight TAIC and ⊙ represents 5% by weight TAIC.

FIG. 6 depicts the manner in which the level of crosslinking (as measured by the amount of the gel fraction) varies depending upon the amount of crosslinker present. Samples of the thermoplastic polymer poly(methyl acrylate) were cured with different doses of radiation. FIG. 6 shows the gel fraction for the following amounts of the crosslinker triallyl-1,3,5-triazinane-2,4,6-trione (TAIC); ♦ represents control (0% by weight of TAIC), (□) represents 1% by weight TAIC, (▲) represents 3% by weight TAIC and ☉ represents 5% by weight TAIC. Increasing amounts of TAIC in this polymer system results in higher gel fractions across each radiation dose.

Figure 7:
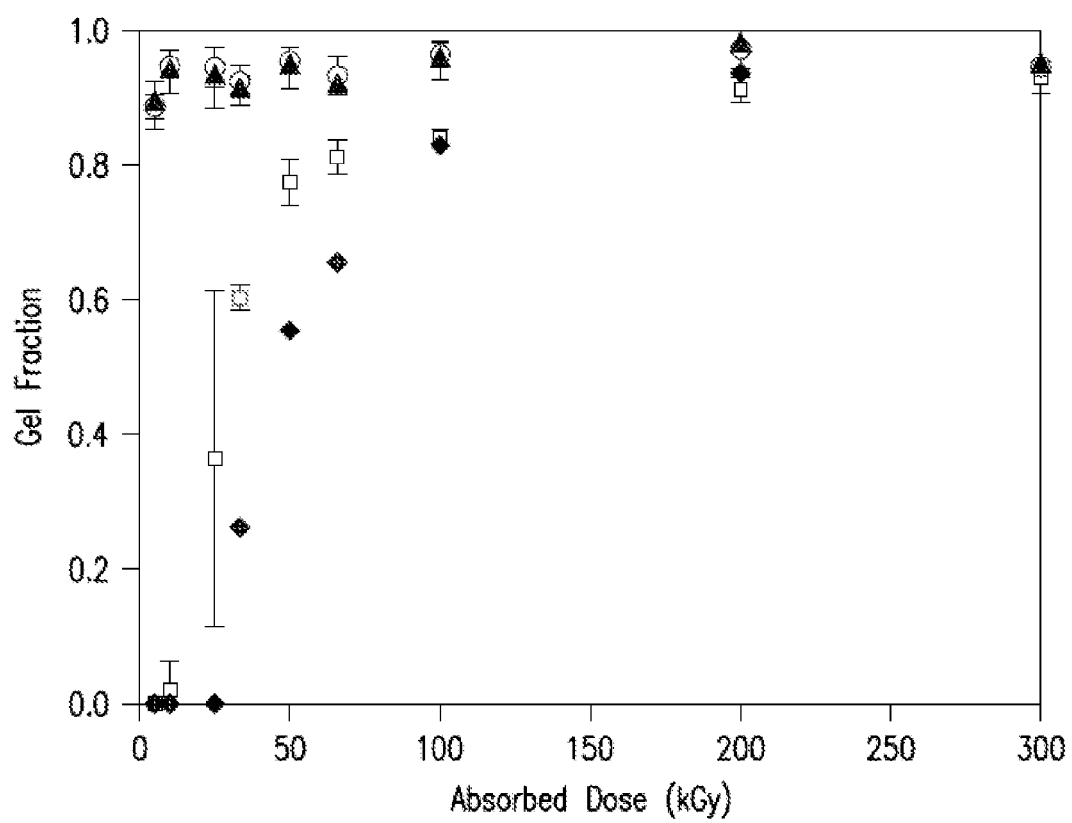
FIG. 7 depicts the level of crosslinking for pre-thermoset admixtures comprising a poly(methyl acrylate) thermoplastic polymer and differing amounts of the crosslinker triallyl-1,3,5-triazinane-2,4,6-trione (TMPTA) at various radiation doses. The symbol ♦ represents control (0% by weight of TMPTA), (□) represents 1% by weight TMPTA, (▲) represents 3% by weight TMPTA and ● represents 5% by weight TMPTA.
Figure 8:
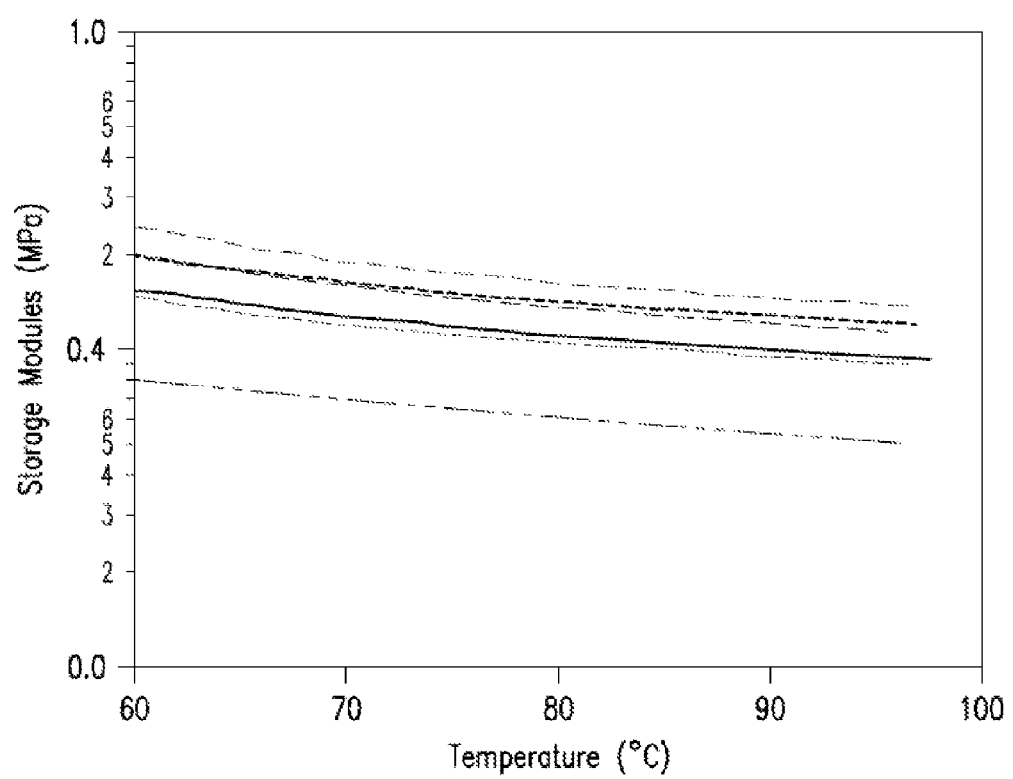
FIG. 8 depicts the increase in rubbery modulus, $E_r$, for shape memory polymers obtained from pre-thermoset admixtures comprising poly(methyl acrylate) thermoplastic polymer and 5% by weight of the crosslinker TMPTA with increasing radiation doses. The line represented by (-••) indicates curing with a 5 kGy dose, (- - -) indicates curing with a 10 kGy dose, (- - -) indicates curing with a 25 kGy dose, (- - -) indicates curing with a 50 kGy dose, (•••) indicates curing with 100 kGy and (- - -) indicates curing with a 200 kGy dose.

FIG. 7 depicts the manner in which the level of crosslinking (as measured by the amount of the gel fraction) varies depending upon the amount of crosslinker present. Samples of the thermoplastic polymer poly(methyl acrylate) were cured with different doses of radiation. FIG. 7 shows the gel fraction for the following amounts of the crosslinker triallyl-1,3,5-triazinane-2,4,6-trione (TMPTA); ♦ represents control (0% by weight of TMPTA), (□) represents 1% by weight TMPTA, (▲) represents 3% by weight TMPTA and ☉ represents 5% by weight TMPTA. Comparing the results depicted in FIGS. 6 and 7, the formulator can control the gel fraction of a particular shape memory polymer not only by the amount of radiation, but the efficiency of crosslinking by a particular crosslinker.

Mechanical Stress and Strain

Figure 4:
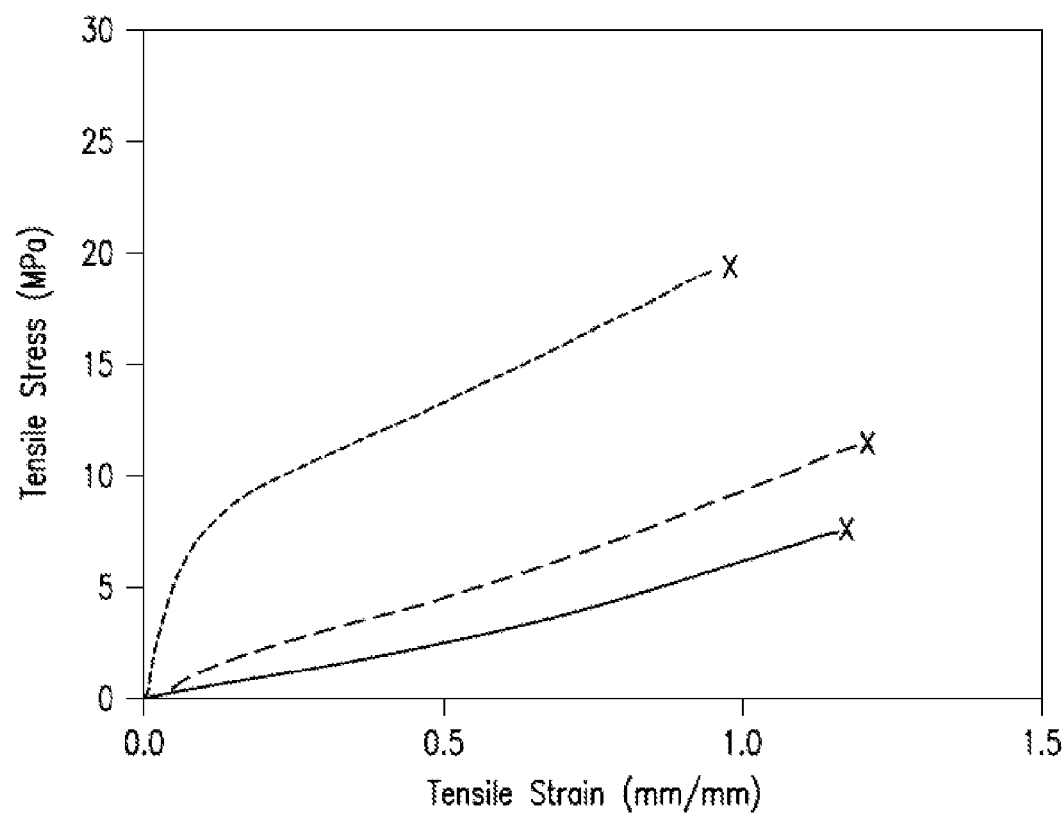
FIG. 4 depicts the stress-strain response and toughness of a shape memory polymer comprising a 94% by weight methyl acrylate/6% by weight isobornyl acrylate copolymer backbone crosslinked with 25% by weight of TMPTA at a radiation dose of 50 kGy. The integrated area underneath the dotted line represents a toughness value of 12.8 MJ/m³ when measured at 22° C., the integrated area underneath the dashed line represents a toughness value of 6.7 MJ/m³ when measured at 36° C. ($T_g$), and the integrated area underneath the solid line represents a toughness value of 3.97 MJ/m³ when measured at 60° C.

FIG. 4 shows the thermomechanical behavior of a thermoset shape memory polymer comprising 94% by weight methyl acrylate/6% by weight isobornyl acrylate copolymer backbone crosslinked with 25% by weight of TMPTA at a radiation dose of 50 kGy. This SMP exhibits the highest toughness at the onset of $T_g$, the highest total strain-to-failure at $T_g$ and the lowest stresses when elongated in the rubbery regime. The dotted line (. . .) represents a toughness value of 12.8 MJ/m$^3$ when measured at 22° C., the dashed line (- - -) represents a toughness value of 6.7 MJ/m$^3$ when measured at 36° C. ($T_g$), and the solid line represents a toughness value of 3.97 MJ/m$^3$ when measured at 60° C. Table IV provides the maximum stress and strain data for poly(MA-co-IBoA) (94:6) crossed liked with 3% by weight and 25% by weight of TMPTA.

TABLE IV

| Crosslinker | TMPTA | | |
|---|---|---|---|
| | $T_g - 12°$ C. | $T_g$ | $T_g + 24°$ C. |
| | Maximum Strains (mm/mm) | | |
| 3% | >10$^a$ | >10$^a$ | >7$^a$ |
| 25% | 0.835 ± 0.13 | 1.14 ± 0.06 | 1.09 ± 0.10 |

TABLE IV-continued

| Crosslinker | TMPTA | | |
|---|---|---|---|
| | $T_g - 12°$ C. | $T_g$ | $T_g + 24°$ C. |
| | Stress at Maximum Strain (MPa) | | |
| 3% | >4.8$^a$ | >2.9$^a$ | >1.7$^a$ |
| 25% | 19.9 ± 3.5 | 13.8 ± 3.6 | 6.67 ± 2.0 |

$^a$= minimum bounds on strain-to-failure, max stress.

At 3% by weight of TMPTA maximum strains were measured by crosshead displacement to be above 700% for samples strained in the rubbery regime and above 1000% for sample strained at $T_g$ and at onset. These data show the stresses at the given strains present the lower bound of the maximum stress each material can withstand. This value is highest at onset of $T_g$. In comparison, the sample crosslinked with 25% by weight of TMPTA strains an order of magnitude less than the sample crosslinked with 3% by weight TMPTA but, however, demonstrates stresses roughly four times larger.

Figure 5:
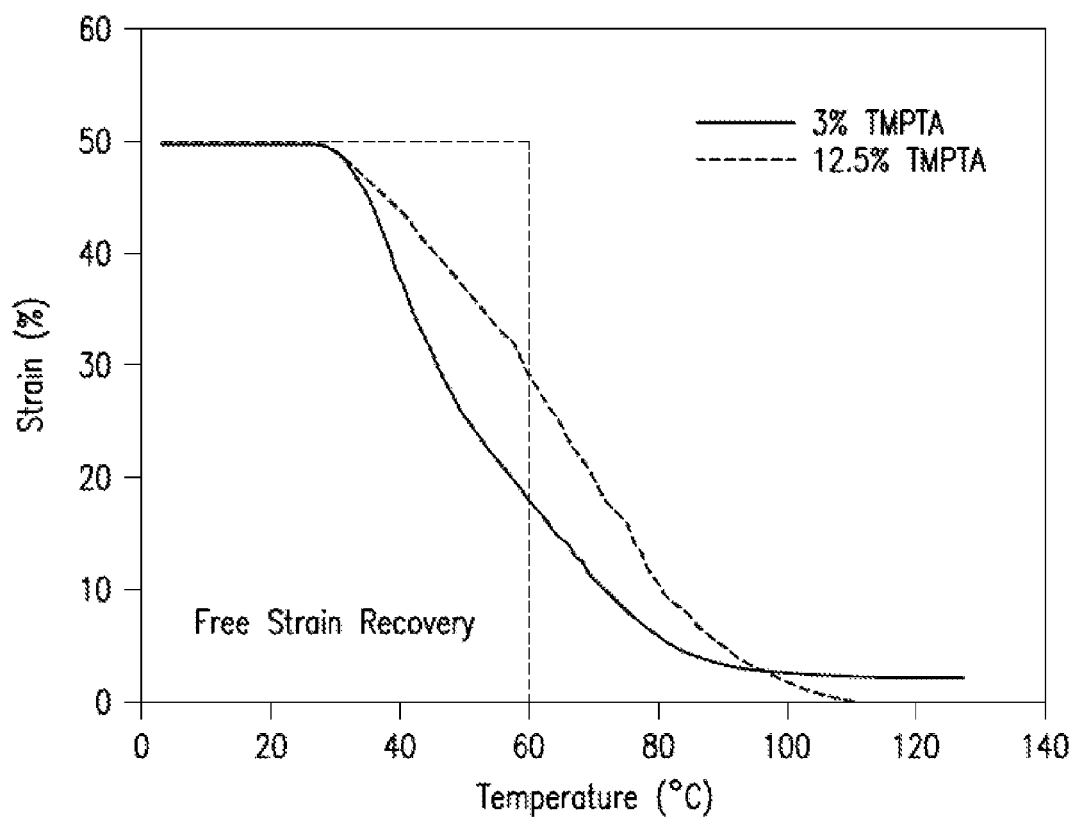
FIG. 5 depicts the free strain recovery of a shape memory polymer having a 94% by weight methyl acrylate/6% by weight isobornyl acrylate copolymer backbone crosslinked with 3% by weight TMPTA (solid line) and 12.5% by weight TMPTA (dotted line).

FIG. 5 depicts the shape-memory cycle for two samples of poly(MA-co-IBoA) (94:6) crosslinked with different amounts of TMPTA. When strained to 50%, the sample crosslinked with 3% by weight TMPTA had a residual strain of approximately 3% while the sample crosslinked with 12.5% TMPTA when strained to 50% fully recovered.

EXAMPLES

For the following examples, both shape memory polymers using the disclosed process and non-shape memory polymers (comparative examples) were prepared. All of the backbone copolymers were synthesized by free radical polymerization using 0.1% by weight of 2,2-dimethoxy-2-phenylacetophenone (DMPA) as the initiator. For the comparative examples, crosslinking is induced during free radical polymerization.

General Procedure for Comparative Examples

Approximately 3 g of an admixture of the indicated monomers were admixed with the photoinitiator and injected between glass slides separated with 1 mm glass spacers. The polymerization and subsequent crosslinking were performed using a crosslinking chamber with five overhead 365 nm UV bulbs (Cole-Parmer). All materials were cured for 1 hour. The polymers obtained each were cut for testing and analysis General Procedure for Shape Memory Polymers According to the present disclosure, 35 g admixtures of the monomers and the photoinitiator were poured into 100 mL polyethylene containers. Polymerization of the disclosed shape memory polymer backbones were performed using a crosslinking chamber with five overhead 365 nm UV bulbs (Cole-Parmer). All materials were cured for 1 hour. Samples of each were either cut for testing or pelletized for further processing.

Pelletized samples of the copolymer backbone were blended with unreacted crosslinker (TMPTA or TAIC™) in a Brabender PlastiCorder and fed into the mixer. The admixture was then heated to a temperature from about 150° C. to about 220° C. depending upon the copolymer backbone or other parameters. The desired crosslinking agent was dripped into the mixing chamber. Samples were mixed until the torque had leveled off. For the specifically disclosed shape memory polymers disclosed in Table V, the mixing was continued until the torque leveled off at about 10 Nm.

The copolymer backbone/crosslinker admixture was then either injection molded or heated and pressed with a 12-Tonne Carver Press into the desired shapes. Samples were then exposed to the following doses of radiation 5, 10, 20, 33, 50, 66, 100, 200 or 300 KGy to affect crosslinking.

Table V provides non-limiting examples of the disclosed shape memory polymers that were prepared by the disclosed process and found to have tunable properties.

TABLE V

| No. | Pre-thermoset copolymer composition | Crosslinker and percentage thereof | Radiation Curing Dose (kGy) |
|---|---|---|---|
| 1 | Poly(MA-co-BA) 95:5 | 9% TMPTA | 5 |
| 2 | Poly(MA-co-BA) 95:5 | 9% TMPTA | 50 |
| 3 | Poly(MA-co-BA) 95:5 | 9% TMPTA | 200 |
| 4 | Poly(MA-co-BA) 95:5 | 9% TMPTA | 300 |
| 5 | Poly(MA-co-BA) 85:15 | 9% TMPTA | 5 |
| 6 | Poly(MA-co-BA) 85:15 | 9% TMPTA | 50 |
| 7 | Poly(MA-co-BA) 85:15 | 9% TMPTA | 200 |
| 8 | Poly(MA-co-BA) 85:15 | 9% TMPTA | 300 |
| 9 | Poly(MA-co-BA) 75:25 | 9% TMPTA | 5 |
| 10 | Poly(MA-co-BA) 75:25 | 9% TMPTA | 50 |
| 11 | Poly(MA-co-BA) 75:25 | 9% TMPTA | 200 |
| 12 | Poly(MA-co-BA) 75:25 | 9% TMPTA | 300 |
| 13 | Poly(MA-co-IboA) 96:4 | 9% TMPTA | 5 |
| 14 | Poly(MA-co-IboA) 96:4 | 9% TMPTA | 50 |
| 15 | Poly(MA-co-IboA) 96:4 | 9% TMPTA | 200 |
| 16 | Poly(MA-co-IboA) 96:4 | 9% TMPTA | 300 |
| 17 | Poly(MA-co-IboA) 93:7 | 9% TMPTA | 5 |
| 18 | Poly(MA-co-IboA) 93:7 | 9% TMPTA | 50 |
| 19 | Poly(MA-co-IboA) 93:7 | 9% TMPTA | 200 |
| 20 | Poly(MA-co-IboA) 93:7 | 9% TMPTA | 300 |
| 21 | Poly(MA-co-IboA) 90:10 | 9% TMPTA | 5 |
| 22 | Poly(MA-co-IboA) 90:10 | 9% TMPTA | 50 |
| 23 | Poly(MA-co-IboA) 90:10 | 9% TMPTA | 200 |
| 24 | Poly(MA-co-IboA) 90:10 | 9% TMPTA | 300 |
| 25 | Poly(MA-co-BA-co-IboA) 70:25:5 | 9% TMPTA | 5 |
| 26 | Poly(MA-co-BA-co-IboA) 70:25:5 | 9% TMPTA | 50 |
| 27 | Poly(MA-co-BA-co-IboA) 70:25:5 | 9% TMPTA | 200 |
| 28 | Poly(MA-co-BA-co-IboA) 70:25:5 | 9% TMPTA | 300 |
| 29 | Poly(MA-co-BA-co-IboA) 55:35:10 | 9% TMPTA | 5 |
| 30 | Poly(MA-co-BA-co-IboA) 55:35:10 | 9% TMPTA | 50 |
| 31 | Poly(MA-co-BA-co-IboA) 55:35:10 | 9% TMPTA | 200 |
| 32 | Poly(MA-co-BA-co-IboA) 55:30:10 | 9% TMPTA | 300 |
| 33 | Poly(MA-co-BA-co-IboA) 55:30:15 | 9% TMPTA | 5 |
| 34 | Poly(MA-co-BA-co-IboA) 55:30:15 | 9% TMPTA | 50 |
| 35 | Poly(MA-co-BA-co-IboA) 55:30:15 | 9% TMPTA | 200 |
| 36 | Poly(MA-co-BA-co-IboA) 55:30:15 | 9% TMPTA | 300 |
| 37 | Poly(MA-co-BA) 95:5 | 12.5% TMPTA | 5 |
| 38 | Poly(MA-co-BA) 95:5 | 12.5% TMPTA | 50 |
| 39 | Poly(MA-co-BA) 95:5 | 12.5% TMPTA | 200 |
| 40 | Poly(MA-co-BA) 95:5 | 12.5% TMPTA | 300 |
| 41 | Poly(MA-co-BA) 85:15 | 12.5% TMPTA | 5 |
| 42 | Poly(MA-co-BA) 85:15 | 12.5% TMPTA | 50 |
| 43 | Poly(MA-co-BA) 85:15 | 12.5% TMPTA | 200 |
| 44 | Poly(MA-co-BA) 85:15 | 12.5% TMPTA | 300 |
| 45 | Poly(MA-co-BA) 75:25 | 12.5% TMPTA | 5 |
| 46 | Poly(MA-co-BA) 75:25 | 12.5% TMPTA | 50 |
| 47 | Poly(MA-co-BA) 75:25 | 12.5% TMPTA | 200 |
| 48 | Poly(MA-co-BA) 75:25 | 12.5% TMPTA | 300 |
| 49 | Poly(MA-co-IboA) 96:4 | 12.5% TMPTA | 5 |
| 50 | Poly(MA-co-IboA) 96:4 | 12.5% TMPTA | 50 |
| 51 | Poly(MA-co-IboA) 96:4 | 12.5% TMPTA | 200 |
| 52 | Poly(MA-co-IboA) 96:4 | 12.5% TMPTA | 300 |
| 53 | Poly(MA-co-IboA) 93:7 | 12.5% TMPTA | 5 |
| 54 | Poly(MA-co-IboA) 93:7 | 12.5% TMPTA | 50 |
| 55 | Poly(MA-co-IboA) 93:7 | 12.5% TMPTA | 200 |
| 56 | Poly(MA-co-IboA) 93:7 | 12.5% TMPTA | 300 |
| 57 | Poly(MA-co-IboA) 90:10 | 12.5% TMPTA | 5 |
| 58 | Poly(MA-co-IboA) 90:10 | 12.5% TMPTA | 50 |
| 59 | Poly(MA-co-IboA) 90:10 | 12.5% TMPTA | 200 |
| 60 | Poly(MA-co-IboA) 90:10 | 12.5% TMPTA | 300 |
| 61 | Poly(MA-co-BA-co-IboA) 70:25:5 | 12.5% TMPTA | 5 |
| 62 | Poly(MA-co-BA-co-IboA) 70:25:5 | 12.5% TMPTA | 50 |
| 63 | Poly(MA-co-BA-co-IboA) 70:25:5 | 12.5% TMPTA | 200 |
| 64 | Poly(MA-co-BA-co-IboA) 70:25:5 | 12.5% TMPTA | 300 |
| 65 | Poly(MA-co-BA-co-IboA) 55:35:10 | 12.5% TMPTA | 5 |
| 66 | Poly(MA-co-BA-co-IboA) 55:35:10 | 12.5% TMPTA | 50 |
| 67 | Poly(MA-co-BA-co-IboA) 55:35:10 | 12.5% TMPTA | 200 |
| 68 | Poly(MA-co-BA-co-IboA) 55:35:10 | 12.5% TMPTA | 300 |
| 69 | Poly(MA-co-BA-co-IboA) 55:30:15 | 12.5% TMPTA | 5 |
| 70 | Poly(MA-co-BA-co-IboA) 55:30:15 | 12.5% TMPTA | 50 |
| 71 | Poly(MA-co-BA-co-IboA) 55:30:15 | 12.5% TMPTA | 200 |
| 72 | Poly(MA-co-BA-co-IboA) 55:30:15 | 12.5% TMPTA | 300 |

Table VI herein below provides non-limiting examples of the disclosed shape memory polymers having tunable properties cured at a dose of 75 kGy.

TABLE VI

| No. | Pre-thermoset Admixture | | Ratio | Crosslinker |
|---|---|---|---|---|
| 73 | Poly(MA-co-BA) 95:5 | Poly(MA-co-IboA) 90:10 | 10:90 | 9% TMPTA |
| 74 | Poly(MA-co-BA) 95:5 | Poly(MA-co-IboA) 80:20 | 30:70 | 9% TMPTA |
| 75 | Poly(MA-co-BA) 95:5 | Poly(MA-co-IboA) 70:30 | 50:50 | 9% TMPTA |
| 76 | Poly(MA-co-BA) 95:5 | Poly(MA-co-IboA) 30:70 | 70:30 | 9% TMPTA |
| 77 | Poly(MA-co-BA) 95:5 | Poly(MA-co-IboA) 20:80 | 10:90 | 9% TMPTA |
| 78 | Poly(MA-co-BA) 95:5 | Poly(MA-co-IboA) 50:50 | 30:70 | 9% TMPTA |
| 79 | Poly(MA-co-BA) 95:5 | Poly(MA-co-IboA) 90:10 | 50:50 | 9% TMPTA |
| 80 | Poly(MA-co-BA) 95:5 | Poly(MA-co-IboA) 90:10 | 10:90 | 12% TMPTA |
| 81 | Poly(MA-co-BA) 95:5 | Poly(MA-co-IboA) 80:20 | 30:70 | 12% TMPTA |
| 82 | Poly(MA-co-BA) 95:5 | Poly(MA-co-IboA) 70:30 | 50:50 | 12% TMPTA |
| 83 | Poly(MA-co-BA) 95:5 | Poly(MA-co-IboA) 30:70 | 70:30 | 12% TMPTA |
| 84 | Poly(MA-co-BA) 95:5 | Poly(MA-co-IboA) 20:80 | 10:90 | 12% TMPTA |
| 85 | Poly(MA-co-BA) 95:5 | Poly(MA-co-IboA) 50:50 | 30:70 | 12% TMPTA |
| 86 | Poly(MA-co-BA) 95:5 | Poly(MA-co-IboA) 90:10 | 50:50 | 12% TMPTA |
| 87 | Poly(MA) | Poly(MA-co-BA) 50:50 | 10:90 | 9% TMPTA |
| 88 | Poly(MA) | Poly(MA-co-BA) 50:50 | 30:70 | 9% TMPTA |
| 89 | Poly(MA) | Poly(MA-co-BA) 50:50 | 50:50 | 9% TMPTA |
| 90 | Poly(MA) | Poly(MA-co-BA) 20:80 | 10:90 | 9% TMPTA |
| 91 | Poly(MA) | Poly(MA-co-BA) 20:80 | 30:70 | 9% TMPTA |
| 92 | Poly(MA) | Poly(MA-co-BA) 20:80 | 50:50 | 9% TMPTA |
| 93 | Poly(MA) | Poly(MA-co-IboA) 50:50 | 10:90 | 12% TMPTA |
| 94 | Poly(MA) | Poly(MA-co-IboA) 50:50 | 30:70 | 12% TMPTA |
| 95 | Poly(MA) | Poly(MA-co-IboA) 50:50 | 50:50 | 12% TMPTA |
| 96 | Poly(MA) | Poly(MA-co-IboA) 20:80 | 10:90 | 12% TMPTA |
| 97 | Poly(MA) | Poly(MA-co-IboA) 20:80 | 30:70 | 12% TMPTA |
| 98 | Poly(MA) | Poly(MA-co-IboA) 20:80 | 50:50 | 12% TMPTA |

TABLE VI-continued

| No. | Pre-thermoset Admixture | | Ratio | Crosslinker |
|---|---|---|---|---|
| 99 | Poly(MA-co-BA) 50:50 | Poly(MA-co-IboA) 90:10 | 10:90 | 9% TMPTA |
| 100 | Poly(MA-co-BA) 50:50 | Poly(MA-co-IboA) 80:20 | 30:70 | 9% TMPTA |
| 101 | Poly(MA-co-BA) 50:50 | Poly(MA-co-IboA) 70:30 | 50:50 | 9% TMPTA |
| 102 | Poly(MA-co-BA) 50:50 | Poly(MA-co-IboA) 30:70 | 70:30 | 9% TMPTA |
| 103 | Poly(MA-co-BA) 50:50 | Poly(MA-co-IboA) 20:80 | 10:90 | 9% TMPTA |
| 104 | Poly(MA-co-BA) 50:50 | Poly(MA-co-IboA) 50:50 | 30:70 | 9% TMPTA |
| 105 | Poly(MA-co-BA) 50:50 | Poly(MA-co-IboA) 90:10 | 50:50 | 9% TMPTA |
| 106 | Poly(MA-co-BA) 50:50 | Poly(MA-co-IboA) 90:10 | 10:90 | 12% TMPTA |
| 107 | Poly(MA-co-BA) 50:50 | Poly(MA-co-IboA) 80:20 | 30:70 | 12% TMPTA |
| 108 | Poly(MA-co-BA) 50:50 | Poly(MA-co-IboA) 70:30 | 50:50 | 12% TMPTA |
| 109 | Poly(MA-co-BA) 50:50 | Poly(MA-co-IboA) 30:70 | 70:30 | 12% TMPTA |
| 110 | Poly(MA-co-BA) 50:50 | Poly(MA-co-IboA) 20:80 | 10:90 | 12% TMPTA |
| 111 | Poly(MA-co-BA) 50:50 | Poly(MA-co-IboA) 50:50 | 30:70 | 12% TMPTA |
| 112 | Poly(MA-co-BA) 50:50 | Poly(MA-co-IboA) 90:10 | 50:50 | 12% TMPTA |
| 113 | Poly(MA) | Poly(BA) | 95:5 | 9% TMPTA |
| 114 | Poly(MA) | Poly(BA) | 70:30 | 9% TMPTA |
| 115 | Poly(MA) | Poly(BA) | 50:50 | 9% TMPTA |
| 116 | Poly(MA) | Poly(BA) | 30:70 | 9% TMPTA |
| 117 | Poly(MA) | Poly(BA) | 5:95 | 9% TMPTA |
| 118 | Poly(MA) | Poly(IboA) | 95:5 | 9% TMPTA |
| 119 | Poly(MA) | Poly(IboA) | 70:30 | 9% TMPTA |
| 120 | Poly(MA) | Poly(IboA) | 50:50 | 9% TMPTA |
| 121 | Poly(MA) | Poly(IboA) | 30:70 | 9% TMPTA |
| 122 | Poly(MA) | Poly(IboA) | 5:95 | 9% TMPTA |

Table VII provides non-limiting examples of the disclosed pre-thermoset admixtures that can be cured to form shape memory polymers having tunable properties.

TABLE VII

| No. | Pre-thermoset copolymer composition* | Crosslinker and percentage thereof | Radiation Curing Dose (kGy) |
|---|---|---|---|
| 123 | Poly[MDI-co-(PEG)$_4$] | 9% TMPTA | 5 |
| 124 | Poly[MDI-co-(PEG)$_4$] | 9% TMPTA | 50 |
| 125 | Poly[MDI-co-(PEG)$_4$] | 9% TMPTA | 200 |
| 126 | Poly[MDI-co-(PEG)$_4$] | 9% TMPTA | 300 |
| 127 | Poly[MDI-co-(PEG)$_5$] | 9% TMPTA | 5 |
| 128 | Poly[MDI-co-(PEG)$_5$] | 9% TMPTA | 50 |
| 129 | Poly[MDI-co-(PEG)$_5$] | 9% TMPTA | 200 |
| 130 | Poly[MDI-co-(PEG)$_5$] | 9% TMPTA | 300 |
| 131 | Poly[MDI-co-(PEG)$_8$] | 9% TMPTA | 5 |
| 132 | Poly[MDI-co-(PEG)$_8$] | 9% TMPTA | 50 |
| 133 | Poly[MDI-co-(PEG)$_8$] | 9% TMPTA | 200 |
| 134 | Poly[MDI-co-(PEG)$_8$] | 9% TMPTA | 300 |
| 135 | Poly[MDI-co-(PEG)$_{12}$] | 9% TMPTA | 5 |
| 136 | Poly[MDI-co-(PEG)$_{12}$] | 9% TMPTA | 50 |
| 137 | Poly[MDI-co-(PEG)$_{12}$] | 9% TMPTA | 200 |
| 138 | Poly[MDI-co-(PEG)$_{12}$] | 9% TMPTA | 300 |
| 139 | Poly[MDI-co-(PEG)$_{18}$] | 9% TMPTA | 5 |
| 140 | Poly[MDI-co-(PEG)$_{18}$] | 9% TMPTA | 50 |
| 141 | Poly[MDI-co-(PEG)$_{18}$] | 9% TMPTA | 200 |
| 142 | Poly[MDI-co-(PEG)$_{18}$] | 9% TMPTA | 300 |
| 143 | Poly[TDI-co-(PEG)$_4$] | 9% TMPTA | 5 |
| 144 | Poly[TDI-co-(PEG)$_4$] | 9% TMPTA | 50 |
| 145 | Poly[TDI-co-(PEG)$_4$] | 9% TMPTA | 200 |
| 146 | Poly[TDI-co-(PEG)$_4$] | 9% TMPTA | 300 |
| 147 | Poly[TDI-co-(PEG)$_5$] | 9% TMPTA | 5 |
| 148 | Poly[TDI-co-(PEG)$_5$] | 9% TMPTA | 50 |
| 149 | Poly[TDI-co-(PEG)$_5$] | 9% TMPTA | 200 |
| 150 | Poly[TDI-co-(PEG)$_5$] | 9% TMPTA | 300 |
| 151 | Poly[TDI-co-(PEG)$_8$] | 9% TMPTA | 5 |
| 152 | Poly[TDI-co-(PEG)$_8$] | 9% TMPTA | 50 |
| 153 | Poly[TDI-co-(PEG)$_8$] | 9% TMPTA | 200 |
| 154 | Poly[TDI-co-(PEG)$_8$] | 9% TMPTA | 300 |
| 155 | Poly[TDI-co-(PEG)$_{12}$] | 9% TMPTA | 5 |
| 156 | Poly[TDI-co-(PEG)$_{12}$] | 9% TMPTA | 50 |
| 157 | Poly[TDI-co-(PEG)$_{12}$] | 9% TMPTA | 200 |
| 158 | Poly[TDI-co-(PEG)$_{12}$] | 9% TMPTA | 300 |
| 159 | Poly[TDI-co-(PEG)$_{18}$] | 9% TMPTA | 5 |
| 160 | Poly[TDI-co-(PEG)$_{18}$] | 9% TMPTA | 50 |
| 161 | Poly[TDI-co-(PEG)$_{18}$] | 9% TMPTA | 200 |
| 162 | Poly[TDI-co-(PEG)$_{18}$] | 9% TMPTA | 300 |
| 163 | Poly[TDI-co-(PEG)$_4$] | 9% TMPTA | 5 |
| 164 | Poly[TDI-co-(PEG)$_4$] | 9% TMPTA | 50 |
| 165 | Poly[TDI-co-(PEG)$_4$] | 9% TMPTA | 200 |
| 166 | Poly[TDI-co-(PEG)$_4$] | 9% TMPTA | 300 |
| 167 | Poly[TDI-co-(PEG)$_5$] | 9% TMPTA | 5 |
| 168 | Poly[TDI-co-(PEG)$_5$] | 9% TMPTA | 50 |
| 169 | Poly[TDI-co-(PEG)$_5$] | 9% TMPTA | 200 |
| 170 | Poly[TDI-co-(PEG)$_5$] | 9% TMPTA | 300 |
| 171 | Poly[TDI-co-(PEG)$_8$] | 9% TMPTA | 5 |
| 172 | Poly[TDI-co-(PEG)$_8$] | 9% TMPTA | 50 |
| 173 | Poly[TDI-co-(PEG)$_8$] | 9% TMPTA | 200 |
| 174 | Poly[TDI-co-(PEG)$_8$] | 9% TMPTA | 300 |
| 175 | Poly[TDI-co-(PEG)$_{12}$] | 9% TMPTA | 5 |
| 176 | Poly[TDI-co-(PEG)$_{12}$] | 9% TMPTA | 50 |
| 177 | Poly[TDI-co-(PEG)$_{12}$] | 9% TMPTA | 200 |
| 178 | Poly[TDI-co-(PEG)$_{12}$] | 9% TMPTA | 300 |
| 179 | Poly[TDI-co-(PEG)$_{18}$] | 9% TMPTA | 5 |
| 180 | Poly[TDI-co-(PEG)$_{18}$] | 9% TMPTA | 50 |
| 181 | Poly[TDI-co-(PEG)$_{18}$] | 9% TMPTA | 200 |
| 182 | Poly[TDI-co-(PEG)$_{18}$] | 9% TMPTA | 300 |
| 183 | Poly[(H$_{12}$)MDI-co-(PEG)$_{12}$] | 12.5% TMPTA | 5 |
| 184 | Poly[(H$_{12}$)MDI-co-(PEG)$_{12}$] | 12.5% TMPTA | 50 |
| 185 | Poly[(H$_{12}$)MDI-co-(PEG)$_{12}$] | 12.5% TMPTA | 200 |
| 186 | Poly[(H$_{12}$)MDI-co-(PEG)$_{12}$] | 12.5% TMPTA | 300 |
| 187 | Poly[(H$_{12}$)MDI-co-(PEG)$_{18}$] | 12.5% TMPTA | 5 |
| 188 | Poly[(H$_{12}$)MDI-co-(PEG)$_{18}$] | 12.5% TMPTA | 50 |
| 189 | Poly[(H$_{12}$)MDI-co-(PEG)$_{18}$] | 12.5% TMPTA | 200 |
| 190 | Poly[(H$_{12}$)MDI-co-(PEG)$_{18}$] | 12.5% TMPTA | 300 |
| 191 | Poly[TDXI-co-(PEG)$_{18}$] | 12.5% TMPTA | 5 |
| 192 | Poly[TDXI-co-(PEG)$_{18}$] | 12.5% TMPTA | 50 |
| 193 | Poly[TDXI-co-(PEG)$_{18}$] | 12.5% TMPTA | 200 |
| 194 | Poly[TDXI-co-(PEG)$_{18}$] | 12.5% TMPTA | 300 |

MDI = methylene diphenyl diisocyanate
TDI = toluene diisocyanate
TDXI = tetramethylxylene diisocyanate
(H$_{12}$)MDI = dicyclohexylmethane diisocyanate
*For urethane copolymers having the formula, Poly[MDI-co-(PEG)$_x$], the index x refers to the average number of ethyleneoxy units in the polyethylene glycol unit.

Dynamic Mechanical Analysis

Dynamic mechanical analysis (MA) in tensile loading was used to determine the $T_g$, onset of $T_g$ and rubbery modulus of the thermoset shape memory polymers using a TA Q800 DMA. Rectangular samples with dimensions of approximately 1×5×25 mm³ were cut and tested. The samples were thermally equilibrated at $Tl_{ow}$ for 2 minutes and then hearted to $T_{high}$ at a rate of 2° C. per minute a 1 Hz. Testing was performed in cyclic strain control at 0.2% strain. A preload force of 0.001 N and a force track setting of 125% were used. $T_g$ was defined at the peak of tan delta. Samples were run in triplicate, and variations in $T_g$ were within on standard deviation of 3-5° C. The onset was calculated by the intersecting line method. The rubbery modulus was observed between $T_g+24°$ C. or $T_g+50°$ C.

Differential Scanning calorimeter

The Q100 DSC fro TA Instruments with an RCA cooling accessory was used to confirm shifts in $T_g$. Hermetic Aluminum pans were filled with polymer samples weighing between 3 and 15 mg. Nitrogen was used as the purge gas. Polymers were subjected to a Heat-Cool-Heat cycle to erase thermal memory. Samples were heated from ambient to 150° C. at 5° C. per minute to combustion near 320° C. The intersecting line method was used to determine $T_g$.

Uniaxial Tensile Test

Mechanical tensile tests were performed with the MTS Insight 2. Samples were cut to ASTM dogbone Type IV samples. Materials were strained isothermally at 10 mm per minute using a 100 N Load Cell in a variable temperature Thermal Chamber at the temperature specified. Grips were hand-tightened and the camber was allowed to equilibrate for 10 minutes at the specific testing temperature. For samples tested above $T_g$, grips were re-tightened after an initial heating above $T_g$ to minimize slippage. Testing limitations regarding the size of the thermal chamber and slippage due to high strains led to a lower bound on max strain and max stress for samples of PA-co-IBoA blended with 3% by weight TMPTA and subsequently irradiated with an electron beam.

Gel Fraction Test

Vials were prepared with approximately 20 mL of acetone placed in each. Three samples of each polymer weighing between 80 mg and 110 mg were weighed and then placed in a separate vial. The vials were allowed to soak for 7 days to allow all non-crosslinked material to be removed from the network polymer. The polymer was then removed from the acetone and placed on pre-weighed paper. The paper and polymer were then placed into a vacuum oven at 40° C. and 0.33 atm for 24 hours. The samples were then weighed on the paper. The final polymer weight was determined by subtracting the weight papers' original weight from the total weight.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A thermoset shape memory polymer prepared by a process comprising curing a pre-thermoset admixture comprising:
   a) from about 50% to about 99.9% by weight of one or more thermoplastic polymers; and
   b) from about 0.1% to about 50% by weight of one or more crosslinkers;
   wherein the resulting shape memory polymer has a glass transition temperature, $T_g$, of from about −40° C. to about 200° C., a rubbery modulus, $E_r$, of from about 0.01 MPa to about 100 MPa, and a gel fraction greater than 0.

2. The shape memory polymer according to claim 1, wherein the one or more thermoplastic polymers comprise two or more monomers having the formula:

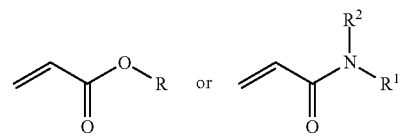

wherein R, $R^1$ and $R^2$ are each independently is chosen from:
i) hydrogen;
ii) $C_1$-$C_{20}$ linear alkyl;
iii) $C_3$-$C_{20}$ branched alkyl;
iv) $C_3$-$C_{20}$ cyclic alkyl;
v) $C_5$-$C_{20}$ bicyclic alkyl;
vi) $C_5$-$C_{20}$ fused ring alkyl;
vii) $C_1$-$C_{20}$ heterocyclic;
viii) $C_1$-$C_{20}$ heteroaryl;
ix) $C_4$-$C_{20}$ heterobicyclic;
x) $C_6$ or $C_{10}$ aryl; or
xi) $C_7$-$C_{20}$ alkylenearyl; or
$R^1$ and $R^2$ can be taken together to form a substituted or unsubstituted ring having from 3 to 20 atoms and optionally from 1 to 3 heteroatoms in addition to the nitrogen atom to which $R^1$ and $R^2$ are bonded, or a fused ring system having from 2 to 4 rings having a total of from 3 to 20 atoms;
any of which R, $R^1$ and $R^2$ units or rings formed by $R^1$ and $R^2$ can be substituted by one or more substitutions chosen from:
i) $C_1$-$C_{12}$ linear, $C_3$-$C_{12}$ branched, or $C_3$-$C_{12}$ cyclic alkyl;
ii) substituted or unsubstituted $C_6$ or $C_{10}$ aryl;
iii) substituted or unsubstituted $C_6$ or $C_{10}$ alkylenearyl;
iv) substituted or unsubstituted $C_1$-$C_9$ heterocyclic rings;
v) substituted or unsubstituted $C_1$-$C_9$ heteroaryl rings;
vi) —$(CR^{102a}R^{102b})_a OR^{101}$;
vii) —$(CR^{102a}R^{102b})_a C(O)R^{101}$;
viii) —$(CR^{102a}R^{102b})_a C(O)OR^{101}$;
ix) —$(CR^{102a}R^{102b})_a C(O)N(R^{101})_2$;
x) —$(CR^{102a}R^{102b})_a N(R^{101})_2$;
xi) halogen;
xii) —$(CR^{102a}R^{102b})_a CN$;
xiii) —$(CR^{102a}R^{102b})_a NO_2$;
xiv) —$CH_j X_k$; wherein X is halogen, the index j is an integer from 0 to 2, j+k=3;
xv) —$(CR^{102a}R^{102b})_a SR^{101}$;
xvi) —$(CR^{102a}R^{102b})_a SO_2 R^{101}$; or
xvii) —$(CR^{102a}R^{102b})_a SO_3 R^{101}$;
wherein each $R^{101}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{101}$ units can be taken together to form a ring comprising 3-7 atoms; $R^{102a}$ and $R^{102b}$ are each independently hydrogen or $C_1$-$C_4$ linear or $C_3$-$C_4$ branched alkyl; the index "a" is from 0 to 4.

3. The polymer according to claim 1, wherein the one or more thermoplastic polymers comprises one or more monomers having the formula:

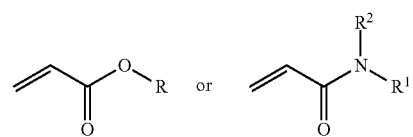

wherein R, $R^1$ and $R^2$ are each independently chosen from:
i) substituted or unsubstituted $C_1$-$C_6$ linear alkyl;
ii) substituted or unsubstituted $C_3$-$C_6$ branched alkyl;
iii) substituted or unsubstituted $C_3$-$C_6$ cyclic alkyl;
iv) substituted or unsubstituted $C_6$-$C_{20}$ bicyclic alkyl;
v) substituted or unsubstituted $C_6$ or $C_{10}$ aryl;
vi) substituted or unsubstituted $C_7$-$C_{20}$ alkylenearyl; or
vii) substituted or unsubstituted $C_1$-$C_{20}$ heterocyclic; or
$R^1$ and $R^2$ can be taken together to form a substituted or unsubstituted 5-member or 6-member ring optionally comprising a heteroatom in addition to the nitrogen atom to which $R^1$ and $R^2$ are bonded, said heteroatom chosen from oxygen, nitrogen, or sulfur; and wherein further said substitutions independently chosen from:
i) $C_1$-$C_6$ linear alkyl;
ii) $C_3$-$C_6$ branched alkyl;
iii) $C_3$-$C_6$ cyclic alkyl;
iv) halogen; or
v) —C(O)OH.

4. The polymer according to claim 1, wherein the one or more thermoplastic polymers comprise one or more monomers chosen from methyl acrylate, ethyl acrylate, n-propyl acrylate, iso-propyl acrylate, cyclopropyl acrylate, n-butyl acrylate, iso-butyl acrylate, sec-butyl acrylate, tert-butyl acrylate, cyclobutyl acrylate, n-pentyl acrylate, cyclopentyl acrylate, n-hexyl acrylate, cyclohexyl acrylate, or 4-tert-butylcyclohexyl acrylate.

5. The polymer according to claim 1, wherein the one or more thermoplastic polymers comprise one or more monomers chosen from acrylamide, N-methylacrylamide, N,N-dimethylacrylamide, N-ethylacrylamide, N,N-diethylacrylamide, N-methyl-N-ethylacrylamide, N-isopropylacrylamide, N,N-diisopropylacrylamide, N-cyclopropylacrylamide, N,N-dicyclopropylacrylamide, N-acryloylaziridine), N-acryloylazetidine, N-acryloylpyrrolidine, 4-acryloylmorpholine, N-acryloylpiperidine, or N-acryloylpiperazine).

6. The polymer according to claim 1, wherein the one or more thermoplastic polymers comprise one or more monomers chosen from bicyclo[1.1.1]pentan-1-yl acrylate, bicyclo[1.1.1]pentan-2-yl acrylate, bicyclo[2.1.1]hexan-1-yl acrylate, bicyclo[2.1.1]hexan-2-yl acrylate, bicyclo[2.1.1]hexan-6-yl acrylate, bicyclo[2.2.1]heptan-1-yl acrylate, bicyclo[2.2.1]heptan-2-yl acrylate, 1-methylbicyclo[2.2.1]heptan-2-yl acrylate, 7,7-dimethylbicyclo[2.2.1]heptan-2-yl acrylate, 1,7,7-trimethylbicyclo[2.2.1]heptan-2-yl acrylate, 1,3,3-trimethylbicyclo[2.2.1]heptan-2-yl acrylate, or 2,6,6-trimethyl-bicyclo[3.1.1]heptan-2-yl acrylate.

7. The shape memory polymer according to claim 1, wherein the one or more thermoplastic polymers comprise one or more monomers chosen from:
i) diisocyanates having the formula:

O=C=N—W—N=C=O; and ii) diols having the formula:

HO-D—OH;

wherein W is chosen from:
i) substituted or unsubstituted $C_1$-$C_{20}$ linear alkylene, $C_3$-$C_{20}$ branched alkylene, or $C_3$-$C_{20}$ cyclic alkylene;
ii) substituted or unsubstituted $C_2$-$C_{20}$ linear alkenylene, $C_3$-$C_{20}$ branched alkenylene, or $C_5$-$C_{20}$ cyclic alkenylene;
iii) substituted or unsubstituted $C_2$-$C_{20}$ linear alkynylene or $C_3$-$C_{20}$ branched alkynylene;
iv) substituted or unsubstituted arylene;
v) substituted or unsubstituted alkylenearylene;
vi) substituted or unsubstituted alkylenearylalkylene;
vii) substituted or unsubstituted heterocyclene; and
viii) substituted or unsubstituted heteroarylene;

D units are chosen from:
i) substituted or unsubstituted $C_1$-$C_{20}$ linear alkylene, $C_3$-$C_{20}$ branched alkylene, or $C_3$-$C_{20}$ cyclic alkylene;
ii) substituted or unsubstituted $C_2$-$C_{20}$ linear alkenylene, $C_3$-$C_{20}$ branched alkenylene, or $C_5$-$C_{20}$ cyclic alkenylene;
iii) substituted or unsubstituted $C_2$-$C_{20}$ linear alkynylene or $C_3$-$C_{20}$ branched alkynylene;
iv) substituted or unsubstituted polyoxyalkylene units;
v) substituted or unsubstituted arylene;
vi) substituted or unsubstituted alkylenearylene;
vii) substituted or unsubstituted alkylenearylalkylene;
viii) substituted or unsubstituted heterocyclene; and
ix) substituted or unsubstituted heteroarylene.

8. The shape memory polymer according to claim 1, wherein the one or more thermoplastic polymers comprise one or more arylene or alkylenearylene units having the formula:

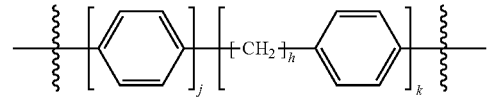

wherein the index h is from 1 to 10; and the indices j and k are each independently from 1 to 10.

9. The shape memory polymer according to claim 1, wherein the one or more thermoplastic polymers comprise one or more diols chosen from:
i) $C_1$-$C_{20}$ linear alkylene diols or $C_3$-$C_{20}$ branched alkylene diols;
ii) polyoxyethylene diols having the formula:

$HO(CH_2CH_2O)_sCH_2CH_2OH$ wherein the index s is from 1 to 200;
iii) polyoxypropylene diols having the formula:

$HO(CH_2CH_2CH_2O)_sCH_2CH_2CH_2OH$ or $HO(CH_2CH(CH_3)O)_sCH_2CH(CH_3)OH$ wherein the index s is from 1 to 200; or
iv) polyoxyalkylene diols having the formula:

$HO(CH_2CH_2O)_p(CH_2CH_2CH_2O)_q(CH_2CH_2O)_rCH_2CH_2OH$ wherein the indices p, q and r are each independently from 1 to 100.

10. The shape memory polymer according to claim 1, comprising one or more crosslinkers having the formula:

$X[OC(O)R^3]_n$ or $X[NHC(O)R^3]_n$ wherein X is a unit having from 1 to 5000 carbon atoms, $R^3$ is unit having from 1 to 20 carbon atoms, and n is an integer from 2 to 6.

11. The shape memory polymer according to claim 1, comprising a crosslinker having the formula:

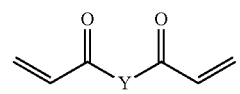

wherein Y is a linking unit having the formula:

$-[Q]_y[[C(R^{4a}R^{4b})]_x[Q^1]_{y1}]_m[C(R^{5a}R^{5b})]_w[Q^2]_{y2}-$ each of Q, $Q^1$ and $Q^2$ are independently:
i) —C(O)—;
ii) —NH—;
iii) —C(O)NH—;
iv) —NHC(O)—;
v) —NHC(O)NH—;
vi) —NHC(O)O—;
vii) —C(O)O—;
viii) —C(O)NHC(O)—;
ix) —O—;
x) —S—;
xi) —SO$_2$—;
xii) —C(=NH)—;
xiii) —C(=NH)NH—;
xiv) —NHC(=NH)—; or
xv) —NHC(=NH)NH—;
$R^{4a}$, $R^{4b}$, $R^{5a}$ and $R^{5b}$ are each independently:
i) hydrogen;
ii) hydroxy;
iii) halogen; or
iv) substituted or unsubstituted $C_1$-$C_6$ linear or $C_3$-$C_6$ branched alkyl; or
the indices w and x are each independently from 0 to 500; the indices y, $y^1$ and $y^2$ are each independently 0 or 1; and the index m is from 0 to 500.

12. The shape memory polymer according to claim 1, comprising one or more multifunctional crosslinkers having the formula:

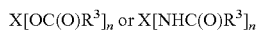

wherein $R^3$ is unit having from 1 to 20 carbon atoms; X is a unit having the formula:

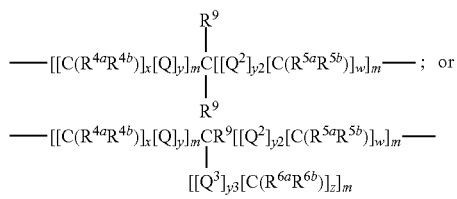

and the index n is 2, 3, or 4;
Q, $Q^2$ and $Q^3$ are each independently:
i) —C(O)—;
ii) —NH—;
iii) —C(O)NH—;
iv) —NHC(O)—;
v) —NHC(O)NH—;
vi) —NHC(O)O—;
vii) —C(O)O—;
viii) —C(O)NHC(O)—;
ix) —O—;
x) —S—;
xi) —SO$_2$—;
xii) —C(=NH)—;
xiii) —C(=NH)NH—;
xiv) —NHC(=NH)—; or
xv) —NHC(=NH)NH—;
$R^{4a}$, $R^{4b}$, $R^{5a}$, $R^{5b}$, $R^{6a}$ and $R^{6b}$ are each independently:
i) hydrogen;
ii) hydroxy;
iii) halogen; or
iv) substituted or unsubstituted $C_1$-$C_6$ linear or $C_3$-$C_6$ branched alkyl;

the indices w, x and z are each independently from 0 to 500; the index m in each occurrence is independently 0 or 500; the indices y, $y^2$ and $y^3$ are each independently 0 or 1;

$R^9$ is hydrogen or $C_1$-$C_{20}$ linear alkyl, $C_3$-$C_{20}$ branched alkyl or $C_3$-$C_{20}$ cyclic alkyl; or a unit having the formula:

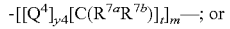

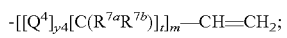

$R^{7a}$ and $R^{7b}$ are each independently hydrogen or $C_1$-$C_{20}$ linear alkyl; the index t is from 0 to 500.

13. The shape memory polymer according to claim 1, having a gel fraction greater than about 50%.

14. The shape memory polymer according to claim 1, having a gel fraction greater than about 75%.

15. The shape memory polymer according to claim 1, having a gel fraction greater than about 80%.

16. The shape memory polymer according to claim 1, having a gel fraction greater than about 90%.

17. The shape memory polymer according to claim 1, having a gel fraction greater than about 95%.

18. The shape memory polymer according to claim 1, having a glass transition temperature, $T_g$, of from about 0° C. to about 200° C.

19. The shape memory polymer according to claim 1, having a glass transition temperature, $T_g$, of from about 10° C. to about 150° C.

20. The shape memory polymer according to claim 1, having a glass transition temperature, $T_g$, of from about 20° C. to about 100° C.

21. The shape memory polymer according to claim 1, having a rubbery modulus, $E_r$, of from about 0.01 MPa to about 15 MPa.

22. The shape memory polymer according to claim 1, having a rubbery modulus, $E_r$, of from about 1 MPa to about 10 MPa.

23. The shape memory polymer according to claim 1, having a rubbery modulus, $E_r$, of from about 1 MPa to about 5 MPa.

24. The shape memory polymer according to claim 1, wherein the one or more thermoplastic polymers comprise:
i) from about 1% to about 30% by weight of a first monomer; and
ii) from about 70% to about 99% by weight of a second monomer.

25. The shape memory polymer according to claim 1, wherein the one or more thermoplastic polymers comprise:
i) from about 0.1% to about 99% by weight of a first monomer;
ii) from about 0.1% to about 99% by weight of a second monomer; and
iii) from about 0.1% to about 99% by weight of a third monomer.

26. A process for preparing a thermoset shape memory polymer, comprising curing a pre-thermoset admixture, the admixture comprising:
a) from about 50% to about 99.9% by weight of one or more thermoplastic polymers; and
b) from about 0.1% to about 50% by weight of one or more crosslinkers;
wherein the resulting shape memory polymer has a glass transition temperature, $T_g$, of from about −40° C. to about 200° C., a rubbery modulus, $E_r$, of from about 0.01 MPa to about 100 MPa, and a gel fraction greater than 0.

27. The process according to claim 26, wherein the one or more thermoplastic polymers comprise two or more monomers having the formula:

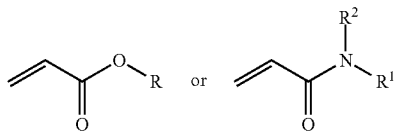

wherein R, $R^1$ and $R^2$ are each independently is chosen from:
i) hydrogen;
ii) $C_1$-$C_{20}$ linear alkyl;
iii) $C_3$-$C_{20}$ branched alkyl;
iv) $C_3$-$C_{20}$ cyclic alkyl;
v) $C_5$-$C_{20}$ bicyclic alkyl;
vi) $C_5$-$C_{20}$ fused ring alkyl;
vii) $C_1$-$C_{20}$ heterocyclic;
viii) $C_1$-$C_{20}$ heteroaryl;
ix) $C_4$-$C_{20}$ heterobicyclic;
x) $C_6$ or $C_{10}$ aryl; or
xi) $C_7$-$C_{20}$ alkylenearyl; or
$R^1$ and $R^2$ can be taken together to form a substituted or unsubstituted ring having from 3 to 20 atoms and optionally from 1 to 3 heteroatoms in addition to the nitrogen atom to which $R^1$ and $R^2$ are bonded, or a fused ring system having from 2 to 4 rings having a total of from 3 to 20 atoms;
any of which R, $R^1$ and $R^2$ units or rings formed by $R^1$ and $R^2$ can be substituted by one or more substitutions chosen from:
i) $C_1$-$C_{12}$ linear, $C_3$-$C_{12}$ branched, or $C_3$-$C_{12}$ cyclic alkyl;
ii) substituted or unsubstituted $C_6$ or $C_{10}$ aryl;
iii) substituted or unsubstituted $C_6$ or $C_{10}$ alkylenearyl;
iv) substituted or unsubstituted $C_1$-$C_9$ heterocyclic rings;
v) substituted or unsubstituted $C_1$-$C_9$ heteroaryl rings;
vi) —$(CR^{102a}R^{102b})_aOR^{101}$;
vii) —$(CR^{102a}R^{102b})_aC(O)R^{101}$;
viii) —$(CR^{102a}R^{102b})_aC(O)OR^{101}$;
ix) —$(CR^{102a}R^{102b})_aC(O)N(R^{101})_2$,
x) —$(CR^{102a}R^{102b})_aN(R^{101})_2$;
xi) halogen;
xii) —$(CR^{102a}R^{102b})_aCN$;
xiii) —$(CR^{102a}R^{102b})_aNO_2$;
xiv) —$CH_jX_k$; wherein X is halogen, the index j is an integer from 0 to 2, j+k=3;
xv) —$(CR^{102a}R^{102b})_aSR^{101}$;
xvi) —$(CR^{102a}R^{102b})_aSO_2R^{101}$; or
xvii) —$(CR^{102a}R^{102b})_aSO_3R^{101}$;
wherein each $R^{101}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{101}$ units can be taken together to form a ring comprising 3-7 atoms; $R^{102a}$ and $R^{102b}$ are each independently hydrogen or $C_1$-$C_4$ linear or $C_3$-$C_4$ branched alkyl; the index "a" is from 0 to 4.

28. The process according to claim 26, wherein the one or more thermoplastic polymers comprise one or more monomers chosen from:
i) diisocyanates having the formula:

ii) diols having the formula:

wherein W is chosen from:
i) substituted or unsubstituted $C_1$-$C_{20}$ linear alkylene, $C_3$-$C_{20}$ branched alkylene, or $C_3$-$C_{20}$ cyclic alkylene;
ii) substituted or unsubstituted $C_2$-$C_{20}$ linear alkenylene, $C_3$-$C_{20}$ branched alkenylene, or $C_5$-$C_{20}$ cyclic alkenylene;
iii) substituted or unsubstituted $C_2$-$C_{20}$ linear alkynylene or $C_3$-$C_{20}$ branched alkynylene;
iv) substituted or unsubstituted arylene;
v) substituted or unsubstituted alkylenearylene;
vi) substituted or unsubstituted alkylenearylalkylene;
vii) substituted or unsubstituted heterocyclene; and
viii) substituted or unsubstituted heteroarylene;
D units are chosen from:
i) substituted or unsubstituted $C_1$-$C_{20}$ linear alkylene, $C_3$-$C_{20}$ branched alkylene, or $C_3$-$C_{20}$ cyclic alkylene;
ii) substituted or unsubstituted $C_2$-$C_{20}$ linear alkenylene, $C_3$-$C_{20}$ branched alkenylene, or $C_5$-$C_{20}$ cyclic alkenylene;
iii) substituted or unsubstituted $C_2$-$C_{20}$ linear alkynylene or $C_3$-$C_{20}$ branched alkynylene;
iv) substituted or unsubstituted polyoxyalkylene units;
v) substituted or unsubstituted arylene;
vi) substituted or unsubstituted alkylenearylene;
vii) substituted or unsubstituted alkylenearylalkylene;
viii) substituted or unsubstituted heterocyclene; and
ix) substituted or unsubstituted heteroarylene.

29. The process according to claim 26, wherein the one or more thermoplastic polymers comprise one or more arylene or alkylenearylene units having the formula:

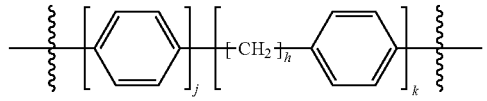

wherein the index h is from 1 to 10; and the indices j and k are each independently from 1 to 10.

30. The process according to claim 26, comprising one or more crosslinkers having the formula:

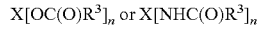

wherein X is a unit having from 1 to 5000 carbon atoms, $R^3$ is unit having from 1 to 20 carbon atoms, and n is an integer from 2 to 6.

31. The process according to claim 26, wherein the shape memory polymer has a gel fraction greater than about 50%.

32. The process according to claim 26, wherein the shape memory polymer has a gel fraction greater than about 75%.

33. The process according to claim 26, wherein the shape memory polymer has a gel fraction greater than about 80%.

34. The process according to claim 26, wherein the shape memory polymer has a gel fraction greater than about 90%.

35. The process according to claim 26, wherein the shape memory polymer has a gel fraction greater than about 95%.

36. The process according to claim 26, wherein the shape memory polymer has a glass transition temperature, $T_g$, of from about 0° C. to about 200° C.

37. The process according to claim 26, wherein the shape memory polymer has a glass transition temperature, $T_g$, of from about 10° C. to about 150° C.

38. The process according to claim 26, wherein the shape memory polymer has a glass transition temperature, $T_g$, of from about 20° C. to about 100° C.

39. The process according to claim 26, wherein the shape memory polymer has a rubbery modulus, $E_r$, of from about 0.01 MPa to about 15 MPa.

40. The process according to claim 26, wherein the shape memory polymer has a rubbery modulus, $E_r$, of from about 1 MPa to about 10 MPa.

41. The process according to claim 26, wherein the shape memory polymer has a rubbery modulus, $E_r$, of from about 1 MPa to about 5 MPa.

42. The process according to claim 26, further comprising the step of mixing the one or more thermoplastic polymers and one or more crosslinkers prior to curing.

43. The process according to claim 42, wherein the mixing is performed until a point wherein the change in the torque as measured by a device fitted to the apparatus mixing the one or more thermoplastic polymers and one or more crosslinkers indicates a less than about 10% change in torque over a period of at least about one minute.

44. The process according to claim 26, wherein the shape memory polymer comprises one or more essentially non-scissionable thermoplastic polymers.

45. The process according to claim 44, wherein the shape memory polymer comprises a substantially thermoplastic polymer wherein at least about 75% of the polymer chains are not broken or fractured during curing.

46. The process according to claim 26, wherein the pre-thermoset admixture is dissolved or dispersed in one or more solvents prior to curing.

47. The process according to claim 26, further comprising the step of forming the one or more thermoplastic polymers from one or more monomers prior to forming or during formation of the pre-thermoset admixture.

48. A process for forming a shape memory polymer comprising curing an admixture comprising:
   a) from about 50% to about 99.9% by weight of a poly (methyl acrylate) thermoplastic polymer; and
   b) from about 0.1% to about 50% by weight of one or more crosslinkers;

wherein the resulting shape memory polymer has a glass transition temperature, $T_g$, of from about −40° C. to about 200° C., a rubbery modulus, $E_r$, of from about 0.01 MPa to about 100 MPa, and a gel fraction greater than 0.

49. A thermoset shape memory polymer comprising:
   a) a thermoplastic backbone comprising at least two linear monomers; and
   b) at least one crosslinker;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

50. A thermoset shape memory polymer comprising:
   a) a plurality of thermoplastic homopolymer backbones; and
   b) one type of crosslinker;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

51. A thermoset shape memory polymer comprising:
   a) a thermoplastic homopolymer backbone; and
   b) a plurality of crosslinkers;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

52. A thermoset shape memory polymer comprising:
   a) a plurality of thermoplastic copolymer backbones wherein each copolymer comprises at least one different monomer than the other copolymers; and
   b) at least one crosslinker;
wherein the shape memory polymer has a glass transition temperature, $T_g$, of from about −40° C. to about 200° C., a rubbery modulus, $E_r$, of from about 0.01 MPa to about 100 MPa, and a gel fraction greater than 0.

* * * * *